United States Patent
Yamada et al.

(10) Patent No.: US 9,457,692 B2
(45) Date of Patent: Oct. 4, 2016

(54) SEAT RECLINING APPARATUS FOR VEHICLE

(71) Applicant: Aisin Seiki Kabushiki Kaisha, Kariya-shi (JP)

(72) Inventors: Yukifumi Yamada, Toyota (JP); Naoki Goto, Tokai (JP); Yasuhiro Kojima, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 164 days.

(21) Appl. No.: 14/217,778

(22) Filed: Mar. 18, 2014

(65) Prior Publication Data

US 2014/0284984 A1    Sep. 25, 2014

(30) Foreign Application Priority Data

Mar. 22, 2013  (JP) ................................. 2013-059886

(51) Int. Cl.
   *B60N 2/02*       (2006.01)
   *B60N 2/235*      (2006.01)

(52) U.S. Cl.
   CPC ........... *B60N 2/2356* (2013.01); *B60N 2/2358* (2013.01)

(58) Field of Classification Search
   CPC .............................. B60N 2/34; B60N 2/2356
   USPC ........ 297/366, 367 R, 367 P, 378.12, 354.13
   See application file for complete search history.

(56) References Cited

U.S. PATENT DOCUMENTS

| | | | | |
|---|---|---|---|---|
| 4,146,267 A | * | 3/1979 | Mori ..................... | B60N 2/2352 297/367 R |
| 4,394,048 A | * | 7/1983 | Sakurai ................ | B60N 2/2352 297/367 R |
| 4,484,779 A | * | 11/1984 | Suzuki ................... | B60N 2/366 297/326 |
| 5,383,710 A | * | 1/1995 | Premji ..................... | B60N 2/20 297/367 R |
| 6,082,821 A | * | 7/2000 | Baloche ............... | B60N 2/2358 297/354.12 |

(Continued)

FOREIGN PATENT DOCUMENTS

DE        199 15 863 A1    10/1999
FR        2 772 318 A1      6/1999

(Continued)

OTHER PUBLICATIONS

The Extended European Search Report issued Jul. 23, 2014, in Application No. / Patent No. 14157759.3-1758.

*Primary Examiner* — David R Dunn
*Assistant Examiner* — Alexander Harrison
(74) *Attorney, Agent, or Firm* — Oblon, McClelland, Maier & Neustadt, L.L.P.

(57) ABSTRACT

A seat reclining apparatus for a vehicle: a locking mechanism that is interposed between a seat cushion and a seatback and selectively switches inclining of the seatback between a permitted state and a regulated state with respect to the seat cushion; a first operation member that performs a first unlocking operation which allows the seatback to incline with respect to the seat cushion within a angle range with respect to the locking mechanism; a second operation member that performs a second unlocking operation which allows the seatback to incline with respect to the seat cushion to a forward tilt position exceeding the angle range with respect to the locking mechanism; and a stopper mechanism that regulates a rearward tilt of the seatback at a regulation angle position included within the angle range in a state of the second unlocking operation.

6 Claims, 30 Drawing Sheets

(56) References Cited

U.S. PATENT DOCUMENTS

| | | | | |
|---|---|---|---|---|
| 6,139,104 A * | 10/2000 | Brewer | ............... | B60N 2/20 297/341 |
| 6,533,357 B2 * | 3/2003 | Pospeshil | ............... | B60N 2/23 297/378.12 |
| 6,601,921 B1 * | 8/2003 | Collins | ............... | B60N 2/433 297/361.1 |
| 6,739,668 B2 * | 5/2004 | Coman | ............... | B60N 2/206 297/378.12 |
| 6,869,143 B2 * | 3/2005 | Secord | ............... | B60N 2/224 297/362 |
| 6,910,739 B2 * | 6/2005 | Grable | ............... | B60N 2/2354 296/65.09 |
| 7,134,724 B2 * | 11/2006 | Chabanne | ............... | B60N 2/2352 297/366 |
| 7,255,398 B2 * | 8/2007 | Tokui | ............... | B60N 2/20 297/354.12 |
| 7,306,286 B2 * | 12/2007 | Syrowik | ............... | B60N 2/20 297/378.12 |
| 7,328,954 B2 | 2/2008 | Sasaki et al. | | |
| 7,357,455 B2 * | 4/2008 | Becker | ............... | B60N 2/12 297/378.12 |
| 7,648,205 B2 | 1/2010 | Zou et al. | | |
| 8,544,956 B2 * | 10/2013 | Park | ............... | B60N 2/01583 297/326 |
| 9,010,862 B2 * | 4/2015 | Yamaguchi | ............... | B60N 2/68 297/367 R |
| 9,199,556 B2 * | 12/2015 | Couasnon | ............... | B60N 2/20 |
| 2007/0090674 A1 * | 4/2007 | Miyauchi | ............... | B60N 2/20 297/378.12 |
| 2007/0138854 A1 * | 6/2007 | Paing | ............... | B60N 2/20 297/378.12 |
| 2009/0001797 A1 * | 1/2009 | Neumann | ............... | B60N 2/123 297/378.12 |
| 2009/0096270 A1 * | 4/2009 | Halbig | ............... | B60N 2/206 297/378.12 |
| 2010/0123343 A1 * | 5/2010 | Bonk | ............... | B60N 2/2358 297/378.12 |
| 2012/0062012 A1 * | 3/2012 | Miller | ............... | B60N 2/2356 297/378.12 |
| 2013/0193735 A1 * | 8/2013 | Bonk | ............... | B60N 2/0232 297/378.12 |
| 2013/0270884 A1 * | 10/2013 | Espinosa | ............... | B60N 2/2252 297/378.12 |
| 2014/0145485 A1 * | 5/2014 | Couasnon | ............... | B60N 2/2358 297/378.12 |
| 2014/0239695 A1 * | 8/2014 | Miller | ............... | B60N 2/20 297/378.12 |

FOREIGN PATENT DOCUMENTS

| | | |
|---|---|---|
| JP | 2005-313833 | 11/2005 |
| JP | 4861412 | 1/2012 |
| WO | WO 2008/032808 A1 | 3/2008 |

* cited by examiner

REARWARD ← → FORWARD

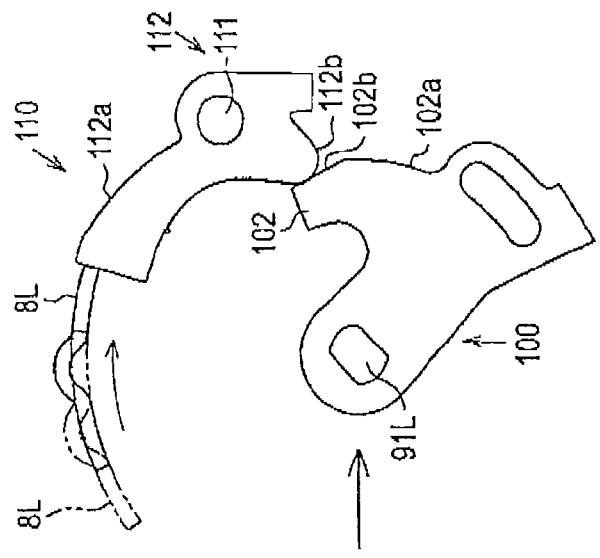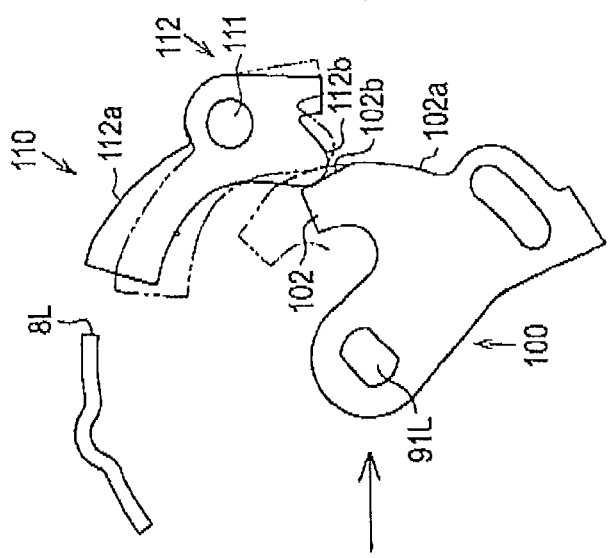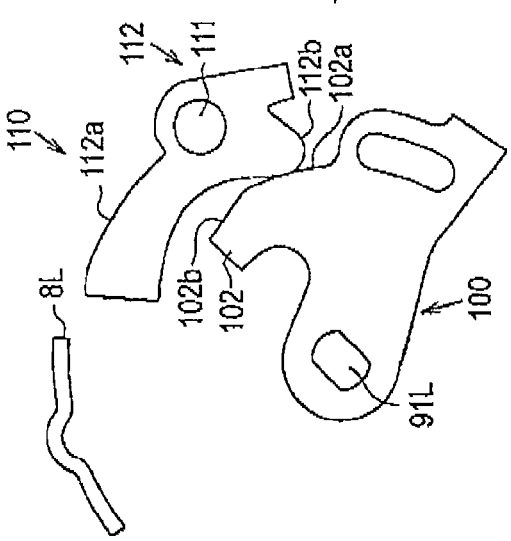

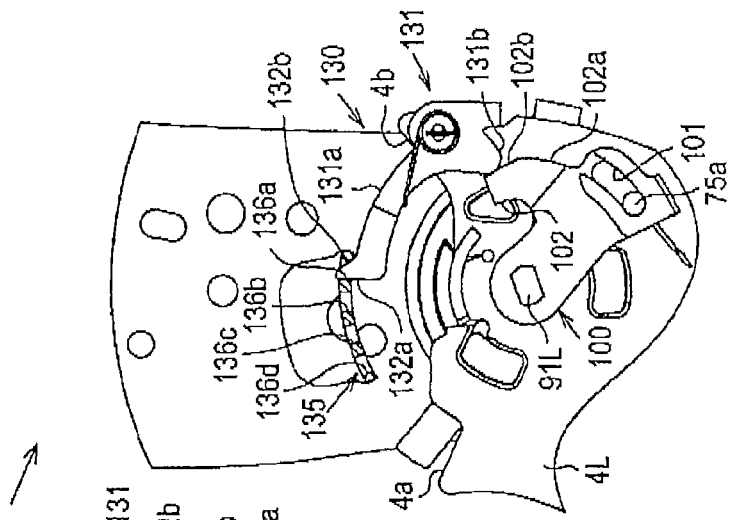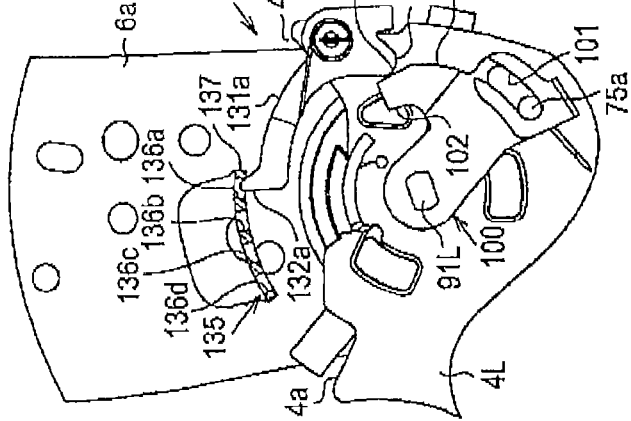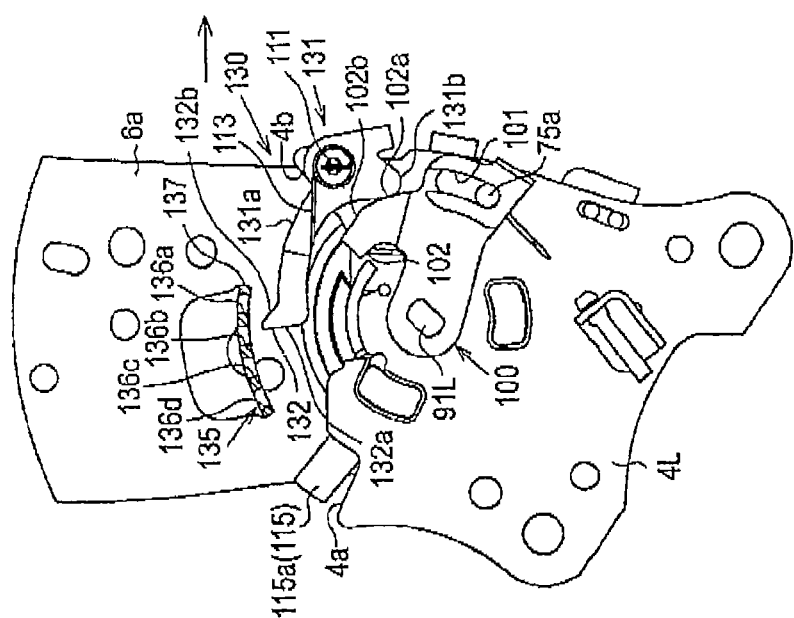

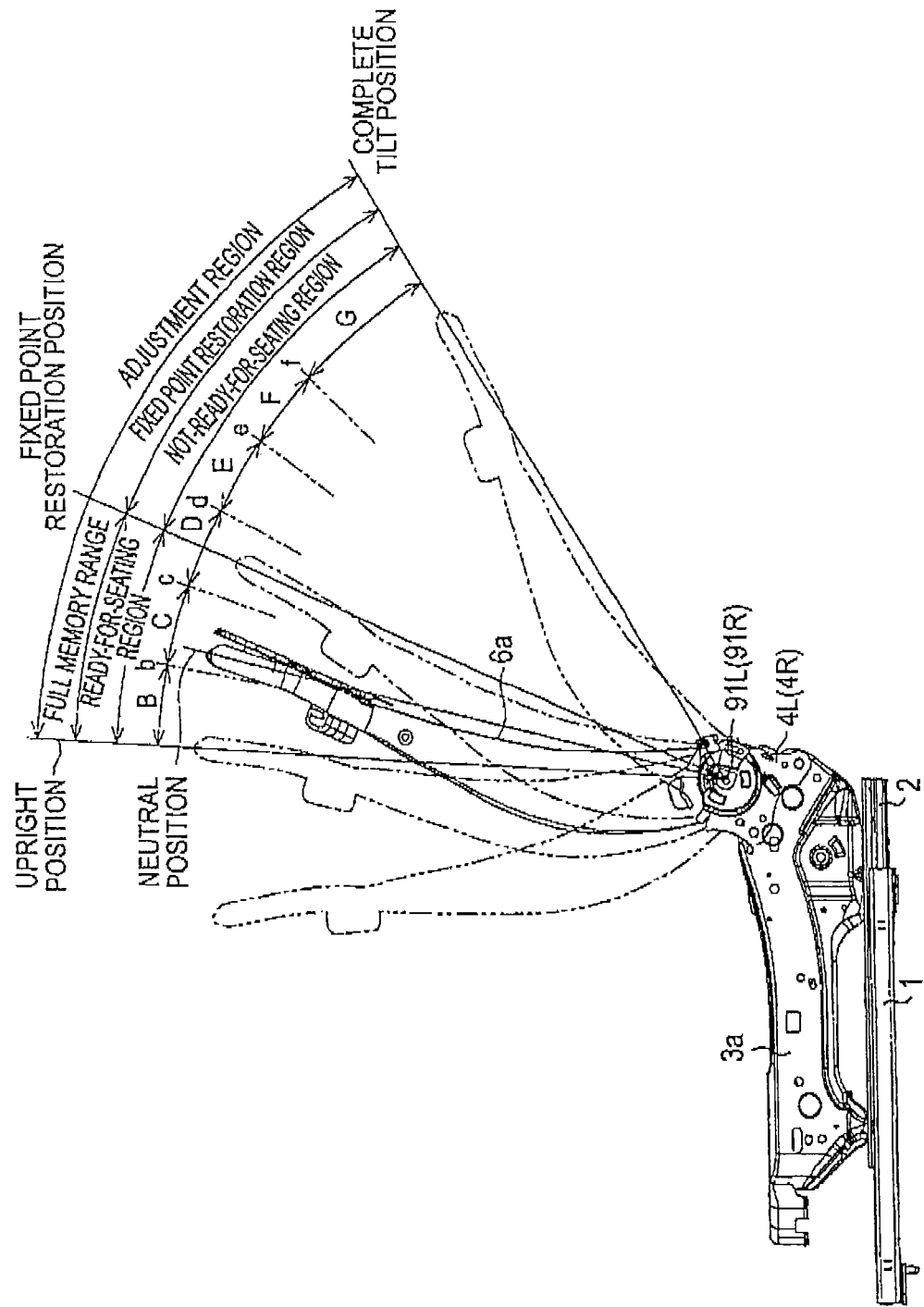

FORWARD ← → REARWARD

SEAT RECLINING APPARATUS FOR VEHICLE

CROSS REFERENCE TO RELATED APPLICATIONS

This application is based on and claims priority under 35 U.S.C. §119 to Japanese Patent Application 2013-059886, filed on Mar. 22, 2013, the entire contents of which are incorporated herein by reference.

TECHNICAL FIELD

This disclosure relates to a seat reclining apparatus for a vehicle.

BACKGROUND DISCUSSION

In the related art, JP 2005-313833A (Reference 1) discloses a seat reclining apparatus for a vehicle, for example. As illustrated in FIG. 31, this seat reclining apparatus for a vehicle includes a disk-shaped locking mechanism 200, which selectively switches inclining of a seatback between a permitted state and a regulated state with respect to a seat cushion within a predetermined angle range (ready-for-seating region), together with a first operation member 201 that performs unlocking operation thereof. In addition, the seat reclining apparatus for a vehicle includes a pole 206, which engages with teeth 202a formed on an outer shape portion of a turning member 202 on a seatback side of the locking mechanism 200, in an upper portion of the locking mechanism 200 of the seatback. This pole 206 forms a second locking mechanism 205 that allows the seatback to incline forward to a predetermined forward tilt position exceeding the predetermined angle range (ready-for-seating region) through the unlocking operation of the second operation member (not illustrated).

In other words, this seat reclining apparatus for a vehicle includes the second locking mechanism 205 that causes the seatback to incline forward to a predetermined forward tilt position, in addition to the ordinary locking mechanism 200.

Incidentally, in JP 2005-313833A (Reference 1), in addition to the ordinary locking mechanism 200 that is disposed around an axis line of the seatback, the second locking mechanism 205 is necessarily disposed in the upper portion of the locking mechanism 200, thereby causing a complicated structure. Particularly, since both of the locking mechanisms 200 and 205 need to satisfy strength for holding the seatback, an increase in mass is unavoidable as well.

Thus, there has been proposed that a function for causing the seatback to incline forward to the forward tilt position should be built in the ordinary locking mechanism (for example, Japanese Patent No. 4861412 (Reference 2) and the like).

Even in such a configuration, for example, if the second operation member is operated in a circumstance where a person sitting on a seat leans on the seatback, there is a possibility that the seatback may immediately incline to a limited position (hereinafter, also referred to as "complete tilt position") or in the vicinity thereof within the ready-for-seating region in a rearward inclination direction. Particularly, since the second operation member is unlikely to be observed by a person sitting on the seat, if the seatback inclines to the complete tilt position or the like through an operation of the second operation member by a third person, there is a possibility that usability may be impaired.

SUMMARY

Thus, a need exists for a seat reclining apparatus for a vehicle which is not suspectable to the drawback mentioned above.

An aspect of this disclosure is directed to a seat reclining apparatus for a vehicle including a locking mechanism that is interposed between a seat cushion and a seatback and selectively switches inclining of the seatback between a permitted state and a regulated state with respect to the seat cushion; a first operation member that performs a first unlocking operation which allows the seatback to incline with respect to the seat cushion within a predetermined angle range with respect to the locking mechanism; a second operation member that performs a second unlocking operation which allows the seatback to incline with respect to the seat cushion to a predetermined forward tilt position exceeding the predetermined angle range with respect to the locking mechanism; and a stopper mechanism that regulates a rearward tilt of the seatback at a predetermined regulation angle position included within the predetermined angle range in a state of the second unlocking operation of the second operation member.

With this configuration, for example, even if the second operation member is operated in a circumstance where a person sitting on the seat leans on the seatback, the rearward tilt of the seatback is regulated at the predetermined regulation angle position by the stopper mechanism, and thus, it is possible to prevent the seatback from overly tilting rearward.

Particularly, it is possible to further simplify the structure by accomplishing the inclining of the seatback with respect to the seat cushion within the predetermined angle range and the inclining of the seatback with respect to the seat cushion to the predetermined forward tilt position through the locking mechanism that is disposed around the axis line of the seatback.

The aspect of this disclosure provides an effect to prevent the seatback in a state inclinable to the forward tilt position in accordance with the operation of the operation member from overly tilting rearward.

BRIEF DESCRIPTION OF THE DRAWINGS

The foregoing and additional features and characteristics of this disclosure will become more apparent from the following detailed description considered with the reference to the accompanying drawings, wherein;

FIGS. 23A to 23C are explanatory views illustrating operations of the stopper mechanism when a seatback is in a ready-for-seating region;

FIGS. 26A to 26C are other explanatory views illustrating the operations of the stopper mechanism when the seatback is in the ready-for-seating region;

FIG. 27 is a side view illustrating the seat reclining apparatus for a vehicle and the operation thereof;

DETAILED DESCRIPTION

First Embodiment

Figure 1:
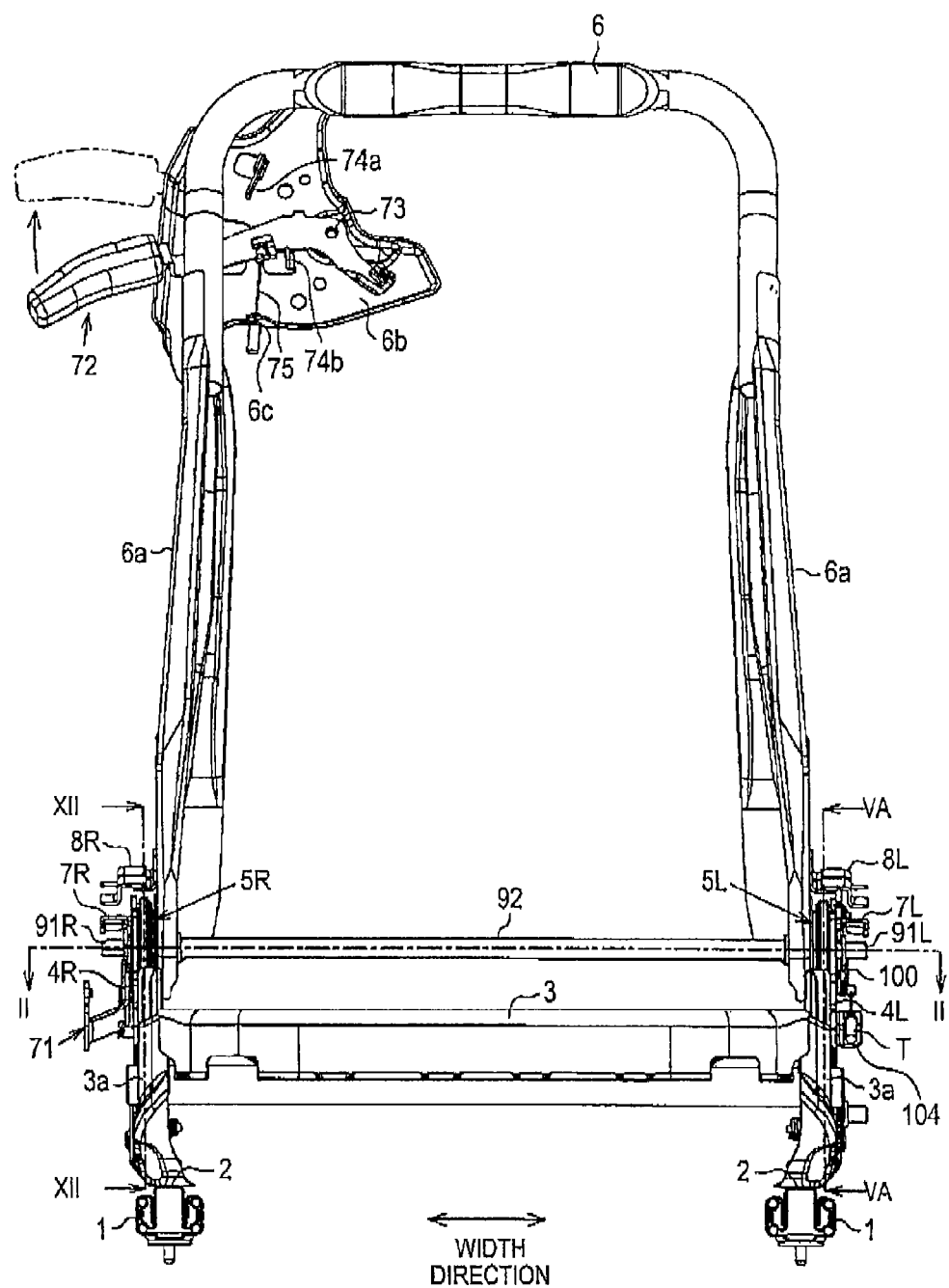
FIG. 1 is a front view illustrating a seat reclining apparatus for a vehicle to which a first embodiment disclosed here is applied.

With reference to FIGS. 1 to 24, a seat reclining apparatus for a vehicle including a walk-in mechanism will be described. In the description below, a front-back direction, a width direction and an up-down direction are considered to match each of the directions in a vehicle. In addition, with respect to a portion of a member provided in a pair on both sides in the width direction, reference characters "L" and "R" may be respectively applied to the reference numerals of the members disposed at left and right facing the front of the vehicle.

As illustrated in FIG. 1, a pair of lower rails 1 arranged in parallel in the width direction in an aspect of extending in the front-back direction (direction orthogonal to paper surface in FIG. 1) are fixed on a floor of a vehicle (not illustrated), and a pair of upper rails 2 are respectively supported by both of these lower rails 1 to be movable in the front-back direction. The lower rail 1 and the upper rail 2 configure a seat slide mechanism. In the configuration thereof, a movement of the upper rail 2 in the front-back direction with respect to the lower rail 1 is selectively allowed by a slide locking mechanism (not illustrated).

An approximately square frame-shaped cushion frame 3 forming a frame of a seat cushion is placed on both of the upper rails 2, in the cushion frame 3, a pair of lower plates 4L and 4R formed of plate materials are respectively and fixedly attached to an outer side surface of a rear end portion of a pair of cushion side frames 3a configuring both of the side portions thereof in the width direction by welding. Then, an approximately square frame-shaped seatback frame 6 forming a frame of a seatback is turnably (inclinably) connected to both of the lower plates 4L and 4R through a pair of locking mechanisms 5L and 5R.

In other words, lower end portions of a pair of backside frames 6a configuring both of the side portions of the seatback frame 6 in the width direction are adjacently disposed on each of inner sides of the rear end portion (lower plates 4L, 4R) of both of the cushion side frames 3a in the width direction. Then, as collectively illustrated in FIG. 2, a pair of rod-shaped hinge axes 91L and 91R having an axis line extended in the width direction respectively penetrate the lower end portions of both of the back side frames 6a together with both of the lower plates 4L and 4R. Both of the hinge axes 91L and 91R respectively and turnably support members (second member 20L, 20R) on the back side frame 6a of both of the locking mechanism 5L and 5R.

In each of the inner side end portions in the width direction, both of the hinge axes 91L and 91R are fixedly attached to a tubular connection shaft 92 coaxially extended therewith in the width direction so as to integrally turn. In other words, both of the hinge axes 91L and 91R connectedly move through the connection shaft 92, thereby turning. As in the above, the seatback frame 6 is connected to be turnable about the axis line of the connection shaft 92 and the like through both of the locking mechanisms 5L and 5R with respect to both of the lower plates 4L and 4R. Accordingly, an angle position (inclined angle) of the seatback is adjustable with respect to the seat cushion.

As illustrated in FIG. 1, in the lower plates 4L and 4R, fixing flanges 7L and 7R extended outward in the width direction on an upper side of the hinge axes 91L and 91R protrude. On an outer side surface of the back side frame 6a, approximately L-shaped movable flanges 8L and 8R extended outward in the width direction on an upper side of the lower plates 4L and 4R and the fixing flanges 7L and 7R are bonded. Then, in the fixing flanges 7L and 7R and the movable flanges 8L and 8R, an inner end portion and an outer end portion of a coil spring (not illustrated) are respectively locked. This coil spring urges to turn the seatback in a forward tilt direction with respect to the seat cushion.

Figure 3:
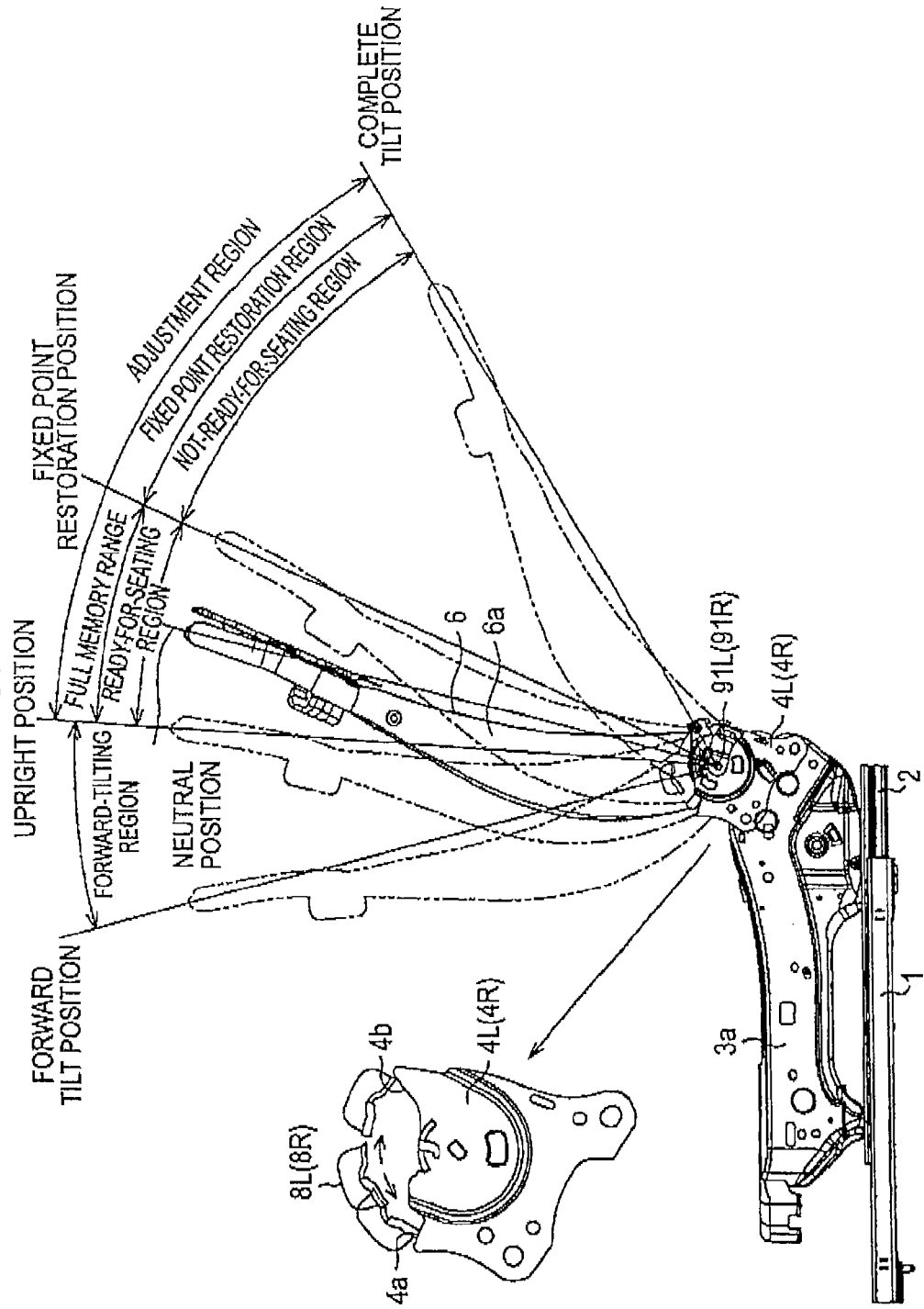
FIG. 3 is a side view illustrating the seat reclining apparatus for a vehicle and an operation thereof.

As illustrated in FIG. 3, the seatback (seatback frame 6) is configured to be able to incline with respect to the seat cushion (seat cushion frame 3) about the axis line of the hinge axes 91L and 91R within a range from a "forward tilt position" which greatly inclines forward to a "complete tilt position" which greatly inclines rearward.

In other words, as enlarged and illustrated in FIG. 3, in upper portions of the lower plates 4L and 4R, approximately claw-shaped front side stopper 4a and rear side stopper 4b protrude outward in a radial direction so as to respectively block a turning locus of the movable flanges 8L and 8R in both side portions about the axis line of the hinge axes 91L and 91R in a circumferential direction. Accordingly, an inclining range of the seatback (seatback frame 6) with respect to the seat cushion (seat cushion frame 3) is limited within a range where the movable flanges 8L and 8R abut on the front side stopper 4a or the rear side stopper 4b. In other words, the angle position of the seatback (seatback frame 6) when the movable flanges 8L and 8R abut on the front side stopper 4a corresponds to the forward tilt position, and the angle position of the seatback (seatback frame 6) when the movable flanges 8L and 8R abut on the rear side stopper 4b corresponds to the complete tilt position. The movable flanges 8L and 8R and the front side stopper 4a configure a front side stopper mechanism.

In addition, the inclining range of the seatback with respect to the seat cushion is largely divided into a "forward tilting region" on the forward tilt position side and an "adjustment region" on the complete tilt position side. Then, the seatback is in an erected state in an "upright position" which is an angle position on a border between the forward tilting region and the adjustment region. The locking mechanisms 5L and 5R adjust and maintain the angle position of the seatback with respect to the seat cushion mainly within this adjustment region.

The adjustment region is further divided into a "ready-for-seating region" on the upright position side and a "not-ready-for-seating region" on the complete tilt position side. Then, an angle position on a border between the ready-for-seating region and the not-ready-for-seating region is referred to as a "fixed point restoration position". The ready-for-seating region is an inclining range of the seatback suitable for a general seating posture, and for example, when the seatback is inclined from an arbitrary angle position of the ready-for-seating region to the forward tilt position, the seatback is erected to cancel the forward tilt thereafter, and thus, it is possible to be restored to the original angle position immediately before the forward tilt (full memory range).

Meanwhile, the not-ready-for-seating region is an inclining range of the seatback suitable for a special seating posture (for example, nap-taking posture), and for example, when the seatback is inclined from an arbitrary angle position of the not-ready-for-seating region to the forward tilt position, the seatback is erected to cancel the forward tilt thereafter, and thus, it is possible to be positioned in the fixed point restoration position (fixed point restoration range).

A predetermined angle position of the seatback (seatback frame 6) indicated by a solid line is an angle position in which the seatback is mostly set when a general person to be seated takes a seat (hereinafter, referred to as "neutral position").

Meanwhile, the forward tilt position in the forward tilting region is an angle position of the seatback to enhance convenience of getting on and off a rear seat. The above-described slide locking apparatus is released and the like in accordance with the inclining of the seatback to the forward tilt position, and the seat cushion is configured to slide forward with respect to the floor of a vehicle (so-called walk-in function).

Next, the locking mechanism 5L on one side will be described.

Figure 2:
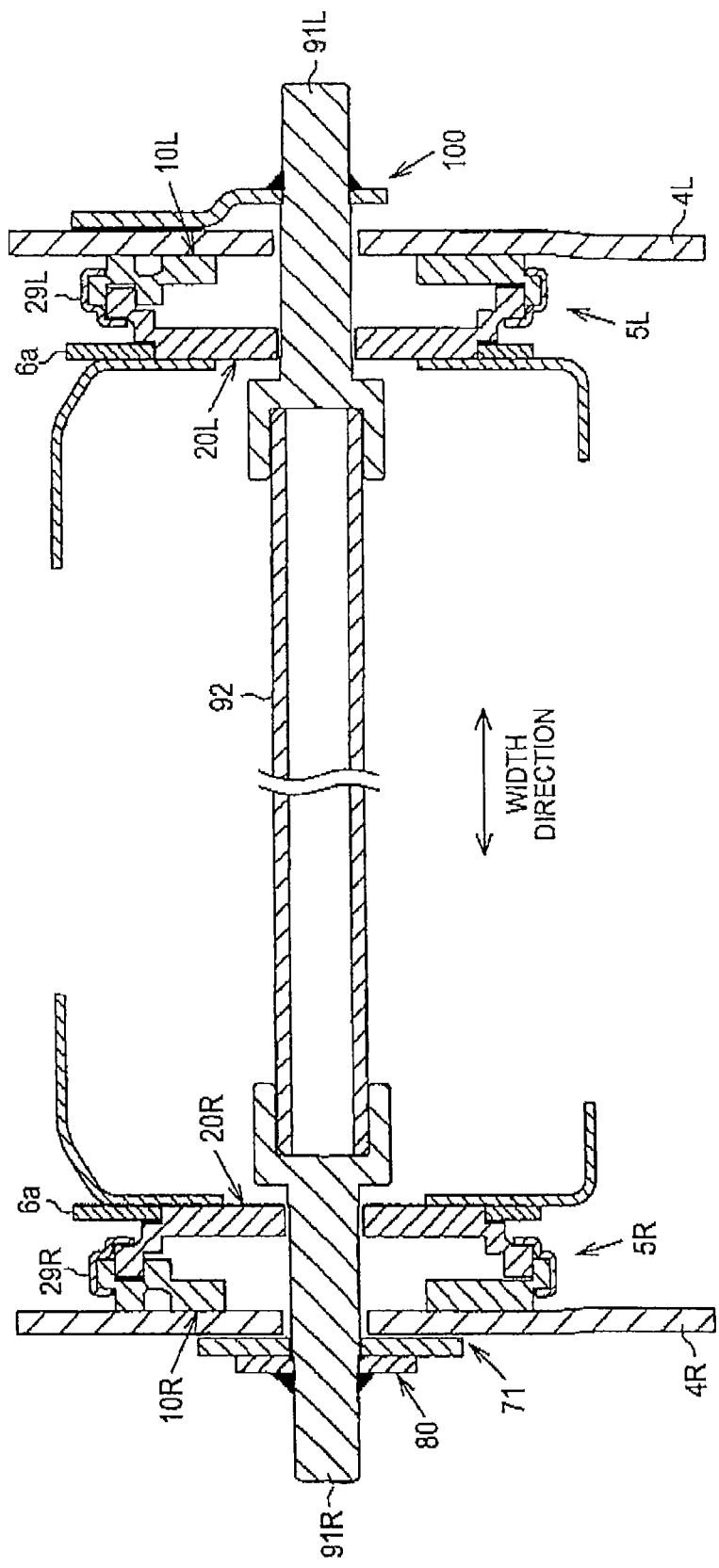
FIG. 2 is a cross-sectional view taken along line II-II in FIG. 1.

As illustrated in FIG. 2, the locking mechanism 5L includes disk-shaped first and second members 10L and 20L. The first member 10L is fixedly attached to an inner side surface (seat cushion side) of the lower plate 4L by welding being concentric with the hinge axis 91L (connection shaft 92), and the second member 20L is fixedly attached to an outer side surface (seatback side) of a lower end portion of the back side frame 6a by welding being concentric with the hinge axis 91L (connection shaft 92) in the same manner. These first member 10L and second member 20L are retained not to fall out in an axis line direction by a ring-shaped holder 29L formed of a metal plate.

Figure 4:
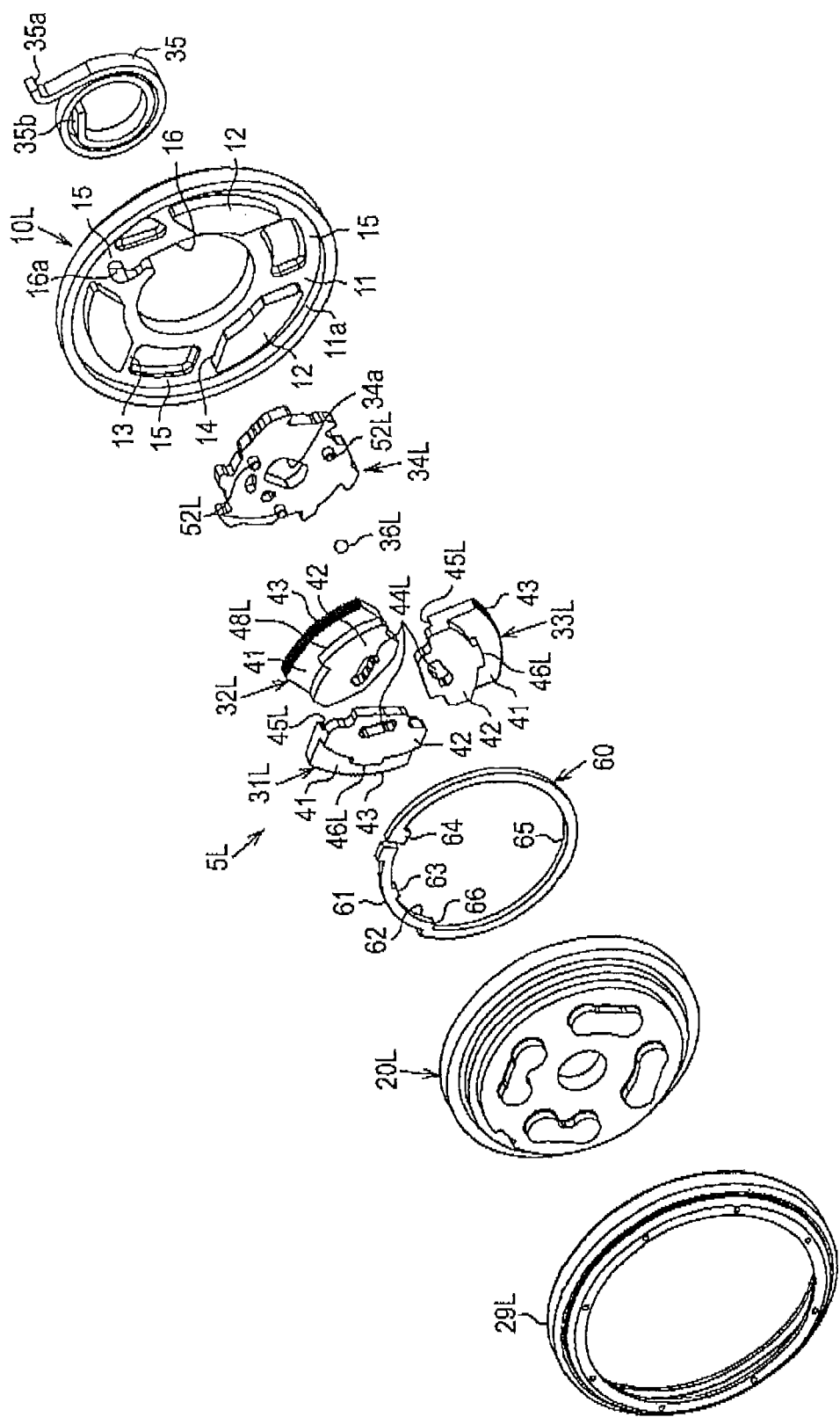
FIG. 4 is an exploded perspective view illustrating a locking mechanism.
Figure 5A:
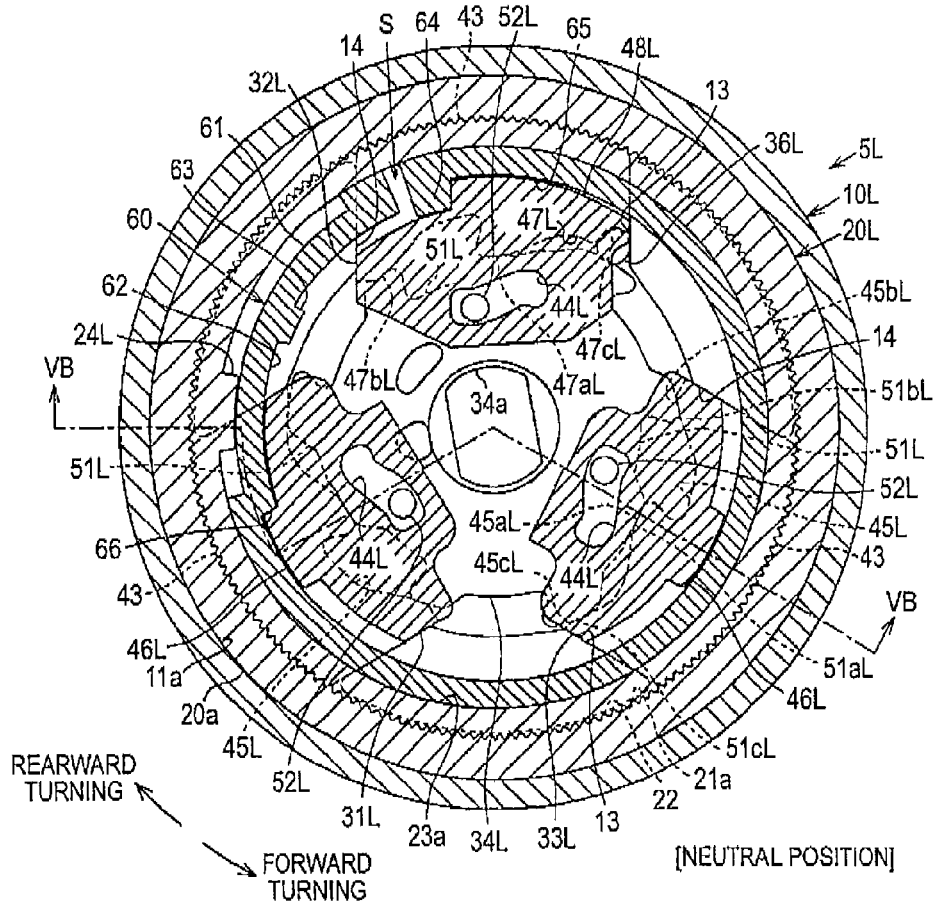
FIG. 5A is a cross-sectional view of a locking mechanism in a locked state taken along line VA-VA in FIG. 1.
Figure 5B:
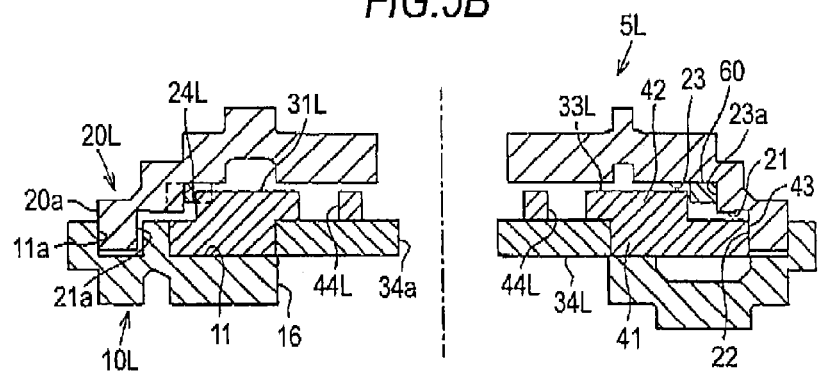
FIG. 5B is a cross-sectional view taken along line VB-VB in FIG. 5A.

As illustrated in FIG. 4 and FIGS. 5A and 5B, the first member 10L is molded by half blanking of the metal plate, for example, and has a circular concave portion 11 open toward the second member 20L side. The concave portion 11 has an inner peripheral surface 11a about the axis line of the hinge axis 91L (first member 10L and the second member 20L).

Inside the concave portion 11 of the first member 10L, three of approximately fan-shaped convex portions 12 are disposed on a circumference at intervals of an equivalent angle. Each of the convex portions 12 forms guide walls 13 and 14 on both sides thereof in the circumferential direction. The guide walls 13 and 14 respectively on the adjacent convex portions 12 facing each other in the circumferential direction are extended in parallel with each other in the radial direction about the axis line, and associated with a bottom surface of the concave portion 11 to form approximately U-shaped groove-like guide grooves 15 extended in the radial direction about the axis line on the circumference at intervals of an equivalent angle. These guide grooves 15 communicate with each other in a central portion exhibiting an approximately Y shape in its entirety.

In addition, an approximately circular penetration hole 16 is formed in the central portion where three of the guide grooves 15 of the first member 10L communicate with each other. A locking hole 16a is formed in this penetration hole 16 outwardly in a predetermined angle position in the radial direction.

As illustrated in FIGS. 5A and 5B, the second member 20L is molded by half blanking of the metal plate, for example, and has an outer peripheral surface 20a of which an outer diameter is equivalent to an inner diameter of the inner peripheral surface 11a of the first member 10L while having a circular concave portion 21 open toward the first member 10L side, Inner teeth 22 are formed across the overall periphery of an inner peripheral surface 21a about the axis line of the hinge axis 91L (first member 10L and second member 20L) of the concave portion 21. In addition, on the inner peripheral side of the concave portion 21, an approximately circular accommodation concave portion 23 is formed to be concentric with the concave portion 21. On an inner peripheral surface 23a of the accommodation concave portion 23, an approximately arc-shaped engagement protrusion portion 24L protruding toward the center at a predetermined angle position is formed. The second member 20L fits into the outer peripheral surface 20a thereof so as to be in slide contact with the inner peripheral surface 11a of the first member 10L.

As illustrated in FIG. 4, outer peripheral portions of the first member 10L and the second member 20L are in a state of being fit by the inner peripheral surface 11a of the first member 10L and the outer peripheral surface 20a of the second member 20L, and the holder 29L is mounted thereon. The first member 10L and the second member 20L are retained not fall out in the axis line direction in a state where the relative turning is allowed by this holder 29L.

In addition, three of first poles 31L, 32L and 33L; a cam 34L; a coil spring 35 as a urging member; a pressing member 36L; and a memory ring 60 are installed between the first member 10L and the second member 20L.

The first poles 31L to 33L are mounted on a position between adjacent two guide walls 13 and 14 to be disposed at intervals of an equivalent angle in the circumferential direction about the axis line. The first poles 31L to 33L are made by forging and the like of a steel material and include a first block 41 and a second block 42 which are formed in different levels from each other in the axis line direction. In the first poles 31L to 33L, in the radial direction the first block 41 is disposed on the inner peripheral surface 21a side of the second member 20L, and the second block 42 is disposed on an axial center of the second member 20L. Both width end portions of these first block 41 and the second block 42 match each other and formed to be parallel to each other in straight lines.

Outer teeth 43 enabled to mesh with the inner teeth 22 of the second member 20L are formed in an arc-shaped outer end (end surface facing inner teeth 22 of second member 20L) of the first block 41. In the second block 42, a first pole side groove cam portion 44L penetrating in a plate thickness direction is opened in an approximately central portion in the width direction.

Then, as illustrated in FIG. 5A, both width end portions of the first poles 31L to 33L are guided to move in the radial direction about the axis line in an aspect of slide contact with both of the guide walls 13 and 14. The first poles 31L to 33L move back and forth in the radial direction along the both of the guide walls 13 and 14, thereby meshing or releasing (disengaging) the outer teeth 43 with respect to the inner teeth 22.

Here, in the two first poles 31L and 33L, inner surface cam portions 45L engaging with an outer peripheral portion of the cam 34L are formed in an inner end (rear surface which is end surface facing opposite to outer end) of the first block 41. The inner surface cam portions 45L formed in step difference portions of the first poles 31L and 33L include three of pole side cam surfaces 45aL, 45bL and 45cL on the central portion of the first poles 31L and 33L and on both sides thereof in the circumferential direction. These pole side cam surfaces 45aL, 45bL and 45cL face the outer peripheral portion (cam surface 51L) of the cam 34L. The pole side cam surfaces 45aL, 45bL and 45cL are configured to include cam surfaces with an oblique surface which approaches the outer peripheral portion of the cam 34L when locking is in operation in accordance with turning in a counterclockwise turning direction (hereinafter, also referred to as "locking turning direction") as shown in the drawing, of the cam 34L.

In addition, in the first poles 31L and 33L, an arc-shaped first pole side engagement protrusion portion 46L protrudes on an outer side of the second block 42 in the radial direction so as to face the accommodation concave portion 23 (inner peripheral surface 23a) in the radial direction. The first pole side engagement protrusion portion 46L is disposed on the central portion of the first poles 31L and 33L in the circumferential direction.

Meanwhile, in one remaining first pole 32L, an inner surface cam portion 47L engaging with the outer peripheral portion of the cam 34L is formed in the inner end (rear surface which is end surface opposite to outer end) of the first block 41. The inner surface cam portion 47L formed in the step difference portion of the first pole 32L includes pole side cam surfaces 47aL and 47bL identical to the pole side cam surfaces 45aL and 45bL, and a pole side cam surface 47cL replacing the pole side cam surface 45cL. The pole side cam surface 47cL faces the outer peripheral portion (cam surface 51L) of the cam 34L and is molded to form a wedge-shaped space between itself and the guide wall 13 facing in the circumferential direction. In other words, the guide wall 13 and the pole side cam surface 47cL are molded to have an interval which becomes outwardly narrower in the radial direction.

In addition, in the first pole 32L, an arc-shaped first pole side engagement protrusion portion 48L protrudes on an outer side of the second block 42 in the radial direction so as to face the accommodation concave portion 23 (inner peripheral surface 23a). This first pole side engagement protrusion portion 48L is disposed in the portion on a preceding side in a clockwise turning direction of the first pole 32L in the circumferential direction as shown in the drawing.

The cam 34L is disposed on the inner peripheral sides of the first poles 31L to 33L which become an inside of the concave portion 21 of the second member 20L to be turnable about the axis line of the second member 20L and the like. In other words, the cam 34L is made of the plate-shaped steel plate by pressing and the like and basically has a flat plate shape without a step difference. Then, an approximately oval-shaped cam fitting hole 34a penetrated in the plate thickness direction along the axis line is formed in the central portion of the cam 34L. The cam 34L is integrally turnable with the hinge axis 91L and the like on the inner peripheral side of the first poles 31L to 33L (first block 41) by fitting and inserting a tip portion of the hinge axis 91L to the cam fitting hole 34a.

The cam 34L has three sets of cam surface 51L on the circumference of the outer peripheral portion thereof at intervals of an equivalent angle. Each of the cam surfaces 51L includes three pressing cam portions 51aL, 51bL and 51cL respectively in the central portion of the circumferential direction and on both sides in the circumferential direction. The two pressing cam portions 51aL and 51bL among these are enabled to abut on the two pole side cam surfaces 45aL and 45bL facing the first poles 31L and 33L or the two pole side cam surfaces 47aL and 47bL facing the first pole 32L. These two pressing cam portions 51aL and 51bL press the corresponding pole side cam surfaces 45aL, 45bL, 47aL and 47bL when the cam 34L turns in the locking turning direction.

Meanwhile, the one remaining pressing cam portion 51cL among these is enabled to abut on the remaining pole side cam surface 45cL facing the first poles 31L and 33L, and presses the corresponding pole side cam surface 45cL when the cam 34L turns in the locking turning direction. Otherwise, the pressing cam portion 51cL accommodates a sphere-shaped pressing member 36L in the above-described wedge-shaped space formed between the pole side cam surface 47cL and the guide wall 13 of the first pole 32L. The pressing member 36L comes into slide contact with the pole side cam surface 47cL and the guide wall 13 and is movable in the radial direction. The pressing cam portion 51cL can circumscribe the pressing member 36L and presses the pressing member 36L when the cam 34L turns in the locking turning direction.

In other words, when the cam 34L turns in the locking turning direction, the pressing cam portions 51aL to 51cL are respectively held in an angle position to abut on (be in pressed contact with) the pole side cam surfaces 45aL to 45cL of the first poles 31L and 33L, and the pole side cam surfaces 47aL and 47bL and the pressing member 36L of the first pole 32L.

The pressing member 36L comes into pressed contact with each of the guide wall 13 and the pole side cam surface 47cL when pressed by the cam 34L. In this case, a pressing force of the pressing member 36L is decomposed into a component force of a movement direction component (radial direction component) of the first pole 32L and the component force of a width direction component (circumferential direction component) of the pole which is a direction orthogonal to the movement direction. Then, a force in the circumferential direction in which the width end portion of the first pole 32L and the guide wall 13 are separated away from each other is generated due to a wedge effect by the pressing component force of the width direction component of this first pole 32L, thereby filling a gap between the width end portion of the first pole 32L and the guide wall 14. Accordingly, rattling of the seatback with respect to the seat cushion is prevented.

Meanwhile, when the unlocking is in operation in accordance with the turning in the clockwise turning direction (hereinafter, also referred to as "unlocking turning direction") of the cam 34L as shown in the drawing, the pressing cam portions 51aL and 51bL are separated away from the pole side cam surfaces 45aL and 45bL of the first poles 31L and 33L or the pole side cam surfaces 47aL and 47bL of the first pole 32L. In addition, the pressing cam portion 51cL is separated away from the pole side cam surface 45cL of the first poles 31L and 33L, or separated away from the pressing member 36L.

As illustrated in FIG. 4, a plurality (three) of engagement protrusions 52L are provided to protrude on a side surface of the cam 34L at intervals on the circumference. These engagement protrusions 52L are inserted into the first pole side groove cam portion 44L of the first poles 31L to 33L to be engaged therewith. The first pole side groove cam portion 44L and the engagement protrusions 52L are operated to move the first poles 31L to 33L inward in the radial direction by the turning of the cam 34L in the unlocking turning direction.

In other words, as illustrated in FIG. 5A, basically, the first pole side groove cam portion 44L is molded to gradually move outward in the radial direction as it becomes closer to the cam 34L in the unlocking turning direction (clockwise turning direction as shown in the drawing). Accordingly, in accordance with the turning of the cam 34L in the unlocking turning direction, the first poles 31L to 33L of which the first pole side groove cam portion 44L is pressed by the engagement protrusion 52L are drawn inward in the radial direction.

As illustrated in FIG. 4, the coil spring 35 urges to turn the cam 34L in the locking turning direction so as to cause the first poles 31L to 33L to engage with the second member 20L in the radial direction and is accommodated inside the penetration hole 16 of the first member 10L. The coil spring 35 is formed, for example, by winding an approximately flat rectangular wire rod in a predetermined coil shape and mounted on a position between the first member 10L and the cam 34L. In other words, an outer end portion 35a of the coil spring 35 is locked by the locking hole 16a, and an inner end portion 35b is locked by a locking portion (not illustrated) provided to protrude on an end surface of the cam 34L.

Then, the cam 34L is urged to turn in the locking turning direction (counterclockwise turning direction in FIG. 5A) with respect to the first member 10L due to the urging force by the coil spring 35, presses the first poles 31L to 33L outward in the radial direction through the cam surface 51L, and causes each of outer teeth 43 to respectively mesh with the inner teeth 22 of the second member 20L.

As illustrated in FIGS. 5A and 5B, the memory ring 60 has a ring shape disconnected at one place and is enabled to contract in diameter by elastically deforming inward in the radial direction while enabled to increase in diameter by elastically deforming outward in the radial direction. The memory ring 60 causes its disconnection portion S to be positioned between the first pole side engagement protrusion portions 46L and 48L of the adjacent first poles 31L and 32L. In a state of being decreased in diameter, the memory ring 60 is accommodated to be able to slide that is, to be turnable in the circumferential direction with respect to the accommodation concave portion 23 of the second member 20L.

In the memory ring 60, a portion near the first pole 31L side interposing the disconnection portion S therebetween is relatively contracted in diameter, and arc-shaped outer peripheral surface and inner peripheral surface of the portion form a turning allowance portion 61 and a first unlocking engagement surface 62. In addition, the memory ring 60 has an arc-shaped fixed point restoration protrusion portion 63 protruding inward in the radial direction from the central portion in the first unlocking engagement surface 62 in the circumferential direction.

Furthermore, the memory ring 60 forms an engaged portion 64 by causing the end portion near the first pole 32L (first pole side engagement protrusion portion 48L) side to protrude inward in the radial direction interposing the disconnection portion S. This engaged portion 64 is set to overlap with the first pole side engagement protrusion portion 48L at a position in the radial direction at all times regardless of a position of the first pole 32L moving along the guide groove 15 in the radial direction. Therefore, in the memory ring 60, when the engaged portion 64 is adjacent to the first pole side engagement protrusion portion 48L, the turning in the clockwise turning direction as shown in the drawing with respect to the first pole 32L, that is, the turning in the clockwise turning direction as shown in the drawing with respect to the first member 10L is regulated at all times.

An arc-shaped inner peripheral surface interposed between the first unlocking engagement surface 62 and the engaged portion 64 of the memory ring 60 forms a first locking engagement surface 65 with a larger inner diameter than the inner diameter of the first unlocking engagement surface 62. A border position (step difference) between the first unlocking engagement surface 62 and the first locking engagement surface 65 is set to overlap with the first pole side engagement protrusion portion 46L, which is positioned on the first locking engagement surface 65, in a position in the radial direction at all times, for example, when the first pole 31L moves outward in the radial direction along the guide groove 15, that is, when the outer teeth 43 of the first pole 31L mesh with the inner teeth 22. Therefore, in this case, in the memory ring 60, the turning in the counterclockwise turning direction as shown in the drawing with respect to the first pole 31L, that is, the turning in the counterclockwise turning direction as shown in the drawing with respect to the first member 10L is set to be regulated at all times. The step difference-shaped border position between the first unlocking engagement surface 62 and the first locking engagement surface 65 forms a regulation surface 66.

Figure 6:
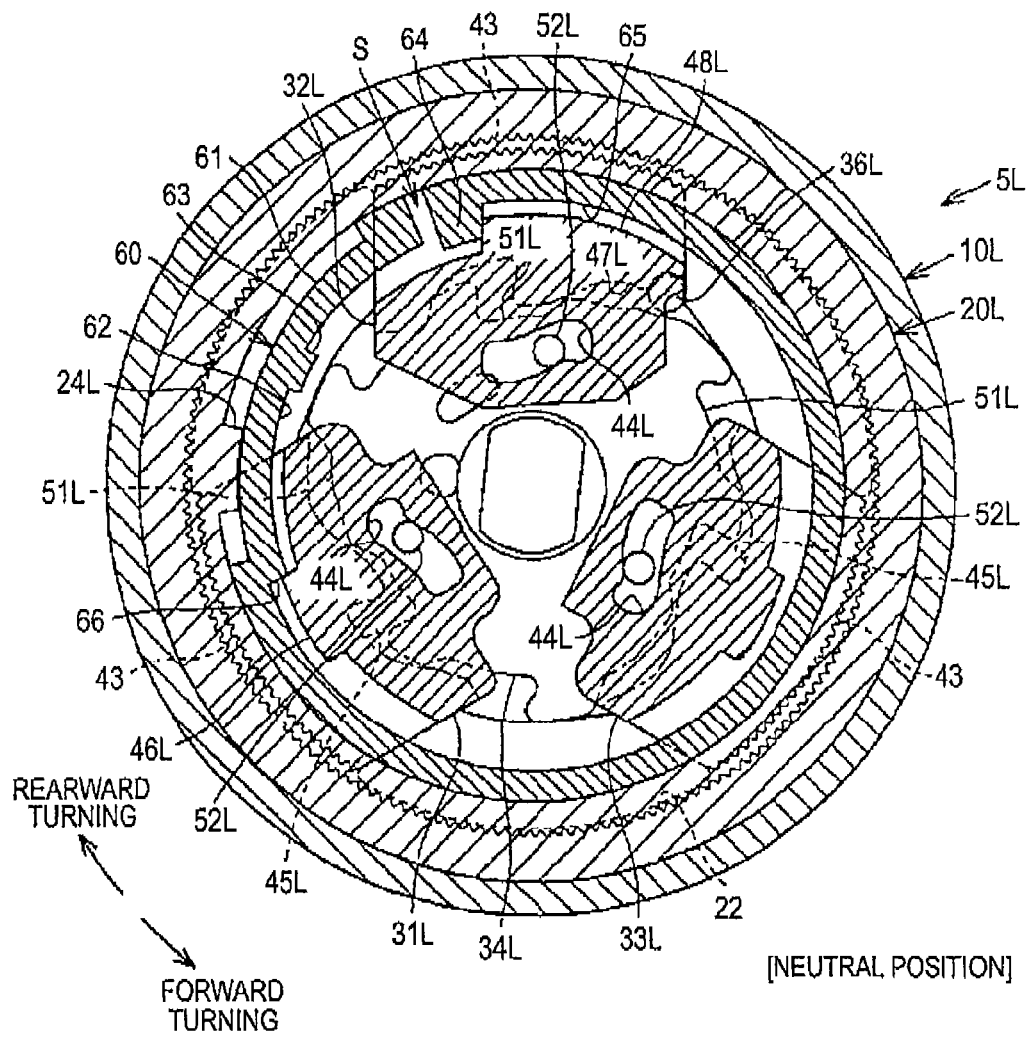
FIG. 6 is a cross-sectional view illustrating a state of a first unlocking operation of the locking mechanism at a neutral position.

Meanwhile, as illustrated in FIG. 6, when the first pole 31L moves inward in the radial direction along the guide groove 15 in accordance with the unlocking operation of the cam 34L, that is, when the outer teeth 43 of the first pole 31L are out of mesh from the inner teeth 22, the regulation surface 66 is set to partially overlap with the first pole side engagement protrusion portion 46L which is positioned on the first locking engagement surface 65 in a position in the radial direction at all times. Therefore, in this case as well, in the memory ring 60, the turning in the counterclockwise turning direction as shown in the drawing with respect to the first pole 31L, that is, the turning in the counterclockwise turning direction as shown in the drawing with respect to the first member 10L is set to be regulated at all times by being half-engaged in the radial direction with respect to the first pole side engagement protrusion portion 46L in the regulation surface 66. The unlocking operation of the cam 34L in this case is also referred to as a first unlocking operation.

In other words, when in a state where the outer teeth 43 and the inner teeth 22 of the first poles 31L to 33L mesh with each other, or in a state where the outer teeth 43 and the inner teeth 22 of the first poles 31L to 33L are out of mesh from each other in accordance with the first unlocking operation of the cam 34, the turning of the memory ring 60 with respect to the first member 10L is regulated at all times.

Here, an engagement protrusion portion 24L provided in the second member 20L is disposed in the turning allowance portion 61 in the circumferential direction. Therefore, when the turning of the memory ring 60 with respect to the first member 10L is regulated, the engagement protrusion portion 24L (second member 20L) is allowed to turn within a range of the turning allowance portion 61. FIG. 5A and FIG. 6 illustrate a state where the seatback is in the neutral position.

Figure 7:
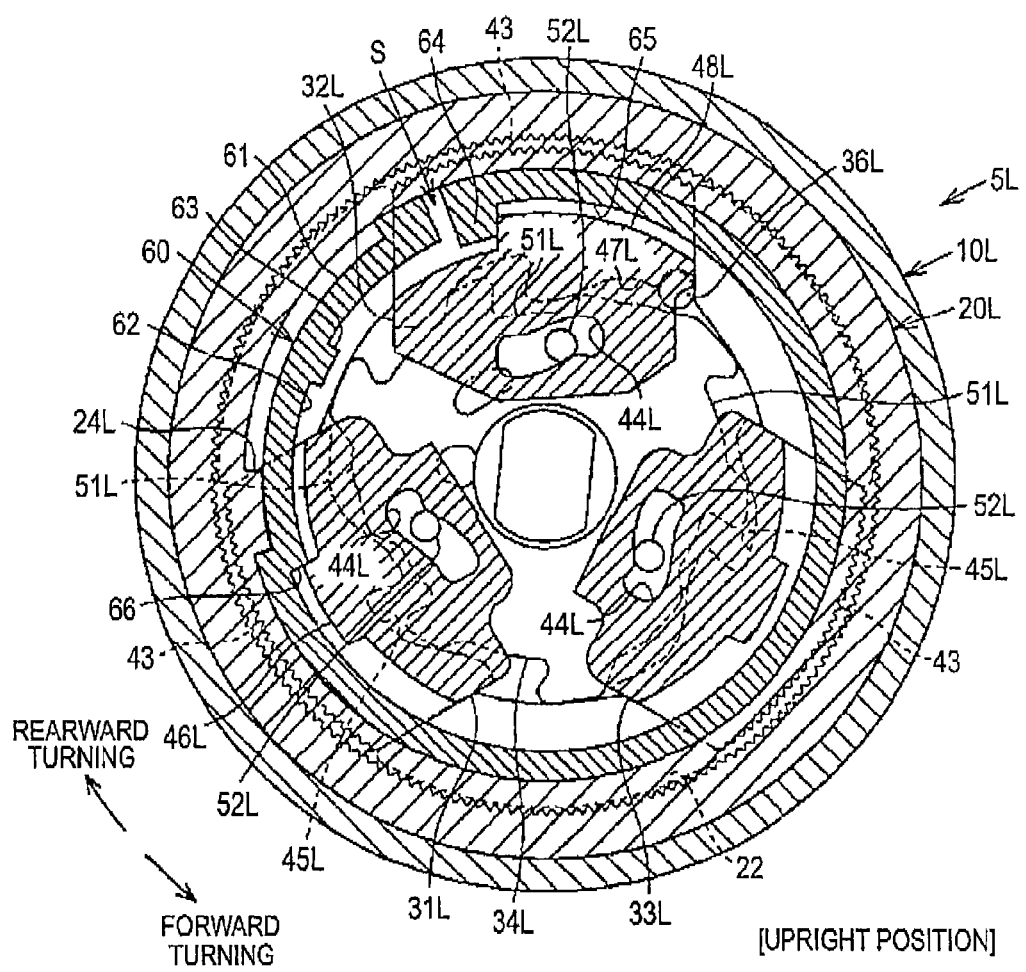
FIG. 7 is another cross-sectional view illustrating a state of the first unlocking operation of the locking mechanism at an upright position.

Then, as illustrated in FIG. 7, the second member 20L which turns in the counterclockwise direction as shown in the drawing with respect to the memory ring 60 (and the first member 10L) in a state where the outer teeth 43 and the inner teeth 22 are out of mesh from each other is regulated in its turning by the engagement protrusion portion 24L reaching an end edge of the turning allowance portion 61. The turning of the second member 20L with respect to the first member 10L in this case causes the seatback to incline forward with respect to the seat cushion, and hereinafter, it is also referred to as "forward turning". Therefore, the state where the engagement protrusion portion 24L reaches the end edge of the turning allowance portion 61 in the forward turning of the second member 20L denotes that the seatback is in the upright position.

Figure 8:
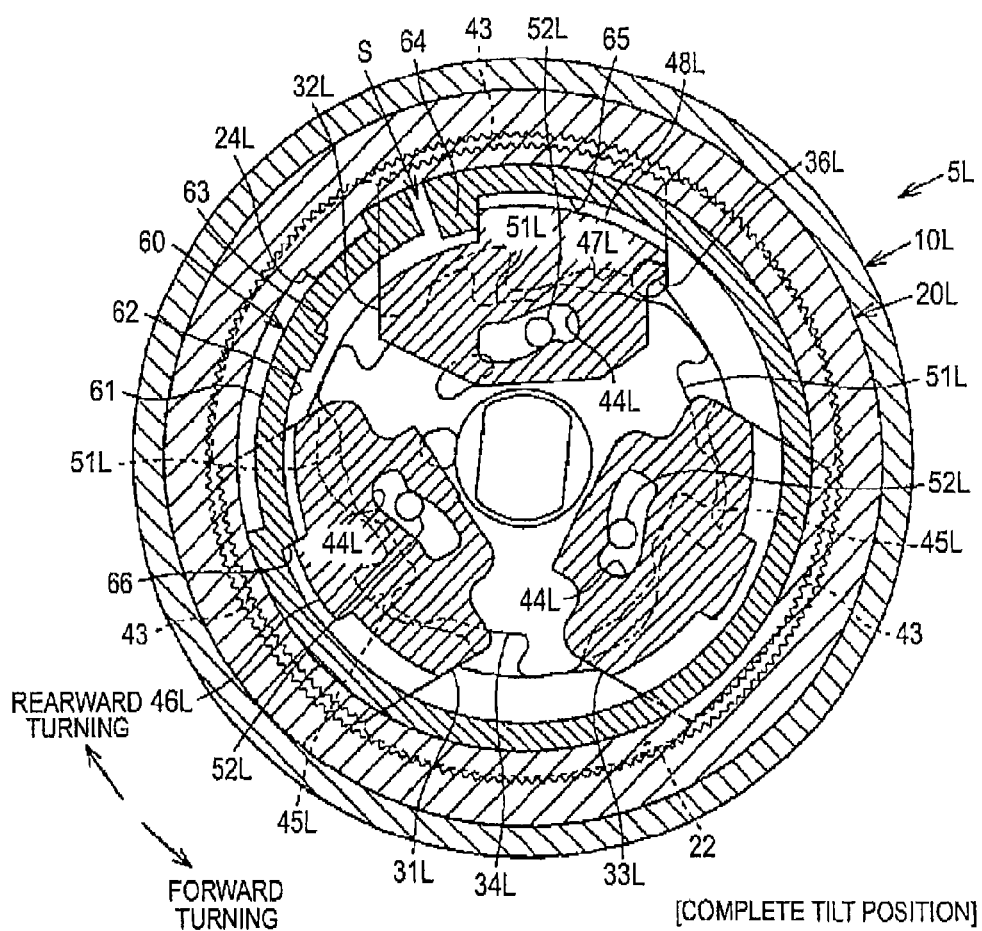
FIG. 8 is another cross-sectional view illustrating a state of the first unlocking operation of the locking mechanism at a complete tilt position.

In addition, as illustrated in FIG. 8, the second member 20L which turns in the clockwise direction as shown in the drawing with respect to the memory ring 60 (and the first member 10L) in the state where the outer teeth 43 and the inner teeth 22 are out of mesh from each other is regulated in its turning by the engagement protrusion portion 24L reaching an end edge of the turning allowance portion 61. The turning of the second member 20L with respect to the first member 10L in this case causes the seatback to incline rearward with respect to the seat cushion, and hereinafter, it is also referred to as "rearward turning". Therefore, the state where the engagement protrusion portion 24L reaches the end edge of the turning allowance portion 61 in the rearward turning of the second member 20L denotes that the seatback is in the complete tilt position.

Figure 9:
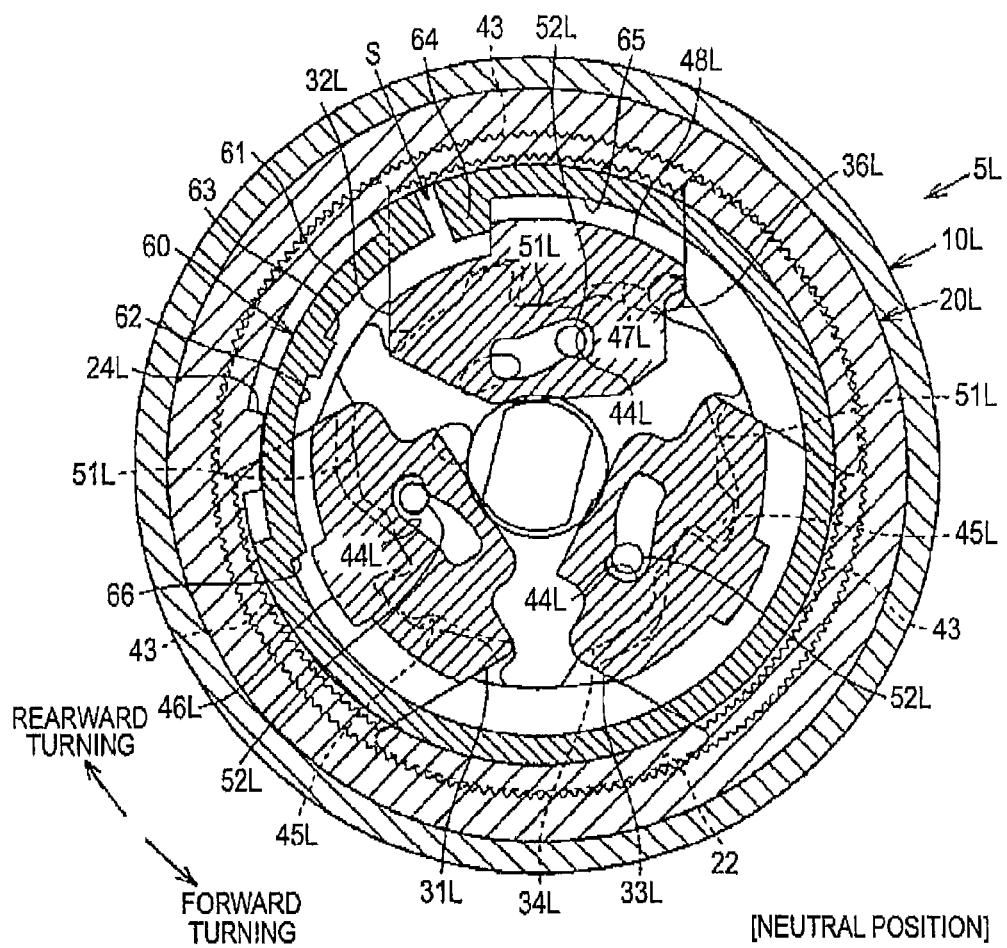
FIG. 9 is a cross-sectional view illustrating a state of a second unlocking operation of the locking mechanism at the neutral position.

Meanwhile, as illustrated in FIG. 9, when the first pole 31L further moves inward in the radial direction along the guide groove 15 in accordance with the unlocking operation of the cam 34L, the regulation surface 66 is set not to overlap with the first pole side engagement protrusion portion 46L in a position in the radial direction. Therefore, in this case, the memory ring 60 is disengaged from the first pole side engagement protrusion portion 46L in the radial direction on the regulation surface 66, and thus, the turning in the counterclockwise turning direction as shown in the drawing with respect to the first pole 31L, that is, the turning in the counterclockwise turning direction as shown in the drawing with respect to the first member 10L is set to be allowed. At the same time, the memory ring 60 becomes integrally turnable with the second member 20L by frictionally engaging with the second member 20L due to the elastic deformation of itself.

Therefore, if the second member 20L starts the forward turning with respect to the first member 10L in this state, the memory ring 60 starts to integrally turn while maintaining the relative positions with the second member 20L. Then, accordingly, the first pole side engagement protrusion portion 46L which is positioned on the regulation surface 66 is mounted on the first unlocking engagement surface 62 from the first locking engagement surface 65. In this case, the first pole 31L in a state of being out of mesh from the inner teeth 22 is regulated in moving outward in the radial direction by the first unlocking engagement surface 62 on which the first pole side engagement protrusion portion 46L is mounted, thereby maintaining the out of mesh state. The same can be applied to the other first poles 32L and 33L which connectedly move through the cam 34L. The unlocking operation of the cam 34L in this case is also referred to as a second unlocking operation.

Figure 10:
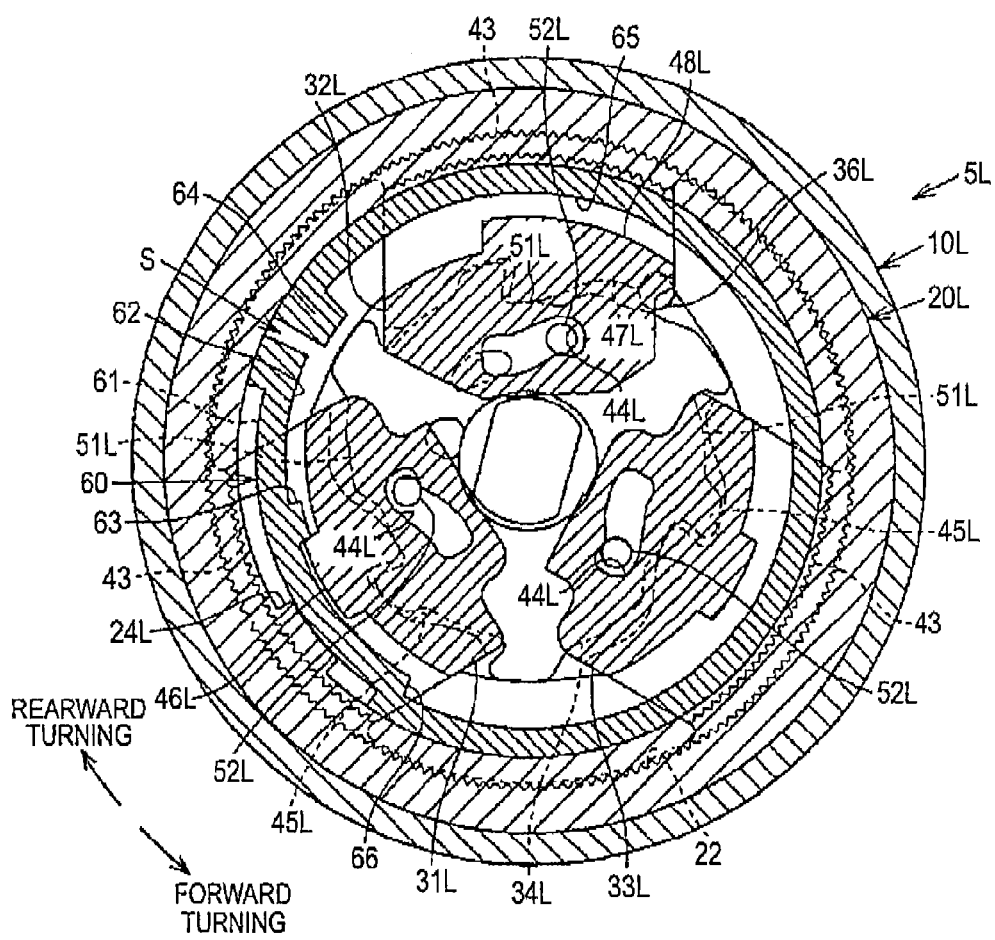
FIG. 10 is a cross-sectional view illustrating a state of the locking mechanism when tilting forward from the neutral position.

Here, as illustrated in FIG. 10, in a case where the second member 20L turns forward together with the memory ring 60 when the seatback is in the neutral position, a turning amount to the turning position corresponding to the forward tilt position of the seatback becomes relatively small. Therefore, in a stage where the first pole side engagement protrusion portion 46L which is mounted on the first unlocking engagement surface 62 reaches the fixed point restoration protrusion portion 63, the seatback is inclined forward passing by the forward tilt position. In other words, in a state where the seatback reaches the forward tilt position, the first pole side engagement protrusion portion 46L is positioned closer to the regulation surface 66 side than the fixed point restoration protrusion portion 63 of the first unlocking engagement surface 62.

Therefore, if the seatback is raised up to cancel the forward tilt, the second member 20L turns rearward together with the memory ring 60, and thus, the first pole 31L is enabled to engage with the inner teeth 22 at the moment the first locking engagement surface 65 reaches the first pole side engagement protrusion portion 46L. The same can be applied to the other first poles 32L and 33L which connectedly move through the cam 34L. Then, the first poles 31L to 33L mesh with the inner teeth 22, thereby regulating the rearward turning of the second member 20L as well as the memory ring 60 not to turn therebeyond. The turning position of the second member 20L with respect to the first member 10L in this case matches the turning position when the second member 20L starts to turn together with the memory ring 60 in accordance with the second unlocking operation of the cam 34L. In other words, the angle position in which the rearward inclining of the seatback is regulated matches the original angle position (hereinafter, also referred to as "memory position") in which the seatback starts to incline forward in accordance with the second unlocking operation of the cam 34L.

Figure 11:
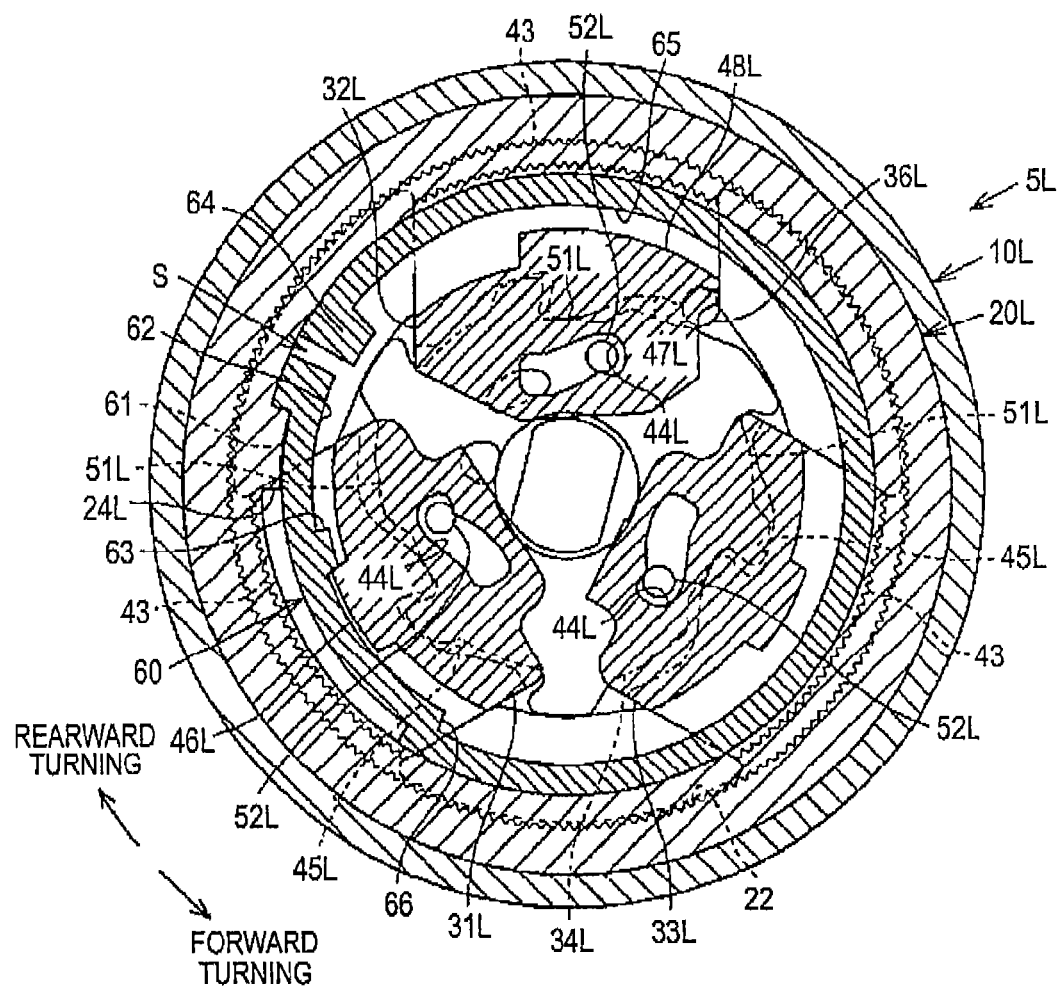
FIG. 11 is another cross-sectional view illustrating a state of the locking mechanism when tilting forward from the complete tilt position.

Meanwhile, as illustrated in FIG. 11, in a case where the second member 20L turns forward together with the memory ring 60 when the seatback is in the complete tilt position, since the turning amount to the turning position corresponding to the forward tilt position of the seatback becomes relatively greater, the seatback does not reach the forward tilt position even if the first pole side engagement protrusion portion 46L which is mounted on the first unlocking engagement surface 62 reaches the fixed point restoration protrusion portion 63. In this case, the memory ring 60 engages with the first pole side engagement protrusion portion 46L in the radial direction in the fixed point restoration protrusion portion 63, thereby regulating the turning in the counterclockwise turning direction as shown in the drawing with respect to the first pole 31L, that is, the turning in the counterclockwise turning direction as shown in the drawing with respect to the first member 10L again. That is, the turning of the memory ring 60 with respect to the first member 10L is regulated at all times, thereby enabling the turning with respect to the second member 20L. In other words, even if the seatback is in the stage of reaching the forward tilt position, the memory ring 60 still maintains the abutment state between the fixed point restoration protrusion portion 63 and the first pole side engagement protrusion portion 46L.

Therefore, if the seatback is raised up to cancel the forward tilt, the second member 20L turns rearward together with the memory ring 60, and thus, the first pole 31L is enabled to mesh with the inner teeth 22 at the moment the first locking engagement surface 65 reaches the first pole side engagement protrusion portion 46L. The same can be applied to the other first poles 32L and 33L which connectedly move through the cam 34L. Then, the first poles 31L to 33L mesh with the inner teeth 22, thereby regulating the rearward turning of the second member 20L as well as the memory ring 60 not to turn therebeyond.

The turning amount of the second member 20L with respect to the first member 10L in this case matches a predetermined angle corresponding to an angle between the regulation surface 66 and the fixed point restoration protrusion portion 63. That is, the angle position in which the rearward inclining of the seatback is regulated matches the angle position which is inclined rearward from the forward tilt position by a predetermined angle. The above-described fixed point restoration position of the seatback corresponds to the angle position to be restored at this time. In other words, if the turning amount of the second member 20L with respect to the first member 10L exceeds the predetermined angle when the seatback is inclined forward to the forward tilt position, that is, in a case where the angle position when the seatback starts the forward tilt is within a range from the fixed point restoration position to the complete tilt position and included in not-ready-for-seating region, the seatback is set to the fixed point restoration position when raised up to cancel the forward tilt. In this manner, when the forward inclining is started from the not-ready-for-seating region for a special seating posture, the seatback is stored in the ready-for-seating region in accordance with canceling the forward tilt, thereby enhancing operability.

Next, the locking mechanism 5R on the opposite side will be described.

As illustrated in FIG. 2, the locking mechanism 5R includes disk-shaped first and second members 10R and 20R. The first member 10R is fixedly attached to an inner side surface (seat cushion side) of the lower plate 4R by welding being concentric with the hinge axis 91R (connection shaft 92), and the second member 20R is fixedly attached to an outer side surface (seatback side) of a lower end portion of the back side frame 6a by welding being concentric with the hinge axis 91R (connection shaft 92) in the same manner. These first member 10R and second member 20R are retained not to fall out in an axis line direction by a ring-shaped holder 29R formed of a metal plate.

Figure 12:
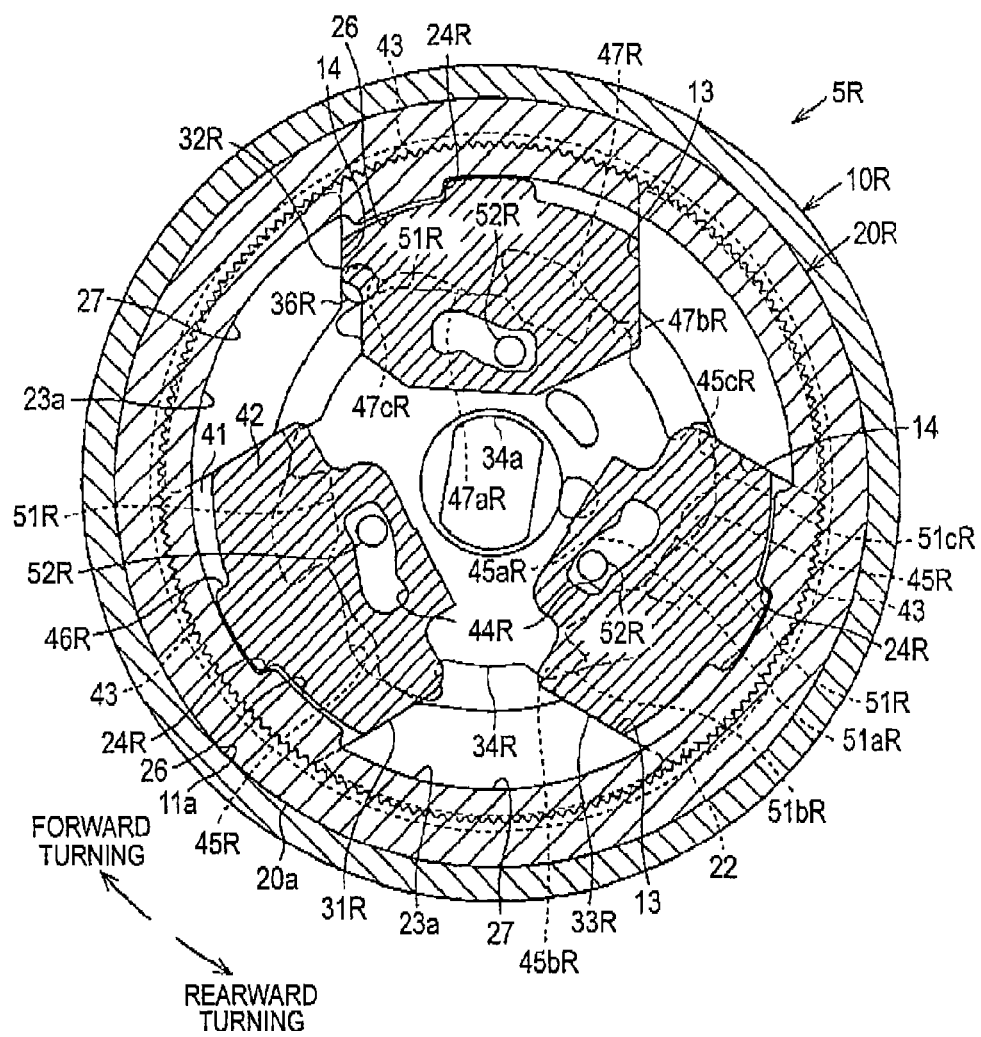
FIG. 12 is another cross-sectional view of the locking mechanism in the locked state taken along line XII-XII in FIG. 1.

As illustrated in FIG. 12, the first member 10R is molded by the half blanking of the metal plate, for example, and has approximately the same structure as the first member 10L except for being bilaterally symmetric.

The second member 20R is molded by the half blanking of the metal plate, for example, and has approximately the same structure as the second member 20L except being bilaterally symmetric. On the inner peripheral surface 23a of the accommodation concave portion 23, a plurality (three) of approximately arc-shaped engagement protrusion portions 24R disposed at intervals by an equivalent angle protrude toward the center. The second member 20R forms a second unlocking engagement surface 26 on an inner peripheral surface of the engagement protrusion portion 24R and forms a second locking engagement surface 27 on the inner peripheral surface 23a between the adjacent engagement protrusion portion 24R.

In addition, three of second poles 31R, 32R and 33R; a cam 34R; a pressing member 36R; and the coil spring 35 are installed between the first member 10R and the second member 20R. The second poles 31R to 33R are made by forging and the like of the steel material and have approximately the same structures as that of each of the first poles 31L to 33L except being bilaterally symmetric. Then, in the second block 42, a second pole side groove cam portion 44R penetrated in the plate thickness direction is opened in an approximately central portion in the width direction.

In addition, in the second poles 31R to 33R, an arc-shaped second pole side engagement protrusion portion 46R protrudes on an outer side of the second block 42 in the radial direction so as to face the accommodation concave portion 23 (inner peripheral surface 23a). The second pole side engagement protrusion portion 46R is disposed in the central portion of the second poles 31R to 33R in the circumferential direction.

Here, in the two second poles 31R and 33R, inner surface cam portions 45R engaging with an outer peripheral portion of the cam 34R are formed in an inner end (rear surface which is an end surface facing opposite to outer end) of the first block 41. The inner surface cam portions 45R formed in step difference portions of the second poles 31R and 33R include three of pole side cam surfaces 45aR, 45bR and 45cR on the central portion of the second poles 31R and 33R and on both sides thereof in the circumferential direction. These pole side cam surfaces 45aR, 45bR and 45cR face the outer peripheral portion (cam surface 51R) of the cam 34R. The pole side cam surfaces 45aR, 45bR and 45cR are configured to include cam surfaces with the oblique surface which approaches the outer peripheral portion of the cam 34R when locking is in operation in accordance with turning in a counterclockwise turning direction (hereinafter, also referred to as "locking turning direction") as shown in the drawing, of the cam 34R.

Meanwhile, in the one remaining second pole 32R, an inner surface cam portion 47R engaging with the outer peripheral portion of the cam 34R is formed in the inner end (rear surface which is an end surface facing opposite to outer end) of the first block 41. The inner surface cam portion 47R formed in the step difference portion of the second pole 32R includes pole side cam surfaces 47aR and 47bR identical to the pole side cam surfaces 45aR and 45bR, and a pole side cam surface 47cR replacing the pole side cam surface 45cR. The pole side cam surface 47cR faces the outer peripheral portion (cam surface 51R) of the cam 34R and is molded to form the wedge-shaped space between itself and the guide wall 13 facing in the circumferential direction. In other words, the guide wall 13 and the pole side cam surface 47cR are molded to have an interval which becomes outwardly narrower in the radial direction.

The cam 34R is made of the plate-shaped steel plate by pressing and the like and has approximately the same structure as that of the cam 34L except for being bilaterally symmetric. The cam 34R is integrally turnable with the hinge axis 91R and the like on the inner peripheral side of the second poles 31R to 33R by fitting and inserting a tip portion of the hinge axis 91R to the cam fitting hole 34a. In other words, the cams 34L and 34R (locking mechanisms 5L, 5R) on the left and right are connected to each other through the hinge axes 91L and 91R and the connection shaft 92 so as to synchronized in operation.

The cam 34R has three sets of cam surface 51R on the circumference of the outer peripheral portion thereof at intervals of an equivalent angle. Each of the cam surfaces 51R includes three pressing cam portions 51aR, 51bR and 51cR respectively in the central portion of the circumferential direction and on both sides in the circumferential direction. The two pressing cam portions 51aR and 51bR among these are enabled to abut on the two pole side cam surfaces 45aR and 45bR facing the second poles 31R and 33R or the two pole side cam surfaces 47aR and 47bR facing the second pole 32R. These two pressing cam portions 51aR and 51bR press the corresponding pole side cam surfaces 45aR, 45bR, 47aR and 47bR when the cam 34R turns in the locking turning direction.

Meanwhile, the one remaining pressing cam portion 51cR among these is enabled to abut on the remaining pole side cam surface 45cR facing the second poles 31R and 33R, and presses the corresponding pole side cam surface 45cR when the cam 34R turns in the locking turning direction. Otherwise, the pressing cam portion 51cR accommodates a sphere-shaped pressing member 36R in the above-described wedge-shaped space formed between the pole side cam surface 47cR of the second pole 32R and the guide wall 13. The pressing member 36R comes into slide contact with the pole side cam surface 47cR and the guide wall 13 and is movable in the radial direction. The pressing cam portion 51cR can circumscribe the pressing member 36R and presses the pressing member 36R when the cam 34R turns in the locking turning direction.

In other words, when the cam 34R turns in the locking turning direction, the pressing cam portions 51aR to 51cR are respectively held in an angle position to abut on (be in pressed contact with) the pole side cam surfaces 45aR to 45cR of the second poles 31R and 33R, and the pole side cam surfaces 47aR and 47bR and the pressing member 36R of the second pole 32R.

The pressing member 36R comes into pressed contact with each of the guide wall 13 and the pole side cam surface 47cR when pressed by the cam 34R. In this case, a pressing force of the pressing member 36R is decomposed into the component force of the movement direction component (radial direction component) of the second pole 32R and the component force of the width direction component (circumferential direction component) of the pole which is the direction orthogonal to the movement direction. Then, a force in the circumferential direction in which the width end portion of the second pole 32R and the guide wall 13 are separated away from each other is generated due to the wedge effect by the pressing component force of the width direction component of this second pole 32R, thereby filling a gap between the width end portion of the second pole 32R and the guide wall 14. Accordingly, rattling of the seatback with respect to the seat cushion is prevented.

Figure 13:
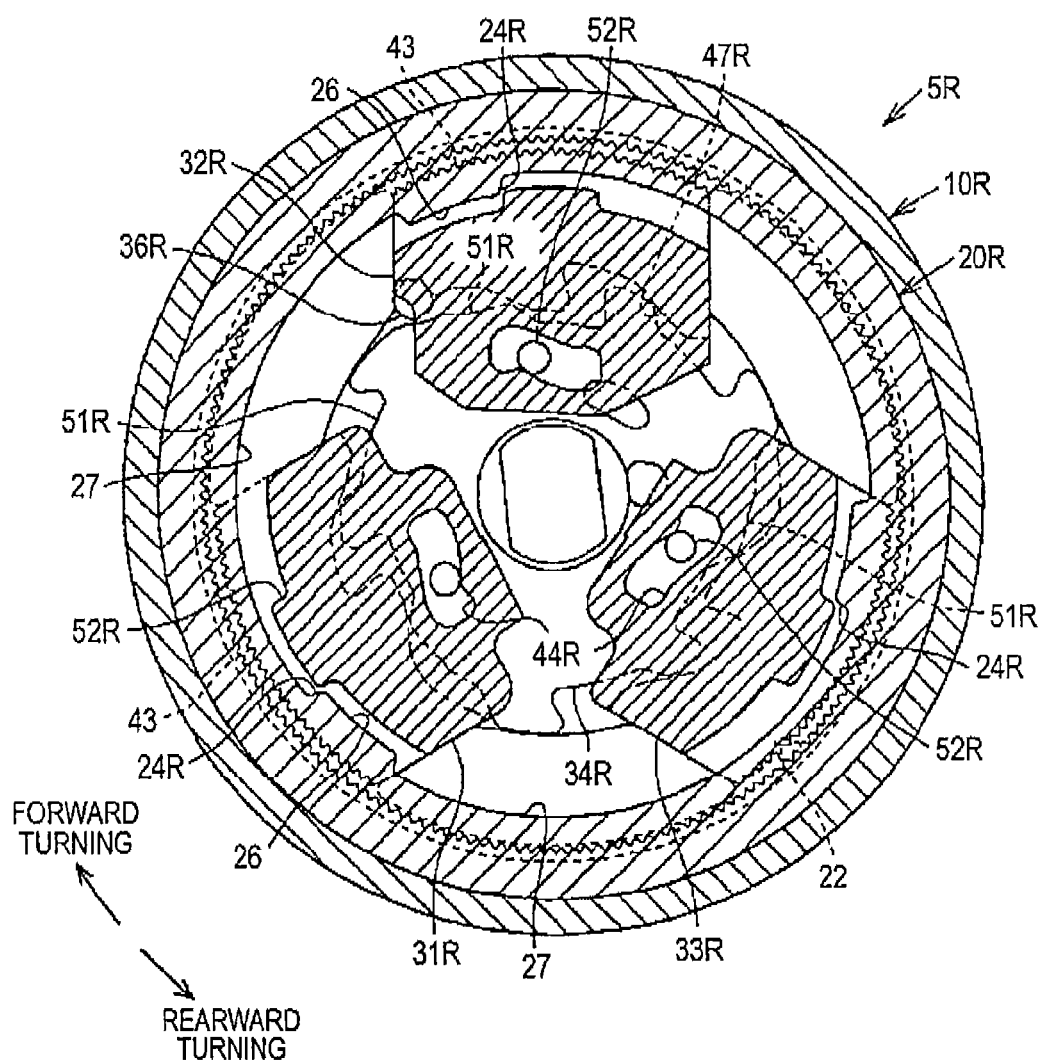
FIG. 13 is another cross-sectional view illustrating the state of the first unlocking operation of the locking mechanism.

Meanwhile, as illustrated in FIG. 13, when the unlocking is in operation in accordance with the turning in the clockwise turning direction (hereinafter, also referred to as "unlocking turning direction") of the cam 34R as shown in the drawing, the pressing cam portions 51aR and 51bR are separated away from the pole side cam surfaces 45aR and 45bR of the second poles 31R and 33R or the pole side cam surfaces 47aR and 47bR of the second pole 32R. In addition, the pressing cam portion 51cR is separated away from the pole side cam surface 45cR of the second poles 31R and 33R, or separated away from the pressing member 36R.

As illustrated in FIG. 12, a plurality (three) of engagement protrusions 52R protrude on a side surface of the cam 34R at intervals on the circumference. These engagement protrusions 52R are inserted into the second pole side groove cam portion 44R of the second poles 31R to 33R to be engaged therewith. The second pole side groove cam portion 44R and the engagement protrusions 52R are operated to move the second poles 31R to 33R inward in the radial direction by the turning of the cam 34R in the unlocking turning direction.

In other words, as illustrated in FIG. 13, basically, the second pole side groove cam portion 44R is molded to gradually move outward in the radial direction as being closer to the cam 34R in the unlocking turning direction (clockwise turning direction as shown in the drawing). Accordingly, in accordance with the turning of the cam 34R in the unlocking turning direction, the second poles 31R to 33R of which the second pole side groove cam portion 44R is pressed by the engagement protrusion 52R are drawn inward in the radial direction.

Then, the cam 34R is urged to turn in the locking turning direction (counterclockwise turning direction in FIG. 12) with respect to the first member 10R due to the urging force by the coil spring 35, presses the second poles 31R to 33R outward in the radial direction by the cam surface 51R, and causes each of the outer teeth 43 to respectively mesh with the inner teeth 22 of the second member 20R.

Here, when the second poles 31R to 33R move outward in the radial direction along the guide groove 15, that is, when the outer teeth 43 of the second poles 31R to 33R mesh with the inner teeth 22, the second pole side engagement protrusion portion 46R is positioned between the adjacent engagement protrusion portions 24R, that is, on the second locking engagement surface 27.

Then, as illustrated in FIG. 13, when the second poles 31R to 33R move inwardly in the radial direction along the guide groove 15 in accordance with the unlocking operation of the cam 34R, that is, when the outer teeth 43 of the second poles 31R to 33R are out of mesh from the inner teeth 22, the engagement protrusion portion 24R is set to partially overlap with the second pole side engagement protrusion portion 46R which is positioned on the second locking engagement surface 27 in a position in the radial direction at all times.

Therefore, the second pole side engagement protrusion portion 46R is allowed to relatively turn within a range of the second locking engagement surface 27 with respect to the second member 20R. The unlocking operation of the cam 34R in this case is also referred to as the first unlocking operation.

The second member 20R which turns in the clockwise direction as shown in the drawing with respect to the first member 10R in the state where the outer teeth 43 and the inner teeth 22 are out of mesh from each other is regulated in its turning by the engagement protrusion portion 24R reaching the second pole side engagement protrusion portion 46R. The turning of the second member 20R with respect to the first member 10R in this case is the forward turning.

In addition, the second member 20R which turns in the counterclockwise direction as shown in the drawing with respect to the first member 10R in the state where the outer teeth 43 and the inner teeth 22 are out of mesh from each other is regulated in its turning by the engagement protrusion portion 24R reaching the second pole side engagement protrusion portion 46R. The turning of the second member 20R with respect to the first member 10R in this case is the rearward turning.

Figure 14:
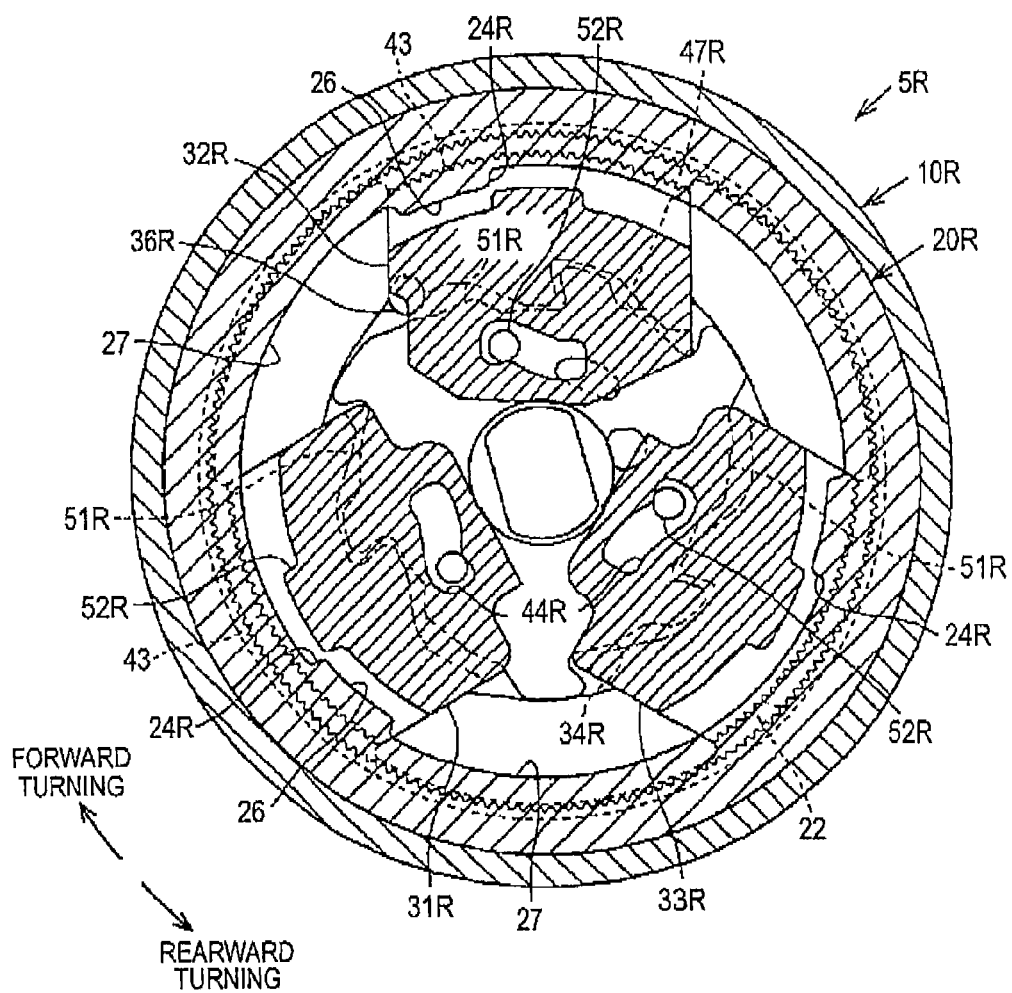
FIG. 14 is another cross-sectional view illustrating the state of the second unlocking operation of the locking mechanism.

Meanwhile, as illustrated in FIG. 14, when the second poles 31R to 33R move further inward in the radial direction along the guide groove 15 in accordance with the unlocking operation of the cam 34R, that is, when the outer teeth 43 of the second poles 31R to 33R are out of mesh from the inner teeth 22, the engagement protrusion portion 24R is set not to overlap with the second pole side engagement protrusion portion 46R, which is positioned on the second locking engagement surface 27, in a position in the radial direction.

Therefore, in this case, the second member 20R is disengaged from the second pole side engagement protrusion portion 46R in the radial direction in the engagement protrusion portion 24R, and thus, for example, the turning further in the clockwise turning direction as shown in the drawing with respect to the second poles 31R to 33R, that is, the turning further in the clockwise turning direction as shown in the drawing with respect to the first member 10R is set to be allowed.

Therefore, if the second member 20R starts the forward turning with respect to the first member 10R in this state, the second pole side engagement protrusion portion 46R which is positioned on the second locking engagement surface 27 is mounted on the second unlocking engagement surface 26 from the second locking engagement surface 27, accordingly. In this case, the second poles 31R to 33R in a state of being out of mesh from the inner teeth 22 are regulated in moving outward in the radial direction by the second unlocking engagement surface 26 on which the second pole side engagement protrusion portion 46R is mounted, thereby maintaining the out of mesh state. Therefore, the forward turning of the second member 20R in this case is allowed until reaching the turning position corresponding to the forward tilt position of the seatback. The unlocking operation of the cam 34R in this case is also referred to as the second unlocking operation.

Therefore, if the seatback is raised up to cancel the forward tilt, the second member 20R turns rearward, and thus, the second poles 31R to 33R are enabled to mesh with the inner teeth 22 at the moment the second locking engagement surface 27 reaches the second pole side engagement protrusion portion 46R. However, in order to mesh the second poles 31R to 33R with the inner teeth 22, the first poles 31L to 33L, which connectedly move on the opposite side through the connection shaft 92 and the like, need to be meshed with the inner teeth 22. In other words, the operation when the second poles 31R to 33R mesh with the inner teeth 22 is restricted by the operation of the first poles 31L to 33L on the opposite side related to the restoration in the memory position and the like. In other words, even if a function related to the restoration in the memory position or the like is provided in the locking mechanism 5L on only one side in the configuration, the function is still effective in the apparatus as a whole. Then, the second poles 31R to 33R together with the first poles 31L to 33L mesh with the inner teeth 22, thereby regulating the rearward turning of the second member 20R not to turn therebeyond. It is needless to say that the turning position of the second member 20R with respect to the first member 10R in this case matches the turning position corresponding to the memory position or the fixed point restoration position of the seatback.

Here, as illustrated in FIG. 1, the tip portion of the hinge axis 91R protruding from the lower plate 4R on one side in the axis line direction is linked to a first operation member 71 made of the plate material, for example, and configured to turn on a side in which the cam 34R connected to the hinge axis 91R is in the first unlocking operation when the tip portion of the first operation member 71 is operated to be lifted up (hereinafter, also referred to as "first unlocking operation"). In this case, the cam 34L on the opposite side also turns to the first unlocking operation side through the connection shaft 92 and the hinge axis 91L.

Meanwhile, in a shoulder portion of an upper left portion of the seatback frame 6 as shown in the drawing, an attachment member 6b which spreads out on the corner portion thereof is provided. Then, in this attachment member 6b, for example, an arm-like second operation member 72 made of the plate material is turnably supported in the vertical direction by an axis 73. The second operation member 72 is urged to turn downward by a restoration spring (not illustrated) at all times. In addition, in the attachment member 6b, stoppers 74a and 74b are provided on an upper side and a lower side of the second operation member 72, and the operational range of the second operation member 72 is defined by these stoppers 74a and 74b.

In addition, the tip portion of the hinge axis 91L protruding from the lower plate 4L on one side in the axis line direction is linked to a release link 100 made of the plate material, for example. The tip portion of the release link 100 is connected to an intermediate portion of the second operation member 72 in the longitudinal direction through a cable 75 which is a double tube-type cable with flexibility to be guided inside an outer cylinder T, for example. Then, when the tip portion of the second operation member 72 is operated to be lifted up (hereinafter, also referred to as "second unlocking operation"), the cam 34L connected to the hinge axis 91L is configured to turn to the second unlocking operation side. In this case, the cam 34R on the opposite side also turns to the second unlocking operation side through the connection shaft 92 and the hinge axis 91R.

A terminal of the outer cylinder T of the cable 75 is held by a cable holder 6c which is formed in the attachment member 6b while the other terminal is held by a cable holder 104 fixedly attached to the lower plate 4L. In FIG. 1, an intermediate portion of the cable 75 and the outer cylinder T is not illustrated.

Here, with reference to FIG. 15, descriptions will be given regarding a relationship between turning angle θ of the cams 34L and 34R having a starting point of the turning angle of the cams 34L and 34R when the outer teeth 43 of the first pole 31L and the second pole 31R, and the inner teeth 22 of the second members 20L and 20R are in a state of mesh with each other due to the urging force of the coil spring 35; and a sliding amount SL which is a moving amount of the first pole 31L and the second pole 31R which are separated away from the inner teeth 22 in the radial direction, corresponding to the turning angle θ. Regarding the other poles, since the first poles 32L and 33L, and the second poles 32R and 33R are connectedly move with the first pole 31L and the second pole 31R respectively, the description thereof will be omitted.

Figure 15:
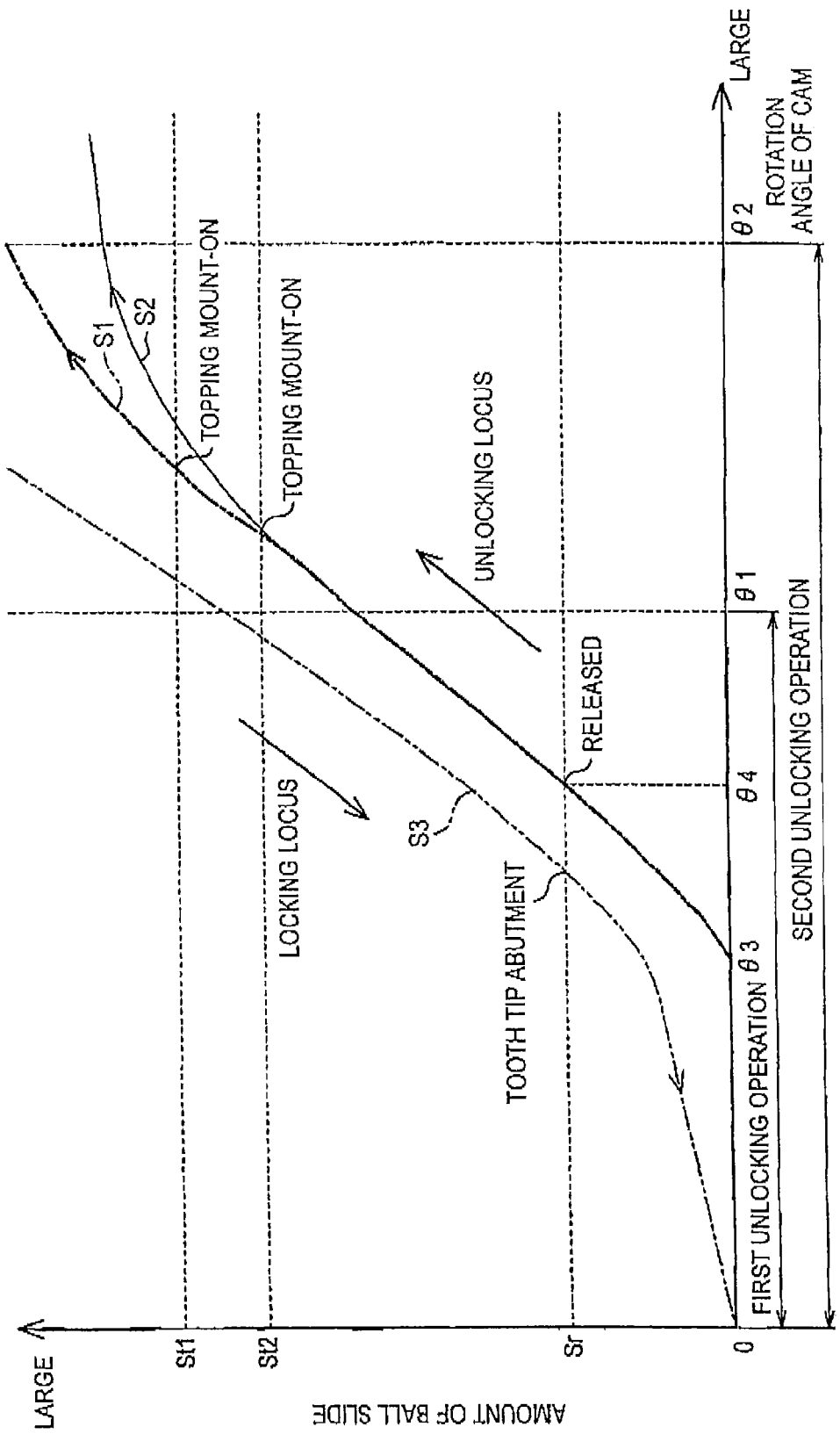
FIG. 15 is a graph illustrating a relationship between a turning angle of a cam and a sliding amount of a pole.

In FIG. 15, turning angle θ1 indicates the turning angle θ corresponding to the maximum operating amount when the first operation member 71 is in the first unlocking operation. Turning angle θ2 (>θ1) indicates the turning angle θ corresponding to the maximum operating amount when the second operation member 72 is in the second unlocking operation. Therefore, the turning angle 82 matches the tuning angle θ of the cam 34L corresponding to the operating amount in which the second operation member 72 abuts on the stopper 74a. In addition, sliding amount S1 indicates changes of the sliding amount SL of the first pole 31L when the cams 34L and 34R are in the second unlocking operation, and sliding amount S2 indicates the changes of the sliding amount SL of the second pole 31R when the cams 34L and 34R are in the second unlocking operation.

Turning angle θ3 indicates the turning angle θ when the engagement protrusions 52L and 52R abut on the first pole side engagement protrusion portion 46L and the second pole side engagement protrusion portion 46R via an idling section during the unlocking operation of the cams 34L and 34R. Furthermore, turning angle θ4 indicates the turning angle θ corresponding to sliding amount Sr when the outer teeth 43 of the first pole 31L and the second pole 31R, and the inner teeth 22 of the second members 20L and 20R are released in tooth tips from each other.

Meanwhile, sliding amount S3 indicates changes of the sliding amount SL of the outer teeth 43 of the first pole 31L and the second pole 31R, and the inner teeth 22 of the second members 20L and 20R when these teeth mesh with each other due to the urging force of the coil spring 35. In other words, when the outer teeth 43 of the first pole 31L and the second pole 31R, and the inner teeth 22 of the second members 20L and 20R mesh with each other, the sliding amounts SL are set to identically change with each other. The changes of the sliding amount SL in this case are adjusted and set by the cam surfaces 51L and 51R of the cams 34L and 34R, and the shapes of the inner cam portions 45L and 45R of the first pole 31L and the second pole 31R.

As is obvious through the drawing, the sliding amounts S1 and S2 are set to identically change with each other for the sliding amount SL in the beginning when the cams 34L and 34R start the second unlocking operation, and the outer teeth 43 of the first pole 31L and the second pole 31R, and the inner teeth 22 of the second members 20L and 20R finish to release the tooth tips from each other.

Then, in the vicinity where the second pole side engagement protrusion portion 46R of the second pole 31R is mounted on the second unlocking engagement surface 26 of the second member 20R, the sliding amounts S1 and S2 are set to change differently from each other for the sliding amount SL.

In other words, sliding amount St1 when first pole side engagement protrusion portion 46L of the first pole 31L is mounted on the first unlocking engagement surface 62 of the memory ring 60 is set to be greater than the sliding amount St2 when the second pole side engagement protrusion portion 46R of the second pole 31R is mounted on the second unlocking engagement surface 26 of the second member 20R. This is to reduce the possibility that the turning angle θ (operating amount of the first operation member 71) when the first pole side engagement protrusion portion 46L of the first pole 31L is mounted on the first unlocking engagement surface 62 of the memory ring 60 may become smaller than the turning angle θ (operating amount of the second operation member 72) when the second pole side engagement protrusion portion 46R of the second pole 31R is mounted on the second unlocking engagement surface 26 of the second member 20R due to, for example, the variation of the components. Accordingly, for example, in the second unlocking operation state, even if the memory ring 60 integrally turns with the second member 20L, that is, even if the setting of the memory position or the like is performed, the seatback is prevented from being unable to tilt forward exceeding the predetermined angle range.

In addition, from the range in the vicinity of the turning angle θ when the second pole side engagement protrusion portion 46R of the second pole 31R is mounted on the second unlocking engagement surface 26 of the second member 20R, an increasing amount of the sliding amount S1 of the first pole 31L is set to be greater than the increasing amount of the sliding amount 52 of the second pole 31R with respect to the increasing amount of the turning angle θ. In other words, a moving speed at which the first pole 31L is separated away from the inner teeth 22 in the radial direction is set to be faster than the moving speed at which the second pole 31R is separated away from the inner teeth 22 in the radial direction. This is to prevent timing deviation thereof by difference between both of the movement speeds of the first pole 31L and the second pole 31R, although the sliding amount St1 when the first pole side engagement protrusion portion 46L of the first pole 31L is mounted on the first unlocking engagement surface 62 of the memory ring 60 is set to be greater than the sliding amount St2 when the second pole side engagement protrusion portion 46R of the second pole 31R is mounted on the second unlocking engagement surface 26 of the second member 20R. Accordingly, in the second unlocking operation state, even if the seatback is tilted forward exceeding the predetermined angle range, the memory ring 60 is prevented from being unable to integrally turn with the second member 20L, that is, the memory position is prevented from being unable to be set and the like.

Figure 16:
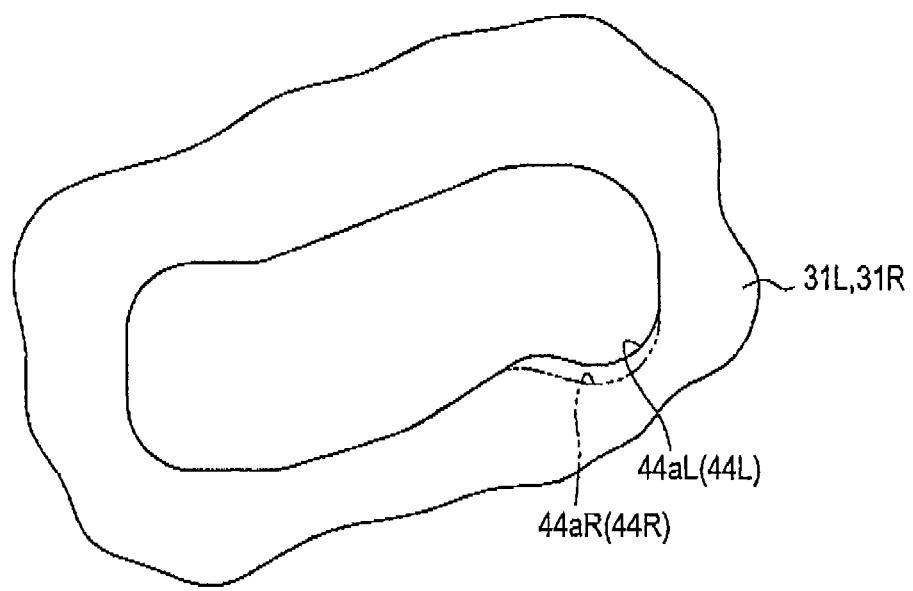
FIG. 16 is an explanatory view comparing first and second pole side groove cam portions to be shown.

As illustrated in FIG. 16, the changes of the sliding amount SL when the first pole side engagement protrusion portion 46L of the first pole 31L is mounted on the first unlocking engagement surface 62 of the memory ring 60, and the changes of the sliding amount SL when the second pole side engagement protrusion portion 46R of the second pole 31R is mounted on the second unlocking engagement surface 26 of the second member 20R are adjusted and set by the shapes of the first pole side groove cam portion 44L and the second pole side groove cam portion 44R with which the engagement protrusions 52L and 52R of the cams 34L and 34R are engaged. In other words, as indicated in a solid line in FIG. 16, an inner wall surface 44aL of the first pole side groove cam portion 44L related to the drawing-back of the first pole 31L in the vicinity where the second pole side engagement protrusion portion 46R of the second pole 31R is mounted on the second unlocking engagement surface 26 of the second member 20R is raised more outwardly in the radial direction than an inner wall surface 44aR of the second pole side groove cam portion 44R related to the drawing-back of the second pole 31R in the same manner, as indicated in a dotted-chain line in FIG. 16. Accordingly, a relative increase in the moving speed for the first pole 31L to be separated away from the inner teeth 22 in the radial direction is realized.

Next, the first operation member 71 and the surrounding structure thereof will be described.

Figure 17:
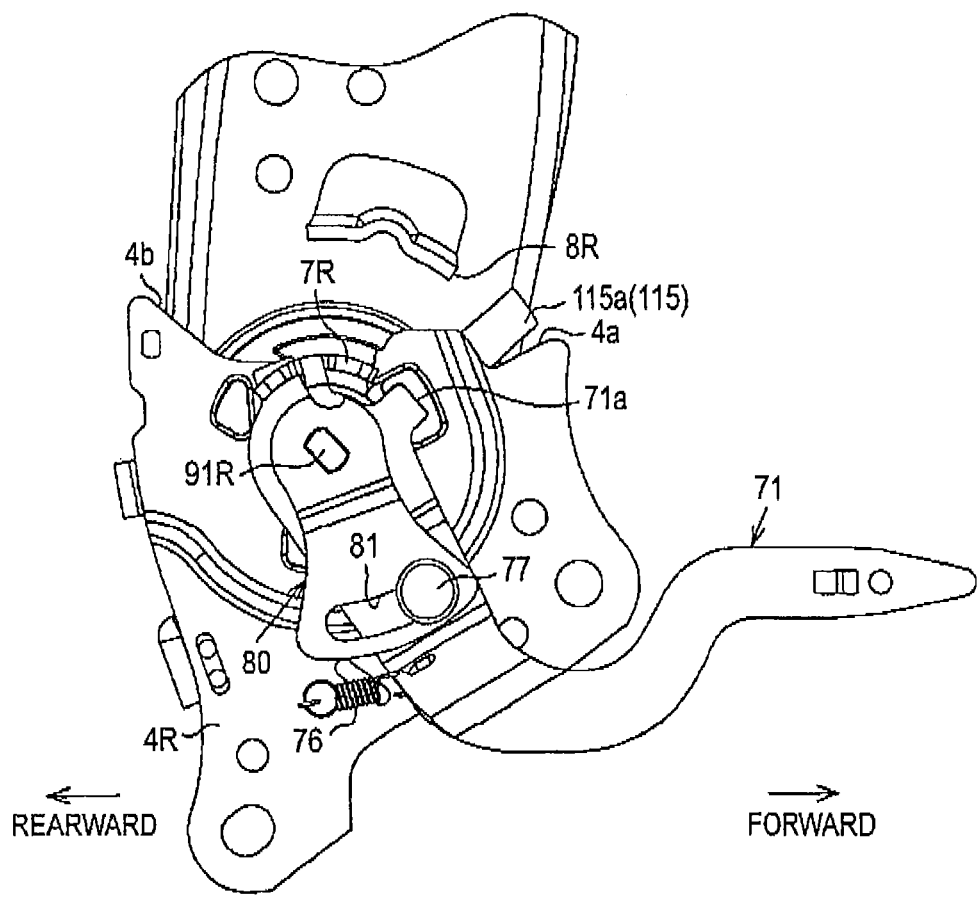
FIG. 17 is a side view illustrating a first operation member and a surrounding structure thereof when the first operation member and a second operation member are in a not-operation state.

As illustrated in FIG. 17, the first operation member 71 is molded in an approximately bow shape and turnably supported by the tip portion of the hinge axis 91R. The first operation member 71 has a movable stopper 71a protruding to an upper front side substantially along the radial direction about the hinge axis 91R from a base end portion thereof. This movable stopper 71a is disposed on a side to proceed in the clockwise turning direction as shown in the drawing about the hinge axis 91R with respect to the fixed flange 7R and disposed to cause the turning locus thereof to be blocked by the fixed flange 7R. In addition, the first operation member 71 is urged and held (pulled) in a predetermined initial turning position by a restoration spring 76 extended between the lower plate 4R and itself.

Figure 18:
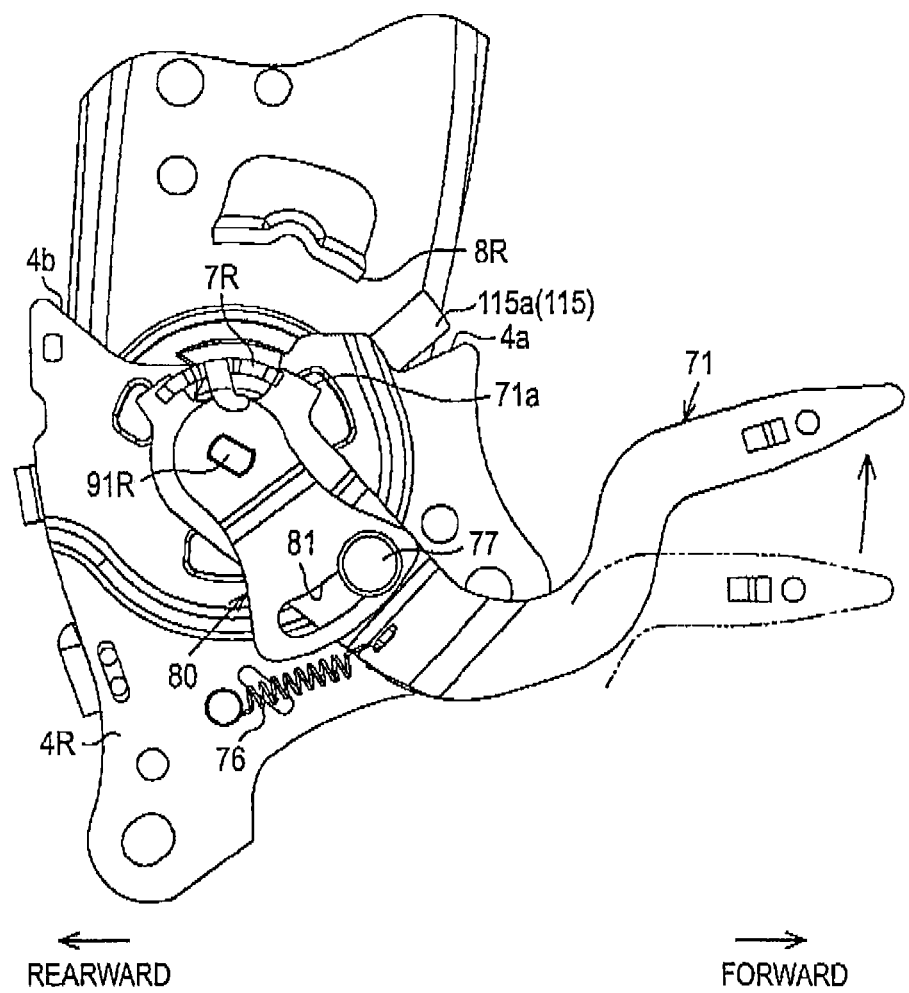
FIG. 18 is another side view illustrating the first operation member and the surrounding structure thereof when the first operation member is in the first unlocking operation state.

Therefore, as illustrated in FIG. 18, the maximum turning range when performing a lift up operation (first unlocking operation) with respect to the tip portion of the first operation member 71 is regulated within a range where the movable stopper 71a abuts on the fixed flange 7R. The turning angle θ corresponding to the operating amount of the first operation member 71 in this case matches the turning angle θ1.

In addition, as illustrated in FIG. 17, the tip of the hinge axis 91R is adjacent to the outside of the first operation member 71 which is a lower side of the fixed flange 7R, and is fit into and fixedly attached to a link member 80 made of the plate material. In the tip portion of the link member 80, an arc-shaped long hole 81 is formed about the hinge axis 91R. Meanwhile, in the first operation member 71, a pin 77 inserted through the long hole 81 to be slidable is fixed.

As described above, the first operation member 71 is turnably supported with respect to the tip portion of the hinge axis 91R, and urged and held in a predetermined initial turning position by the restoration spring 76. Meanwhile, since the cam 34R which is integrated with the hinge axis 91R is urged to turn in the turning direction (clockwise turning direction in FIG. 17) on a side where locking operation is applied by the coil spring 35 at all times, the link member 80 is normally disposed in a position where an end portion (front end portion) of the long hole 81 is locked by the pin 77 of the first operation member 71 in the initial turning position.

Therefore, as illustrated in FIG. 18, if the first operation member 71 is in the first unlocking operation state, the link member 80 integrally turns with the first operation member 71 in the counterclockwise turning direction as shown in the drawing as the end portion (front end portion) of the long hole 81 is pressed by the pin 77. Then, in accordance with the turning of the link member 80, the hinge axis 91R integrally turns therewith in the same direction. In this case, the cam 34R which is integrated with the hinge axis 91R performs the first unlocking operation against the urging force of the coil spring 35.

Figure 19:
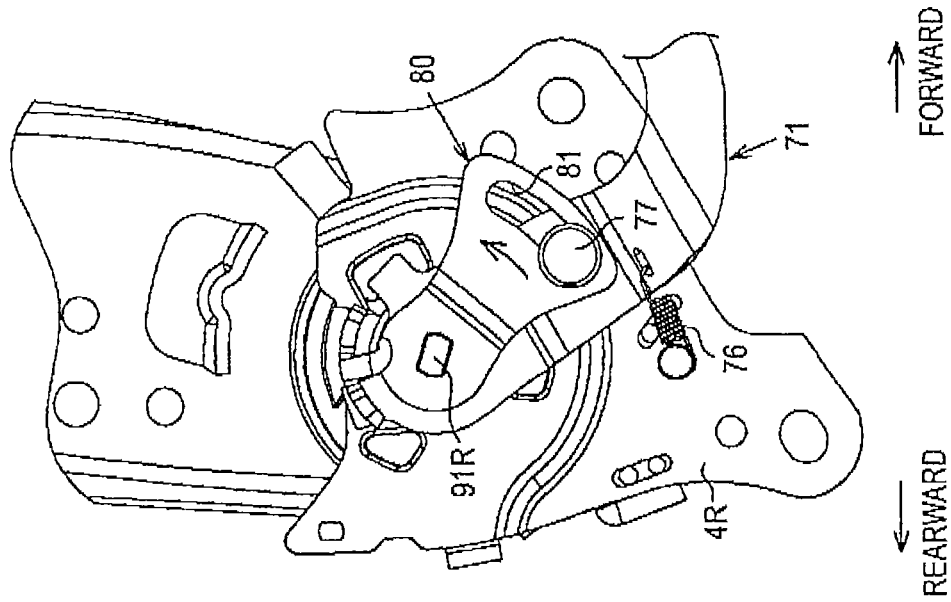
FIG. 19 is another side view illustrating the first operation member and the surrounding structure thereof when the second operation member is in the second unlocking operation state.

On the contrary, in a state illustrated in FIG. 17, when the link member 80 turns in the counterclockwise turning direction as shown in the drawing, as illustrated in FIG. 19, since movement of the pin 77 is allowed inside the long hole 81, the turning of the link member 80 is not transmitted to the first operation member 71.

Next, the release link 100 and the surrounding structure thereof will be described.

Figure 20:
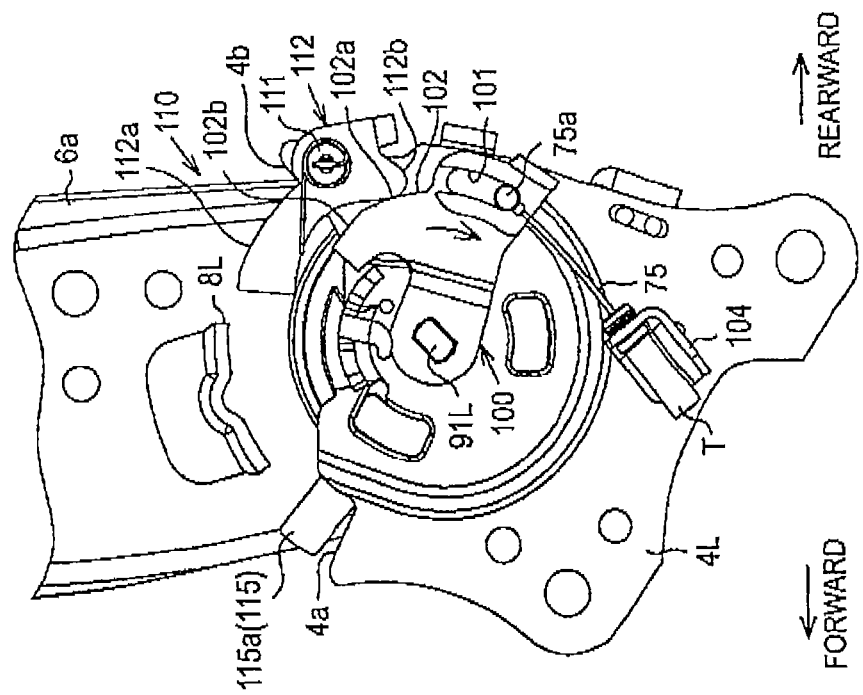
FIG. 20 is a side view illustrating a release link and a surrounding structure thereof when the first operation member and the second operation member are in the not-operation state.

As illustrated in FIG. 20, the release link 100 is molded in an approximately L-shape, and the tip portion of the hinge axis 91L is fit into and fixedly attached thereto. In other words, since the cam 34L which is integrated with the hinge axis 91L is urged to turn in the turning direction (counterclockwise turning direction in FIG. 20) on the side where locking operation is applied by the coil spring 35 at all times, the release link 100 is normally held in a predetermined initial turning position together therewith. In addition, in the tip portion of the release link 100, an arc-shaped long hole 101 is formed about the hinge axis 91L. Meanwhile, a terminal 75a of the cable 75 extending from the second operation member 72 is inserted through the long hole 101 to be slidable. Then, in a state where the release link 100 is held in the initial turning position, the terminal 75a of the cable 75 is positioned in an end portion (lower end portion) of the long hole 101. In the lower end portion of the lower plate 4L, a cable holder 104 which holds a terminal of the outer cylinder T is fixedly attached.

Here, if the second operation member 72 is in the second unlocking operation state, since the cable 75 is pulled downward, the release link 100 turns in the clockwise turning direction as shown in the drawing as the one end portion (lower end portion) of the long hole 101 is pressed by the terminal 75a. Then, in accordance with the turning of the release link 100, the hinge axis 91L integrally turns therewith in the same direction. In this case, the cam 34R which is integrated with the hinge axis 91L performs the second unlocking operation against the urging force of the coil spring 35. On the contrary, when the release link 100 turns in the clockwise turning direction as shown in the drawing, since the movement of the terminal 75a is allowed inside the long hole 101, the turning of the release link 100 is not transmitted to the cable 75 or the second operation member 72.

In other words, when the hinge axis 91R, the connection shaft 92 and the hinge axis 91L turn together with the link member 80 in accordance with the first unlocking operation of the first operation member 71, the release link 100 integrally turns therewith. In this case, since the movement of the terminal 75a is allowed inside the long hole 101 as described above, the turning of the release link 100 is not transmitted to the second operation member 72.

In addition, when the hinge axis 91L, the connection shaft 92 and the hinge axis 91R turn together with the release link 100 in accordance with the second unlocking operation of the second operation member 72, the link member 80 integrally turns therewith. In this case, since the movement of the pin 77 is allowed inside the long hole 81 as described above, the turning of the link member 80 is not transmitted to the first operation member 71.

As above, since one of the first and second operation members 71 and 72 is in the unlocking operation, the other one of the first and second operation members 71 and 72 is prevented from oscillating.

In an intermediate portion of the release link 100 in the longitudinal direction, an approximately bow-shaped switching piece 102 extending upward in the circumferential direction about the hinge axis 91L is formed. An outer peripheral surface of a base end portion of the switching piece 102 forms a operation regulation surface 102a as the circular first cam surface about the hinge axis 91L. In addition, an outer peripheral surface of the tip portion of the switching piece 102 forms an approximately linear operation allowance surface 102b facing further inner peripheral side along to the tip than the circle along which the operation regulation surface 102a is formed. This switching piece 102 configures a stopper mechanism 110 which regulates the rearward tilt of the seatback in the fixed point restoration position (predetermined regulation angle position) in a case where the second operation member 72 is in the second unlocking operation when the seatback is in the ready-for-seating region.

Figure 22:
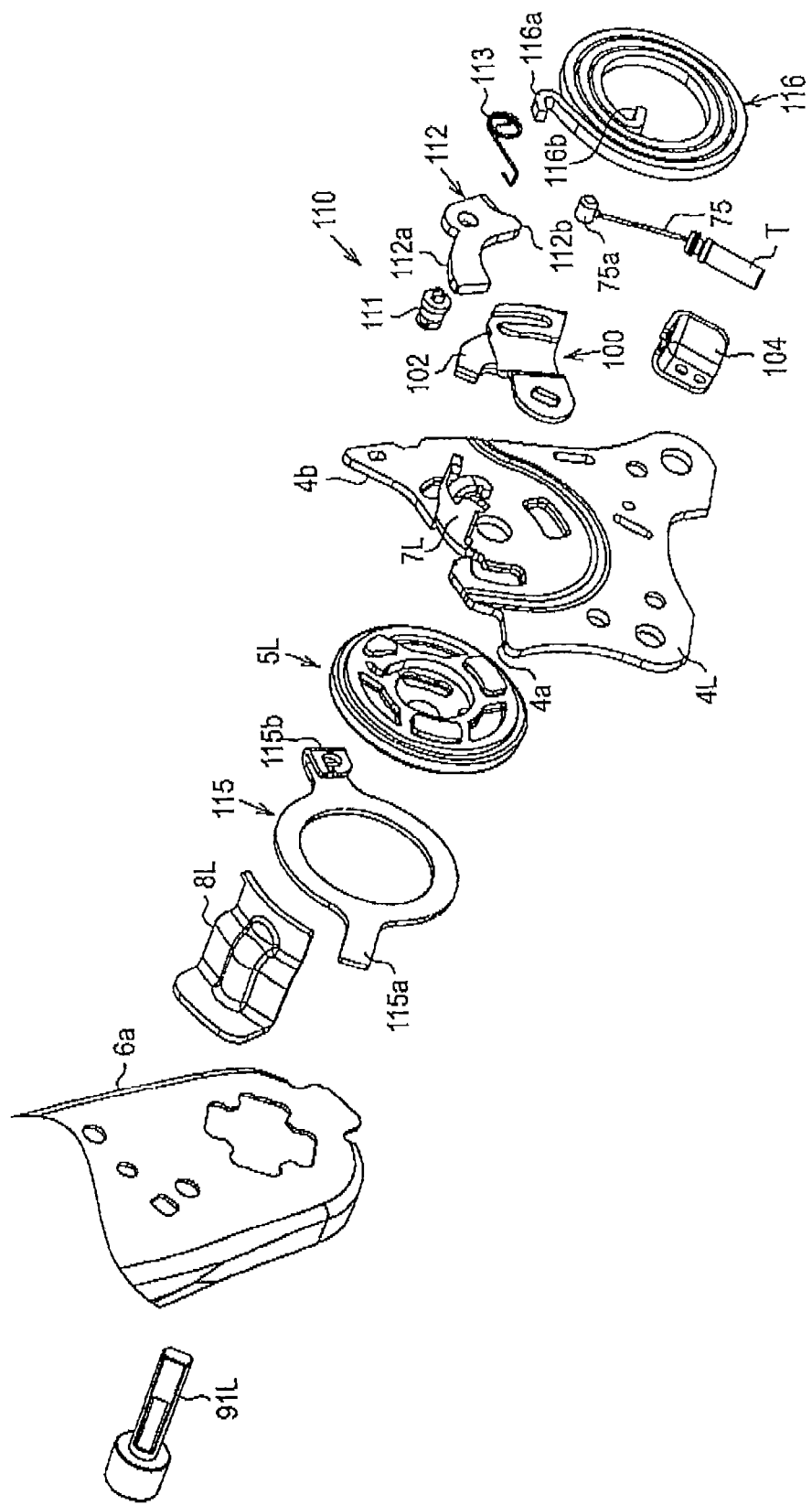
FIG. 22 is an exploded perspective view illustrating a stopper mechanism.

In other words, as collectively illustrated in FIG. 22, the stopper mechanism 110 is configured to include the movable flange 8L, the switching piece 102, a stopper link 112 which is turnably connected to a rear upper portion (that is, in the vicinity of rear side stopper 4b) of the lower plate 4L by a pin 111 to be an upper portion of the switching piece 102, and a stopper link urging member 113.

The stopper link 112 is made of the plate material, for example, and has an approximately bow-shaped stopper piece 112a extending toward the movable flange 8L substantially along the circumferential direction about the hinge axis 91L while having an approximately gulf-shaped engagement surface 112b as the second cam surface extending downward toward the releasing link 100 (switching piece 102). The engagement surface 112b abuts on the outer peripheral surface of the switching piece 102 when the stopper link 112 turns in the clockwise turning direction around the pin 111 as shown in the drawing, and thus, the stopper link 112 is basically regulated not to turn therebeyond.

The stopper link urging member 113 is formed of a torsion coil spring, for example, and of which a terminal is locked by the pin 111 fixedly attached to the lower plate 4L while the other terminal is locked by the stopper piece 112a, thereby urging the stopper link 112 to a side turning in the clockwise turning direction around the pin 111 as shown in the drawing.

Here, an operation of the stopper mechanism 110 will be described.

As illustrated in FIG. 23A, it is considered that the second operation member 72 is in not-operation state, and the release link 100 is held in the initial turning position. In addition, it is considered that the seatback is in the ready-for-seating region and relatively leans to the forward inclining side. In this case, the stopper link 112 urged to turn by the stopper link urging member 113 is set to abut on the operation regulation surface 102a of the switching piece 102 in the engagement surface 112b. Therefore, the stopper link 112 causes the stopper piece 112a to be close to the hinge axis 91L side when the engagement surface 112b is relatively pressed outward in the radial direction about the hinge axis 91L by the operation regulation surface 102a. Then, the outer peripheral surface of the stopper piece 112a is disposed on a further inner peripheral side than the movable flange 8L substantially along the circumferential direction about the hinge axis 91L.

Furthermore, the movable flange 8L proceeds further in front of the seat than a front end of the stopper piece 112a and opens upper portion of the stopper piece 112a.

Then, as illustrated in FIG. 23B, if the second operation member 72 is in the second unlocking operation state, in accordance with the turning of the release link 100 in the clockwise turning direction as shown in the drawing, the operation allowance surface 102b of the switching piece 102 reaches the engagement surface 112b of the stopper link 112, that is, the operation regulation surface 102a of the switching piece 102 releases the engagement surface 112b of the stopper link 112, and thus, the stopper piece 112a of the stopper link 112 which is urged to turn by the stopper link urging member 113 protrudes to block the turning locus of the movable flange 8L.

Therefore, as illustrated in FIG. 23C, even if the seatback tends to tilt rearward in this state, the inclining is regulated at the moment the movable flange 8L abuts on the stopper piece 112a. In this case, the seatback is set in the fixed point restoration position.

As the releasing link 100 turns in the counterclockwise turning direction as shown in the drawing in accordance with the release of the second operation member 72, the stopper piece 112a protruding to block the turning locus of the movable flange 8L in accordance with the second unlocking operation of the second operation member 72 is pressed again by the operation regulation surface 102a approaching the stopper piece 112a. Accordingly, the outer peripheral surface of the stopper piece 112a is disposed on the further inner peripheral side than the movable flange 8L substantially along the circumferential direction about the hinge axis 91L. In other words, the urging force of the coil spring 35 which performs the locking operation with respect to the cam 34L is set to be sufficiently greater than the urging force of the stopper link urging member 113.

Figure 24A:
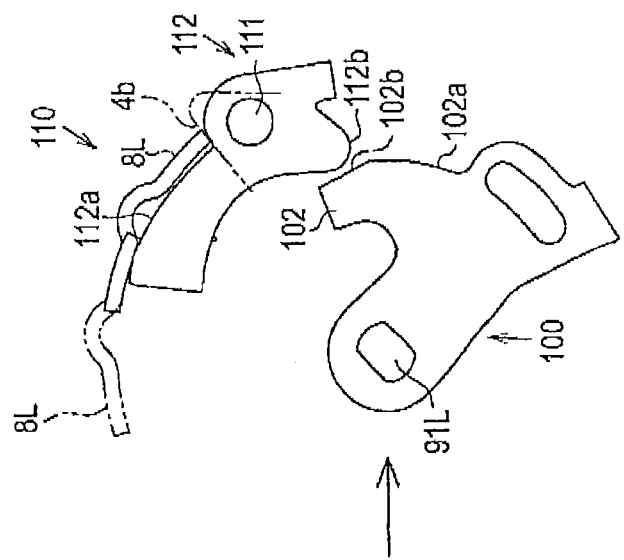
FIGS. 24A to 24C are other explanatory views illustrating the operations of the stopper mechanism when a seatback is in a not-ready-for-seating region.

Meanwhile, as illustrated in FIG. 24A, it is considered that the second operation member 72 is in a not-operation state, and the release link 100 is held in the initial turning position. In addition, it is considered that the seatback is in the not-ready-for-seating region and relatively leans to the rearward inclining side. In this case, the movable flange 8L is positioned above the stopper piece 112a and regulates the turning in the clockwise turning direction about the pin 111 of the stopper link 112 as shown in the drawing.

Figure 24B:
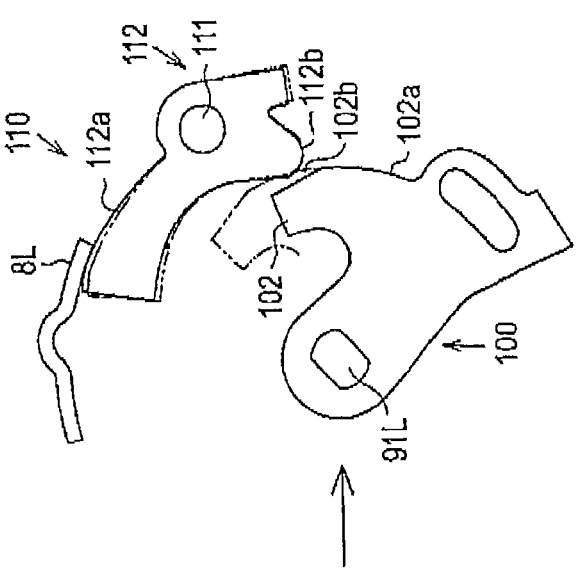

Then, as illustrated in FIG. 24B, if the second operation member 72 is in the second unlocking operation state, the release link 100 turns in the clockwise turning direction as shown in the drawing as remaining the stopper link 112 which is regulated not to turn by the movable flange 8L.

Figure 24C:
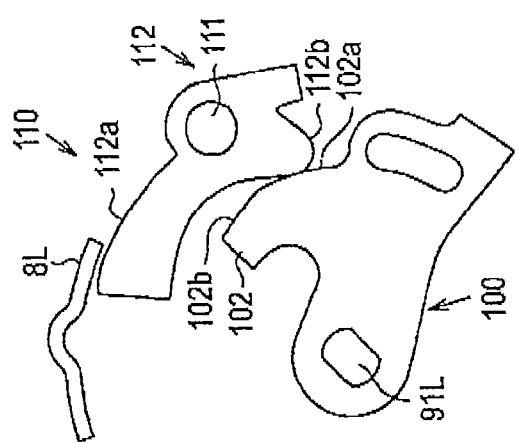
Figure 25:
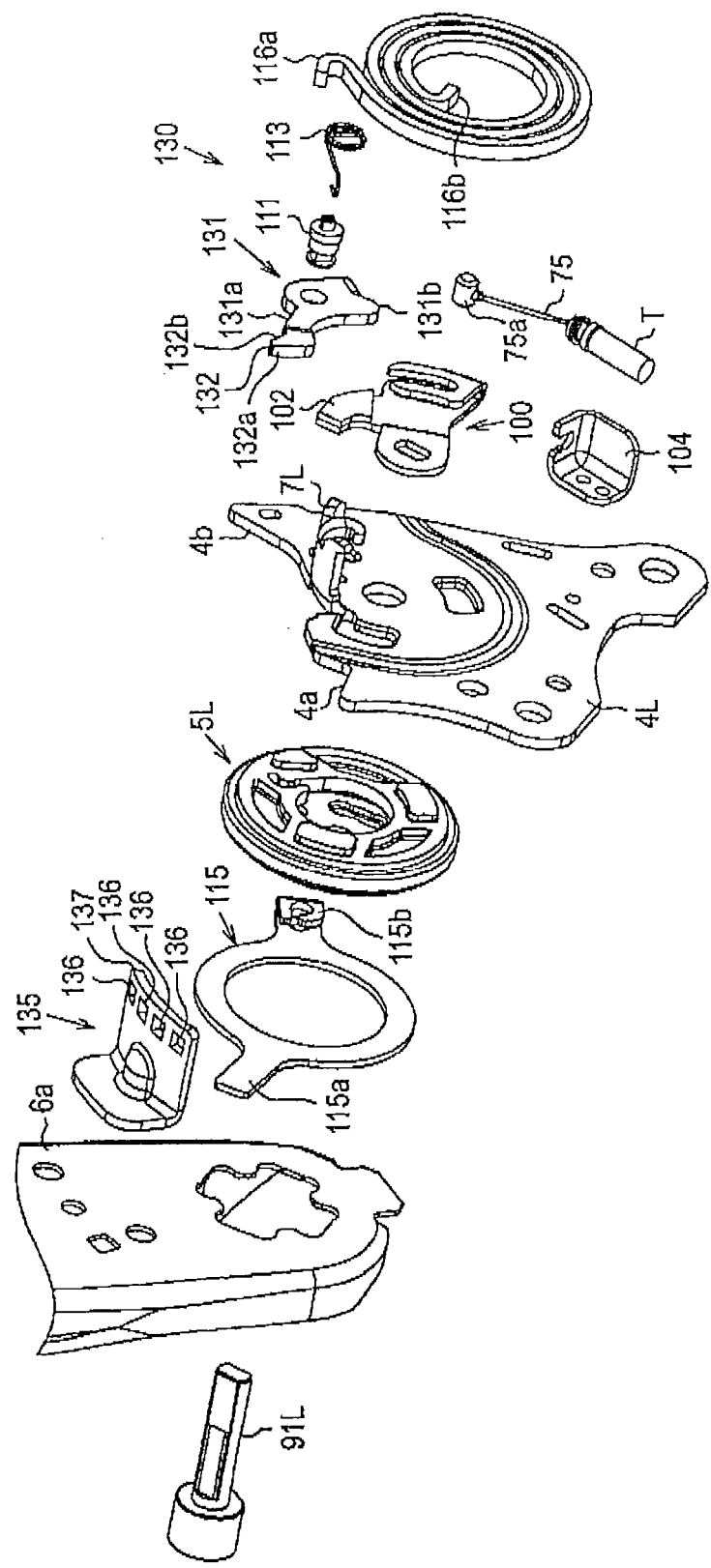
FIG. 25 is another exploded perspective view illustrating the stopper mechanism according to a second embodiment disclosed here.

Therefore, as illustrated in FIG. 24C, the stopper piece 112a remains as an opening the turning locus of the movable flange 8L, and the seatback tilts rearward until the movable flange 8L abuts on the rear side stopper 4b, that is, until the seatback reaches the complete tilt position.

Figure 21:
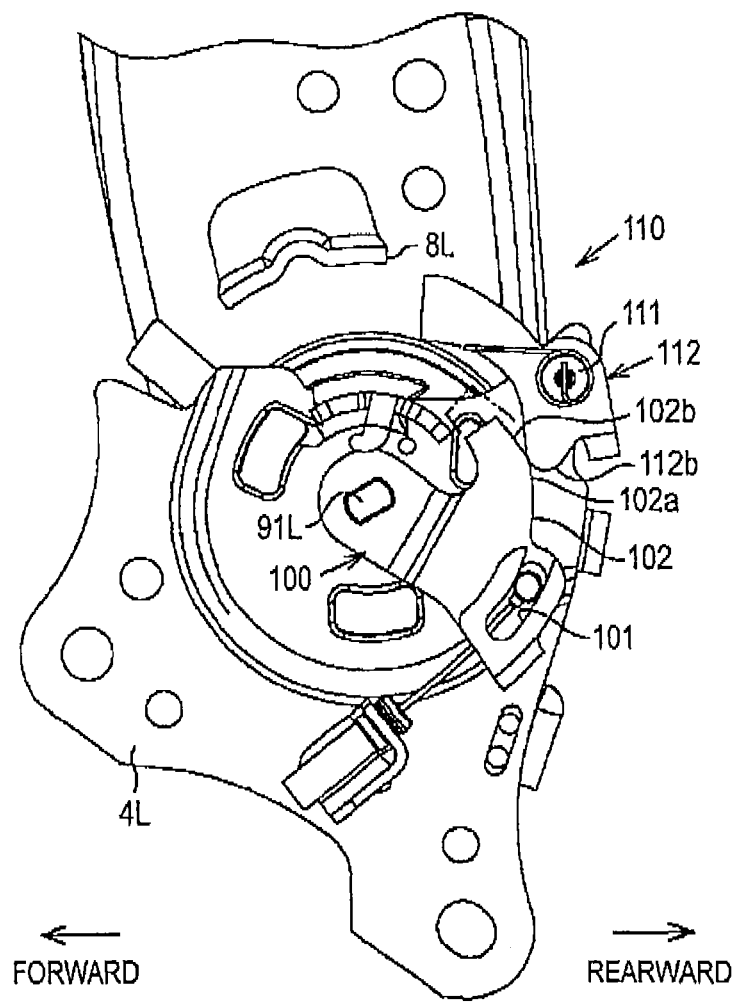
FIG. 21 is another side view illustrating the release link and the surrounding structure thereof when the first operation member is in the first unlocking operation state.

Incidentally, as illustrated in FIG. 21, even when the first operation member 71 is in the first unlocking operation state, the release link 100 turns in the clockwise turning direction as shown in the drawing. However, the operating amount of the first operation member 71 in this case is relatively small, the release link 100 (switching piece 102) comes into slide contact with the engagement surface 112b of the stopper link 112 within a range of the operation regulation surface 102a. Therefore, regardless of the state of the seatback (ready-for-seating region or not-ready-for-seating region), the stopper piece 112a of the stopper link 112 does not block the turning locus of the movable flange 8L. In other words, if the first operation member 71 is in the first unlocking operation state, it is possible to perform the angle adjustment of the seatback within the adjustment region without being hindered by the stopper mechanism 110.

In FIG. 22, a relay ring 115 which is turnably interposed between the backside frame 6a and the locking mechanism 5L has a pressed piece 115a extending on a upper front side in the radial direction and has a cable connection portion 115b extending on a rear side in the radial direction.

The pressed piece 115a is disposed on the turning locus of the movable flange 8L when the seatback inclines forward, thereby integrally turning the relay ring 115 in accordance with the forward tilt of the seatback as the pressed piece 115a is pressed by the movable flange 8L. Meanwhile, the cable connection portion 115b is connected to the above-described slide locking device through a cable (not illustrated). The relay ring 115 turns in accordance with the inclining of the seatback toward the forward tilt position, thereby releasing the slide locking device. Accordingly, the seat cushion slides in front with respect to the vehicle floor.

In addition, a coil spring 116 on a lower right side in FIG. 22 is urged to turn the seatback in the forward inclining direction with respect to the above-described seat cushion. An outer end portion 116a thereof is locked by the movable flange 8L, and an inner end portion 116b is locked by the fixed flange 7L.

The relay ring 115 and the coil spring 116 are also provided on the opposite side of the seat.

Next, an operation according to the embodiment will be described.

For example, if the second operation member 72 is in the second unlocking operation state, the stopper link 112 of which the engagement surface 112b is released from the operation regulation surface 102a is urged by the stopper link urging member 113, thereby turning to block the turning locus of the movable flange 8L corresponding to the rearward inclining direction of the seatback. Therefore, the inclining of the seatback in the rearward inclining direction is regulated in the angle position (predetermined regulation angle position) in which the movable flange 8L abuts on the stopper link 112, that is, in the fixed point restoration position. Therefore, for example, even if the second operation member 72 is operated in a circumstance where a person sitting on a seat leans on the seatback, the rearward tilt of the seatback is regulated in the fixed point restoration position by the stopper mechanism 110, and thus, it is possible to prevent the seatback from overly tilting rearward.

Since the operation of the second operation member 72 is performed on the assumption that the seatback is tilted forward to enhance the convenience of getting on and off a rear seat, the regulation in the inclining of the seatback in the rearward inclining direction by the stopper mechanism 110 does not affect the function in the apparatus as a whole.

Meanwhile, when the first operation member 71 is operated, the inclining of the seatback is allowed by the stopper mechanism 110, and thus, the adjustment for the angle position of the seatback within the adjustment region is not hindered.

As described above, according to the embodiment, it is possible to achieve the below-described effects.

(1) According to the embodiment, for example, even if the second operation member 72 is operated in a circumstance where a person sitting on a seat leans on the seatback, the rearward tilt of the seatback is regulated in the fixed point restoration position (predetermined regulation angle position) by the stopper mechanism 110, and thus, it is possible to prevent the seatback from overly tilting rearward.

In addition, it is possible to further simplify the structure by accomplishing the inclining of the seatback with respect to the seat cushion within the adjustment range and the inclining of the seatback with respect to the seat cushion to the predetermined forward tilt position through the locking mechanisms 5L and 5R that are intensively disposed around the axis line of the seatback.

(2) According to the embodiment, for example, in the state of the second unlocking operation of the second operation member 72, the stopper link 112 in which the engagement surface 112b is released from the operation regulation surface 102a is urged by the stopper link urging member 113, thereby turning so as to block the turning locus of the movable flange 8L corresponding to the rearward inclining direction of the seatback. Therefore, it is possible to regulate the inclining of the seatback in the rearward inclining direction in the angle position (predetermined regulation angle position) where the movable flange 8L abuts on the stopper link 112, that is in the fixed point restoration position.

(3) According to the embodiment, when the seatback is in the not-ready-for-seating region (state of inclining farther in rearward inclining direction than regulation angle position), that is, when the seatback is considered to be already in a posture inclined rearward to some extent and can be inclined farther rearward without causing any difficulties, it is possible to stop the stopper link 112 unnecessarily blocking the turning locus of the movable flange 8L using the movable flange 8L.

(4) According to the embodiment, the engagement surface 112b abuts on the operation regulation surface 102a even if the first operation member 71 is in the first unlocking operation state. Therefore, if the first operation member 71 is in the first unlocking operation state, the stopper link 112 which comes into slide contact with the operation regulation surface 102a in the engagement surface 112b opens the turning locus of the movable flange 8L. Therefore, the inclining of the seatback is not regulated by the stopper link 112, and the adjustment in the angle position of the seatback within the adjustment region is not hindered.

(5) According to the embodiment, even if the switching piece (102) is formed in the link member 80, it is possible to configure the similar stopper mechanism (110). In other words, whether or not the memory function of the locking mechanism is present, it is possible to configure the stopper mechanism by sharing the stopper link 112 and the like.

(6) As illustrated in FIG. 5B, according to the embodiment, at least a portion of both the engagement protrusion portion 24L of the second member 20L (accommodation concave portion 23) related in setting the adjustment region of the seatback, and the first pole side engagement protrusion portion 46L of the first pole 31L related in setting and the like of the memory position are disposed to be overlapped in a position of the memory ring 60 in the axis line direction so as to be able to engage with the memory ring 60 in the radial direction. Therefore, for example, compared to a case where the engagement protrusion portion 24L of the second member 20L is deviated from a position of the memory ring 60 in the axis line direction to set the adjustment region of the seatback being independent of the memory ring 60, it is possible to be prevented from being increased in size in the axis line direction.

(7) According to the embodiment, when the seatback is tilted forward from a state of farther rearward tilt (not-ready-for-seating region) than a predetermined angle position to a predetermined forward tilt position, it is possible to set the angle position of the seatback to the fixed point restoration position in accordance with the cancellation of the forward tilt. Therefore, in a state of the second unlocking operation by the second operation member 72, if the seatback is tilted forward from the state of being overly tilted rearward to a predetermined forward tilt position, it is possible to avoid being restored in the state, that is, a state not suitable for a general use by cancelling the forward tilt. In other words, the angle position of the seatback is set to the fixed point restoration position, and thus, it is possible to reduce inconvenience of readjusting the angle position to obtain a suitable state for the general use.

(8) According to the embodiment, the first unlocking operation and the second unlocking operation can be alternately and independently performed by the first operation member 71 and the second operation member 72, and thus, it is possible to prevent mal-operation. Particularly, since the maximum operating amount of the first operation member 71 is set to be smaller than the operating amount necessary for the second unlocking operation, even if the first operation member 71 is operated to the maximum, it is possible to reduce the possibility of the second unlocking operation to be carried out.

(9) According to the embodiment, in a case of tilting forward to a predetermined forward tilt position when the seatback is in the ready-for-seating region, it is possible to restore the seatback in the memory position by cancelling the forward tilt.

(10) According to the embodiment, for example, even if the operating amount of the second operation member 72 when the first pole side engagement protrusion portion 46L is mounted on the first unlocking engagement surface 62 from the first locking engagement surface 65 becomes greater than the operating amount of the second operation member 72 when the second pole side engagement protrusion portion 46R is mounted on the second unlocking engagement surface 26 from the second locking engagement surface 27 due to, for example, variation of the components or the like, it is possible to prevent timing deviation thereof by difference between both of the movement speeds of the first pole 31L and the second poles 31R to 33R. Then, in the second unlocking operation state by the second operation member 72, even if the seatback is tilted forward exceeding the adjustment region, it is possible to prevent the memory ring 60 from being unable to integrally turn with the second member 20L, that is, to be unable in setting the memory position.

(11) According to the embodiment, in the second unlocking operation state by the second operation member 72, the moving amount of the first pole 31L in the radial direction when the first pole side engagement protrusion portion 46L is mounted on the first unlocking engagement surface 62 from the first locking engagement surface 65 is set to be greater than the moving amount of the second poles 31R to 33R in the radial direction when the second pole side engagement protrusion portion 46R is mounted on the second unlocking engagement surface 26 from the second locking engagement surface 27. Therefore, for example, it is possible to reduce the possibility that the operating amount of the second operation member 72 when the first pole side engagement protrusion portion 46L is mounted on the first unlocking engagement surface 62 from the first locking engagement surface 65 may become smaller than the operating amount of the second operation member 72 when the second pole side engagement protrusion portion 46R is mounted on the second unlocking engagement surface 26 from the second locking engagement surface 27 due to, for example, variation of the components or the like. Therefore, in the second unlocking operation state by the second operation member 72, even if the memory ring 60 integrally turns with the second member 20L, that is, even if the setting of the memory position or the like is performed, the seatback is prevented from being disabled to tilt forward exceeding the adjustment region.

(12) According to the embodiment, it is possible to perform the setting for the change of the operation of the first pole 31L (32L, 33L) and the second poles 31R to 33R in the second unlocking operation state by the second operation member 72 using a very simple structure through the shapes of the first pole side groove cam portion 44L (inner wall surface 44aL) and the second pole side groove cam portion 44R (inner wall surface 44aR).

(13) According to the embodiment, the fixed point restoration protrusion portion 63 is disposed in a portion before the tip (disconnection portion S) of the memory ring 60, and thus, it is possible to easily perform the elastic deformation for decreasing in diameter compared to a case of extending to the tip of the memory ring 60, for example.

Second Embodiment

A second embodiment according to the seat reclining apparatus for a vehicle including the walk-in mechanism will be described with reference to FIGS. 24 to 27. Since the second embodiment adopts a configuration which is different from the first embodiment, that is, a stopper mechanism regulating a plurality of predetermined angle positions (predetermined regulation angle position) on the rearward inclining side in accordance with the angle position of the seatback when the second unlocking operation is performed, the detailed description for the similar portions will be omitted.

As illustrated in FIGS. 25, and 26A to 26C, a stopper mechanism 130 is configured to include the switching piece 102, the stopper link urging member 113, a stopper link 131 which is turnably connected to the rear upper portion (that is, in the vicinity of rear side stopper 4b) of the lower plate 4L by the pin 111 to be the upper portion of the switching piece 102, and a movable flange 135 replacing the movable flange 8L.

The stopper link 131 is made of the plate material, for example, and has an approximately bow-shaped stopper piece 131a extending toward the movable flange 135 substantially along the circumferential direction about the hinge axis 91L while having an approximately gulf-shaped engagement surface 131b as the second cam surface extending downward to the releasing link 100 (switching piece 102). A tip portion of the stopper piece 131a forms a locking claw 132 as a claw portion which is upwardly sharp. This locking claw 132 has a linear line portion 132a substantially along the hinge axis 91L in the radial direction toward the upper end while having an oblique portion 132b facing the forward inclining direction of the seatback as being closer to the upper end. The engagement surface 131b abuts on the switching piece 102 when the stopper link 131 turns in the clockwise turning direction around the pin 111 as shown in the drawing, and thus, the stopper link 131 is basically regulated not to turn therebeyond.

Meanwhile, the movable flange 135 is molded in an approximately L-shape by the plate material, for example, and molded in an approximately arc shape about the hinge axis 91L. Then, a plurality (four) of locking holes 136 are formed in the movable flange 135 at intervals in an angle in the circumferential direction about the hinge axis 91L.

Here, an operation of the stopper mechanism 130 will be described.

As illustrated in FIG. 26A, it is considered that the second operation member 72 is in the not-operation state, and the release link 100 is held in the initial turning position. In this case, the stopper link 131 urged to turn by the stopper link urging member 113 is set to abut on the operation regulation surface 102a of the switching piece 102 in the engagement surface 131b. Therefore, the stopper link 131 causes the stopper piece 131a to be close to the hinge axis 91L side when the engagement surface 131b is relatively pressed outward in the radial direction about the hinge axis 91L by the operation regulation surface 102a. In this case, the outer peripheral surface of the stopper piece 131a is disposed at a further inner peripheral side than the movable flange 135 together with the locking claw 132 substantially along the circumferential direction about the hinge axis 91L.

In addition, in the angle position of the seatback (backside frame 6a) in this case, the locking hole 136 is open in the rearmost end of the turning locus in the clockwise turning direction as shown in the drawing about the pin 111 of the locking claw 132, as an example.

Then, as illustrated in FIG. 26B, if the second operation member 72 is in the second unlocking operation state, in accordance with the turning of the release link 100 in the clockwise turning direction as shown in the drawing, the operation allowance surface 102b of the switching piece 102 reaches the engagement surface 131b of the stopper link 131, that is, the operation regulation surface 102a of the switching piece 102 releases the engagement surface 112b of the stopper link 112, and thus, the locking claw 132 of the stopper link 131 which is urged to turn by the stopper link urging member 113 protrudes to engage with the locking hole 136 of the movable flange 135.

Thereafter, as illustrated in FIG. 26C, if the seatback tilts rearward, a c-stopper 136a formed by a front end surface of the locking hole 136 abuts on the linear line portion 132a of the locking claw 132. In this case, the locking claw 132 engaging with the locking hole 136 with directivity by the linear line portion 132a and the oblique portion 132b allows the movement of the movable flange 135 corresponding to the forward inclining direction of the seatback while regulating the movement of the movable flange 135 corresponding to the rearward inclining direction of the seatback.

When a portion between the locking hole 136 and the rear end of the movable flange 135 is positioned on the turning locus in the clockwise turning direction as shown in the drawing about the pin 111 of the locking claw 132, the locking claw 132 engages with the locking hole 136 by causing the seatback to pass through a slight rearward inclining process.

The same can be applied to the other locking hole 136. In other words, when the locking claw 132 of the stopper link 131 engages with the locking hole 136 which is in the second rearmost end, if the seatback tilts rearward, a d-stopper 136b formed by the front end surface of the locking hole 136 abuts on the linear line portion 132a of the locking claw 132, thereby regulating the movement of the movable flange 135 corresponding to the rearward inclining direction of the seatback. Otherwise, when the locking claw 132 of the stopper link 131 engages with the locking hole 136 which is in the second foremost end, if the seatback tilts rearward, an e-stopper 136c formed by the front end surface of the locking hole 136 abuts on the linear line portion 132a of the locking claw 132, thereby regulating the movement of the movable flange 135 corresponding to the rearward inclining direction of the seatback. Otherwise, when the locking claw 132 of the stopper link 131 engages with the locking hole 136 which is in the foremost end, if the seatback tilts rearward, an f-stopper 136d formed by the front end surface of the locking hole 136 abuts on the linear line portion 132a of the locking claw 132, thereby regulating the movement of the movable flange 135 corresponding to the rearward inclining direction of the seatback.

In addition, when a border portion between the two adjacent locking holes 136 is positioned on the turning locus in the clockwise turning direction as shown in the drawing about the pin 111 of the locking claw 132, the locking claw 132 engages with the locking hole 136 in front thereamong by causing the seatback to pass through a slight rearward inclining process.

When the movable flange 135 proceeds in further front of the seat than a front end (linear line portion 132a) of the stopper piece 131a, and the stopper piece 131a is open upward, the linear line portion 132a of the locking claw 132 protruding upward blocks the turning locus of the movable flange 8L. In this case, if the seatback tilts rearward, a b-stopper 137 formed by the rear end surface of the movable flange 135 abuts on the linear line portion 132a of the locking claw 132, thereby regulating the movement of the movable flange 135 corresponding to the rearward inclining direction of the seatback.

Meanwhile, if the seatback leans to the rearward inclining side, the movable flange 8L positioned above the stopper piece 112a regulates the turning in the clockwise turning direction as shown in the drawing about the pin 111 of the stopper link 112. In this case, even if the second operation member 72 is in the second unlocking operation state, the stopper piece 112a remains opening the turning locus of the movable flange 8L, and the seatback tilts rearward until the movable flange 8L abuts on the rear side stopper 4b, that is, until reaching the complete tilt position.

Incidentally, in FIG. 26A, even if the first operation member 71 is in the first unlocking operation state, the release link 100 turns in the clockwise turning direction as shown in the drawing. However, the operating amount of the first operation member 71 in this case is relatively small, the switching piece 102 comes into slide contact with the engagement surface 131b of the stopper link 131 within the range of the operation regulation surface 102a. Therefore, regardless of the state of the seatback (ready-for-seating region or not-ready-for-seating region), the stopper piece 131a of the stopper link 131 does not block the turning locus of the movable flange 135. In other words, if the first operation member 71 is in the first unlocking operation state, it is possible to perform the angle adjustment of the seatback within the adjustment region without being hindered by the stopper mechanism 130.

FIG. 27 illustrates a relationship between an angle range of the seatback when the second operation member 72 is in the second unlocking operation and a regulation position of the inclining of the seatback in the rearward inclining direction due to the stopper link 131. As illustrated in the same drawing, the adjustment region of the seatback is divided into a range D including the fixed point restoration position, two sections of ranges B and C leaning to the forward inclining to the upright position, two sections of ranges E and F leaning to the rearward inclining, and a range G to the complete tilt position. Then, angle positions b, c, d, e and f which respectively become each of the borders of these ranges, B to G are the angle positions of the seatback when linear line portion 132a of the locking claw 132 abuts on the b-stopper 137, a c-stopper 136a, the d-stopper 136b, the e-stopper 136c, and the f-stopper 136d. Therefore, when the second operation member 72 is in the second unlocking operation, if the seatback is in the ranges of B to F, the inclining of the seatback in the rearward inclining direction is respectively regulated in the corresponding angle positions b to f. If the seatback is in the range of G, the inclining of the seatback in the rearward inclining direction is regulated in the complete tilt position.

As described above in detail, according to the embodiment, it is possible to achieve the below-described effects in addition to the similar effect according to the first embodiment.

(1) According to the embodiment, it is possible to gradually change the angle position (regulation angle position) regulating the inclining of the rearward inclining direction in accordance with the angle position of the seatback when the second operation member 72 is in the second unlocking operation. Therefore, for example, it is possible to prevent the section from overly fluctuating in which the inclining in the rearward inclining direction is regulated in accordance with the angle position of the seatback such as a case of one angle position to be regulated.

Particularly, in a case where the angle position of the seatback leans to a forward inclining side when the second operation member 72 is in the second unlocking operation, the regulation range is relatively elongated if there is one angle position to regulate the inclining of the seatback in the rearward inclining direction. However, such a fluctuation of the regulation range can be prevented, and thus, it is possible to improve usability.

When the second operation member 72 is in the second unlocking operation state, if the seatback is about to incline in the forward inclining direction, the locking claw 132 engages with the nearest locking hole 136. However, since the inclining is allowed, the inclining of the seatback to a predetermined forward tilt position is not hindered.

The embodiment may be changed as follows.

Figure 28:
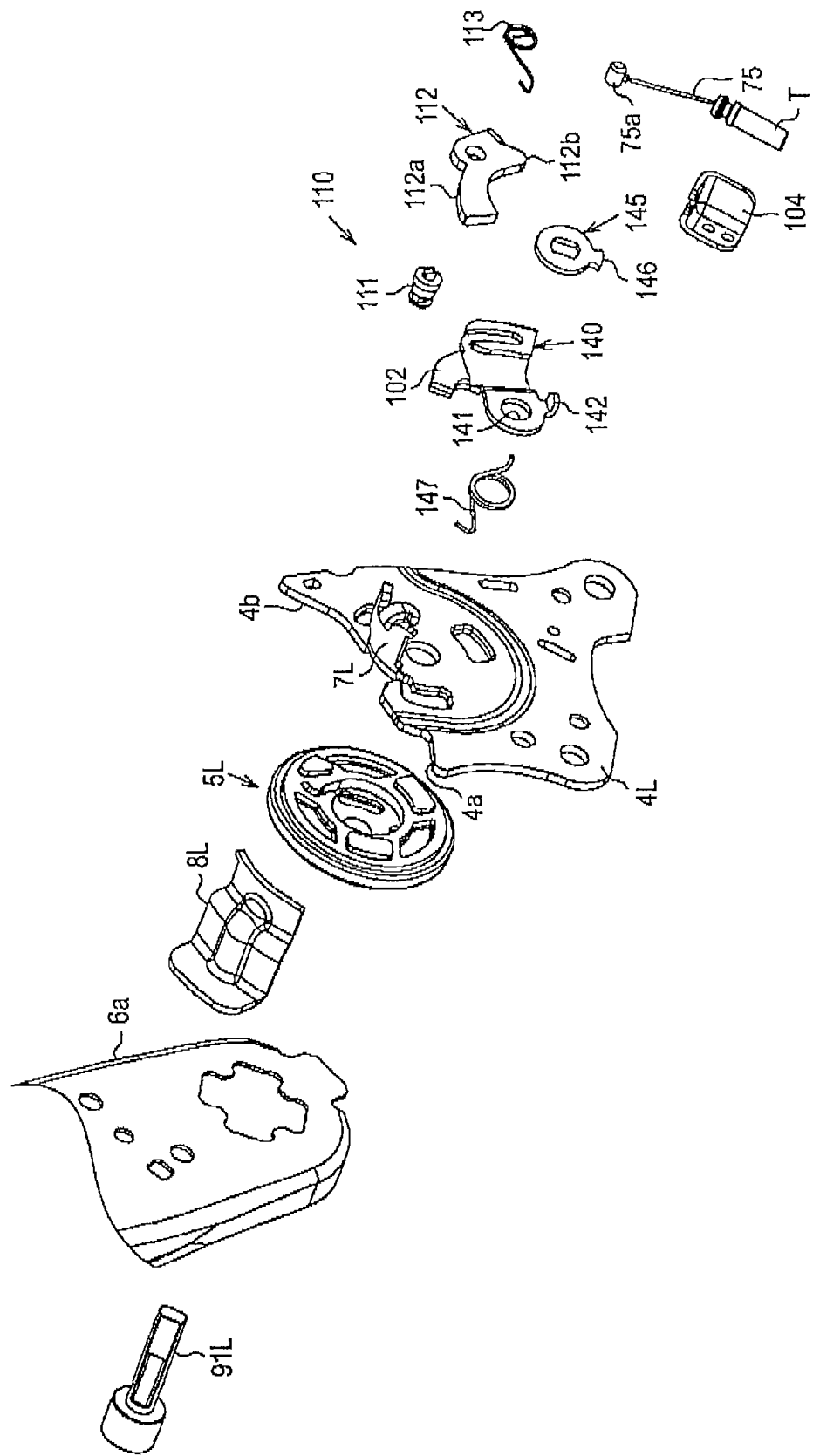
FIG. 28 is an exploded perspective view illustrating a modified embodiment disclosed here.
Figure 29:
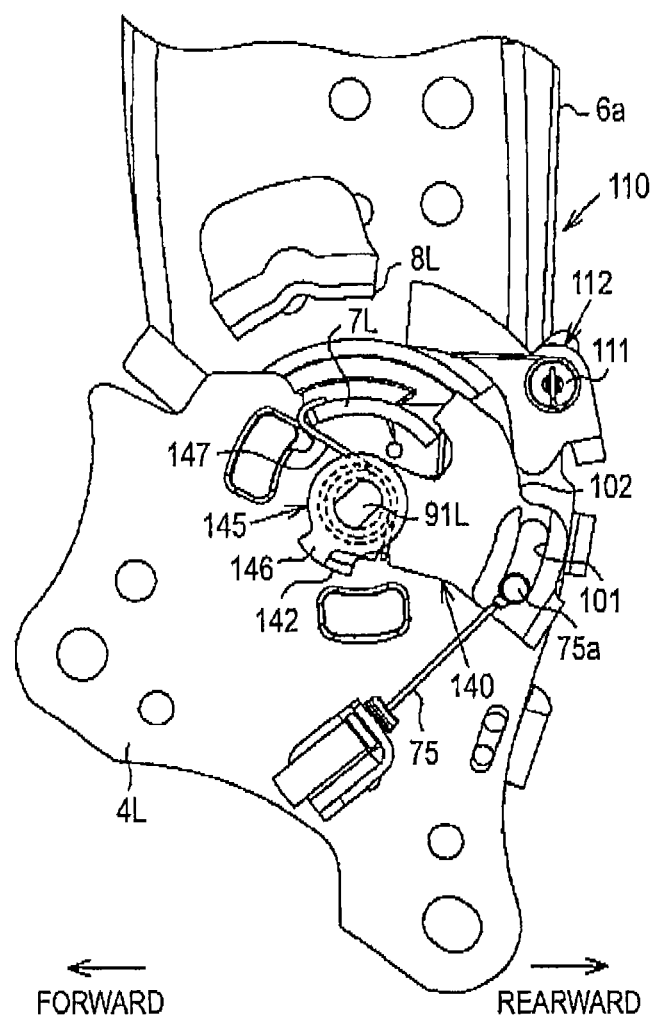
FIG. 29 is a side view illustrating the same modified embodiment.

As illustrated in FIGS. 28 and 29, in place of the release link 100, a release link 140 may be adopted which is mounted on the hinge axis 91L of the locking mechanism 5L to be relatively turnable. In other words, in this release link 140, a circular bearing hole 141 is formed, and the release link 140 is supported by the bearing hole 141 to be turnable around the hinge axis 91L. In the lower side portion in the radial direction about the bearing 141 of the release link 140, a protrusion piece 142 raised outward (front side orthogonal to the sheet surface in FIG. 29) is formed.

Meanwhile, an approximately ring-shaped fixing tool 145 made of, for example, the plate material is fit and fixed to the tip portion penetrating the release link 140 of the hinge axis 91L. In this fixing tool 145, a flange-shaped reception portion 146 protrudes in the radial direction preceding the protrusion piece 142 in the turning direction (clockwise turning direction in FIG. 29) corresponding to the unlocking operation. This reception portion 146 is disposed to be pressed by the protrusion piece 142 when turning in a direction corresponding to the unlocking operation of the release link 140 (cam 34L).

In addition, in the hinge axis 91L, a release link urging member 147 formed of a torsion coil spring, for example, is wound in which a terminal is locked by the fixing flange 7L and the other terminal is locked by the release link 140. This release link urging member 147 urges to turn the release link 140 in a direction corresponding to the locking operation of the release link 140 (cam 34L).

Then, if the second operation member 72 is in the second unlocking operation state, since the cable 75 is pulled downward, the release link 140 turns. Then, in accordance with the turning of the release link 140, the fixing tool 145 of which reception portion 146 is pressed by the protrusion piece 142 integrally turns with the hinge axis 91L. In this case, the cam 34L which is integrated with the hinge axis 91L performs the second unlocking operation against the urging force of the coil spring 35 together with the release link urging member 147. In other words, in the state of the second operation member 72 in the second unlocking operation, the protrusion piece 142 of the release link 140 presses the reception portion 146, and thus, it is possible to perform the second unlocking operation.

Meanwhile, if the first operation member 71 is in the first unlocking operation state, even though the hinge axis 91L and the fixing tool 145 integrally turn in accordance with the first unlocking operation of the cam 34L, since the release link 140 is urged and held by the release link urging member 147, it is possible to prevent driven turning thereof. Therefore, it is possible to further lessen a possibility of a malfunction of the stopper mechanism 110, for example.

In the first embodiment, the regulation angle position of the seatback by the stopper mechanism 110 may be different from the fixed point restoration position, for example, it may be the neutral position and the like.

In the first embodiment, even if the seatback is in the not-ready-for-seating region, the stopper mechanism may regulate the rearward tilt of the seatback in a predetermined regulation angle position.

In the second embodiment, the number of the locking holes 136 formed in the movable flange 135 is arbitrary.

In the second embodiment, even if the seatback is in the range G, the stopper mechanism may regulate the rearward tilt of the seatback in a predetermined regulation angle position.

Figure 30:
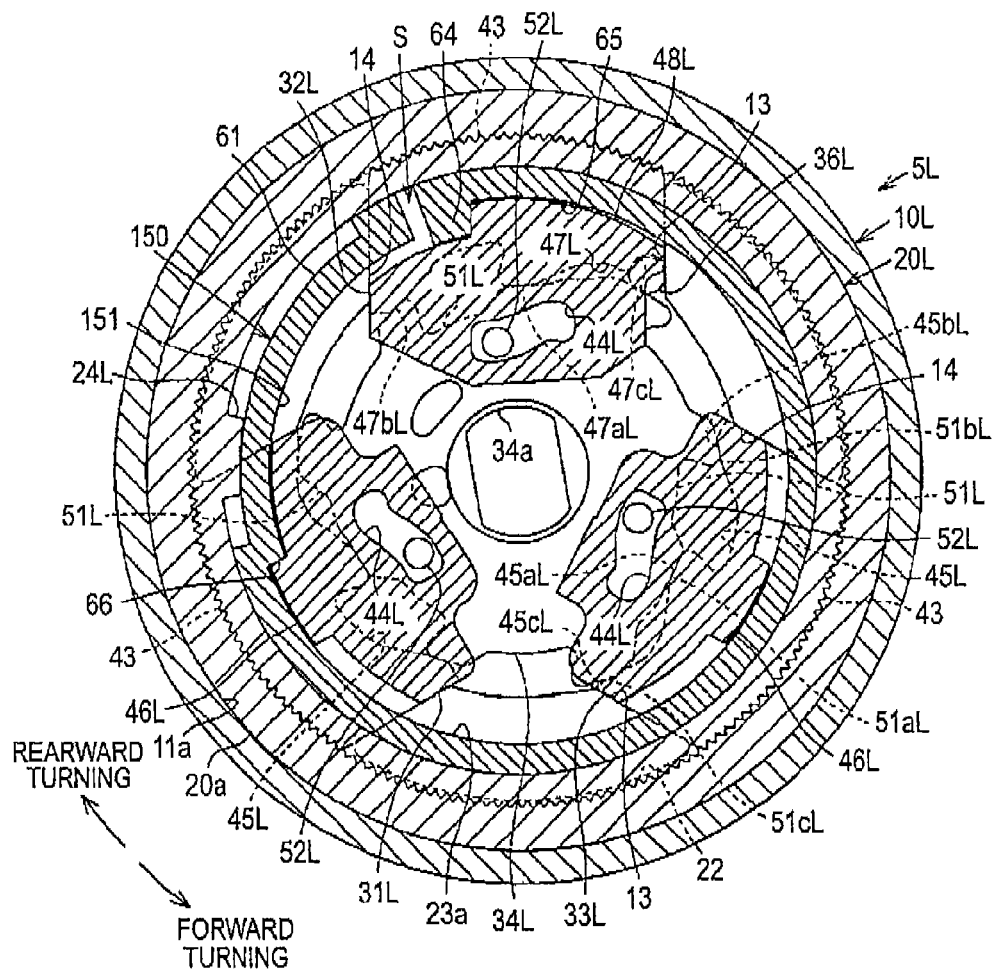
FIG. 30 is a cross-sectional view illustrating another modified embodiment disclosed here.
Figure 31:
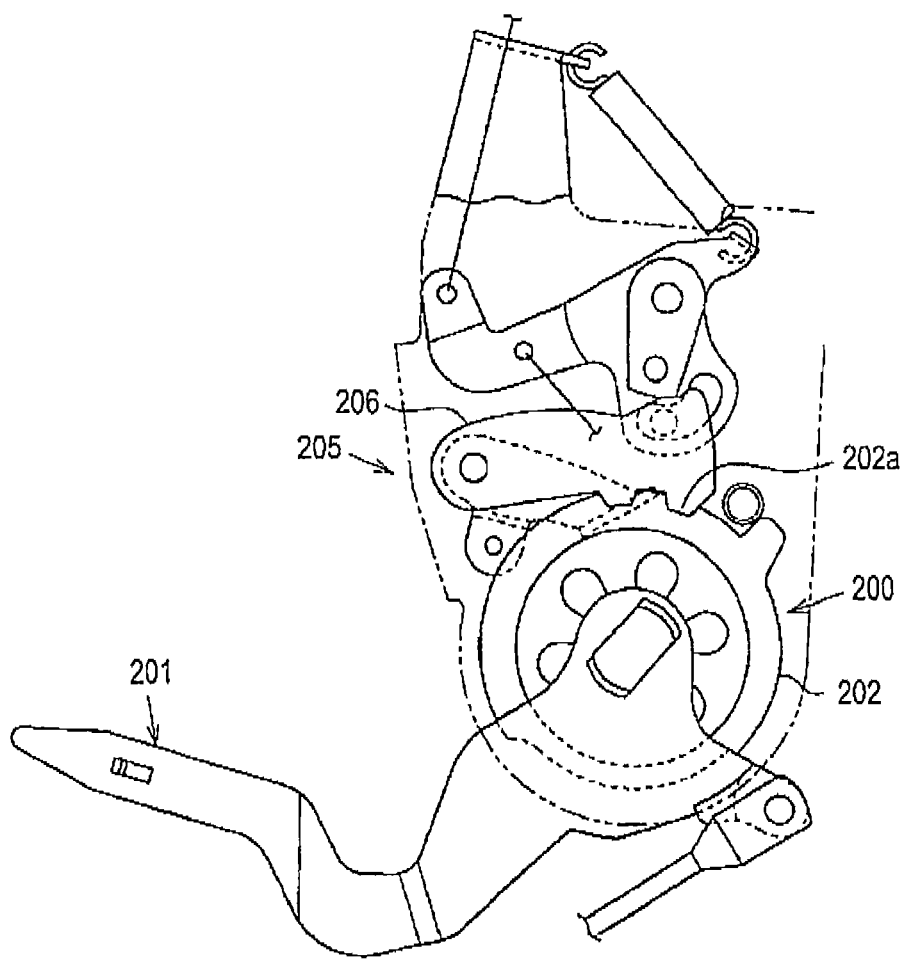
FIG. 31 is a side view illustrating an embodiment in the related art.

In each of the embodiments, the release links 100 and 140 (switching piece 102), and stopper links 112 and 131 are connected utilizing the cam surface. However, for example, these may also be connected by a link and the like, As illustrated in FIG. 30, a memory ring 150 may have a first unlocking engagement surface 151 from which the fixed point restoration protrusion portion 63 is omitted. In this case, regardless of the angle position when the seatback is tilted forward, the first unlocking engagement surface 151 continues to move with respect to the first pole side engagement protrusion portion 46L until reaching the forward tilt position. Then, if the seatback is raised up to cancel the forward tilt, the memory ring 150 and the second member 20L turn rearward, and thus, at the moment the first locking engagement surface 65 reaches the first pole side engagement protrusion portion 46L, the rearward turning of the memory ring 150 and the second member 20L therebeyond is restricted. In other words, regardless of the angle position when the seatback is tilted forward, it is possible to restore the seatback in the memory position by cancelling the forward tilt.

In each of the embodiments, it is possible to arbitrarily set the fixed point restoration position of the memory ring 60 by the fixed point restoration protrusion portion 63 by changing the disposition thereof. However, if the angle position of the seatback is positioned at a further rearward inclining side than the fixed restoration position, the setting of the memory position and the like may not function, and thus, it is preferable to set further rearward inclining side than the neutral position, for example.

In each of the embodiments, the fixed point restoration protrusion portion (63) of the memory ring 60 may extend to the tip (disconnection portion S) of the memory ring 60.

In each of the embodiments, the memory rings 60 and 150 may be in a connected ring shape without the disconnection portion S as long as they are elastically deformable so as to be decreased in diameter.

In each of the embodiments, the connection structure of the first operation member 71 and the hinge axis 91R is merely an example, and the first operation member 71 may be directly connected to the hinge axis 91R, for example.

In each of the embodiments, the connection relationship between the first and second operation members 71 and 72, and the hinge axes 91R and 91L may be reversed.

In each of the embodiments, the adjustment region of the seatback may be set by engaging the engagement protrusion portion 24L of the second member 20L (accommodation concave portion 23) and the first pole side engagement protrusion portion 46L of the first poles 31L to 33L. In other words, the engagement protrusion portion 24L of the second member 20L (accommodation concave portion 23) related to the setting of the adjustment region of the seatback, and the first pole side engagement protrusion portion 46L of the first pole 31L related to setting of the memory position and the like may be disposed so as not to overlap in a position of the memory ring 60 in the axis line direction.

Otherwise, the locking mechanism (5L) equipped with memory function may not have a setting function for the adjustment region of the seatback (engagement protrusion portion 24L and turning allowance portion 61).

In each of the embodiments, the number of the poles of the locking mechanism 5L may be arbitrary as long as being plural, and the appropriate number may be adopted in accordance with necessary locking strength or a full memory range and the like. In addition, all of the plurality of poles may have a shape identical with each other, or all may have a shape different from each other. Furthermore, the plurality of poles may not be disposed at intervals in equivalent angles, and the movement direction thereof may not completely match in the radial direction of the hinge axis 91L.

In each of the embodiments, the number of the poles of the locking mechanism 5R may be arbitrary, and the appropriate number may be adopted in accordance with necessary locking strength and the like. In addition, all of the plurality of poles may have the shape identical with each other, or all may have the shape different from each other. Furthermore, the plurality of poles may not be disposed at intervals in equivalent angles, and the movement direction thereof may not completely match in the radial direction of the hinge axis 91R.

In addition, one among the plurality of poles may be connected to the cam 34R so as to connectedly move with the unlocking operation, and rest of the poles may connectedly move with the unlocking operation of the cam 34R through the appropriate connection member.

In each of the embodiments, the adjustment region of the seatback for the single locking mechanism 5R may differ from the adjustment region of the seatback for the single locking mechanism 5L as long as it includes the adjustment region of the seatback for the single locking mechanism 5L. Even in this case, since the locking mechanism 5R is operated following the locking mechanism 5L, it is possible to perform the setting of the memory position or the setting of the adjustment region in the similar manner in the apparatus as a whole. However, when setting the adjustment region, it is further preferable that the locking mechanisms 5L and 5R (engagement protrusion portions 24L and 24R) cooperate with each other in an aspect of strength.

In each of the embodiments, in place of the locking mechanism 5L, a bilaterally symmetric structure of the locking mechanism 5R may be provided. In other words, the locking mechanism without the memory function to be mounted may be adopted.

In each of the embodiments, in place of the locking mechanism 5R, a bilaterally symmetric structure of the locking mechanism 5L may be provided. In other words, as the bilateral locking mechanism, an attached locking mechanism (5L) collectively having the setting function (engagement protrusion portion 24L and turning allowance portion 61) for the adjustment region of the seatback and memory function.

In each of the embodiments, the lower plates 4L and 4R may be respectively and integrally formed with the first members 10L and 10R. Similarly, both the backside frames 6a may be respectively and integrally formed with the second members 20L and 20R.

In each of the embodiments, the fixing relationship among the first member 10L and the second member 20L of the locking mechanism 5L, the seat cushion side (lower plate 4L), and the seat cushion side (backside frame 6a) may be reversed. Similarly, the fixing relationship among the first member 10R and the second member 20R of the locking mechanism 5R, the seat cushion side (lower plate 4R), and the seat cushion side (backside frame 6a) may be reversed.

In each of the embodiments, at least one of both of the hinge axes 91L and 91R, and the connection shaft 92 may be integrally formed.

In each of the embodiments, the second operation member 72 may be disposed in the rear portion (near floor of rear seat) of the seat cushion.

This disclosure may be realized in a seat reclining apparatus for a vehicle that does not include a walk-in mechanism.

An aspect of this disclosure is directed to a seat reclining apparatus for a vehicle including a locking mechanism that is interposed between a seat cushion and a seatback and selectively switches inclining of the seatback between a permitted state and a regulated state with respect to the seat cushion; a first operation member that performs a first unlocking operation which allows the seatback to incline with respect to the seat cushion within a predetermined angle range with respect to the locking mechanism; a second operation member that performs a second unlocking operation which allows the seatback to incline with respect to the seat cushion to a predetermined forward tilt position exceeding the predetermined angle range with respect to the locking mechanism; and a stopper mechanism that regulates a rearward tilt of the seatback at a predetermined regulation angle position included within the predetermined angle range in a state of the second unlocking operation of the second operation member.

With this configuration, for example, even if the second operation member is operated in a circumstance where a person sitting on the seat leans on the seatback, the rearward tilt of the seatback is regulated at the predetermined regulation angle position by the stopper mechanism, and thus, it is possible to prevent the seatback from overly tilting rearward.

Particularly, it is possible to further simplify the structure by accomplishing the inclining of the seatback with respect to the seat cushion within the predetermined angle range and the inclining of the seatback with respect to the seat cushion to the predetermined forward tilt position through the locking mechanism that is disposed around the axis line of the seatback.

In the seat reclining apparatus for a vehicle described above, it is preferable that the stopper mechanism includes a stopper link which is pivotally supported by a seat cushion side member; a stopper member which is provided in a seatback side member, a release link which is connected to each of the first operation member and the second operation member and turns to cause the locking mechanism to allow the inclining of the seatback with respect to the seat cushion to a predetermined forward tilt position in the state of the second unlocking operation of the second operation member; a first cam surface which is formed in the release link; a second cam surface which is formed in the stopper link, guides the stopper link so as to open a turning locus of the stopper member corresponding to a rearward inclining direction of the seatback when abutting on the first cam surface in a state where the inclining of the seatback is regulated with respect to the seat cushion by the locking mechanism, and allows the turning of the stopper link toward a side blocking the turning locus of the stopper member corresponding to the rearward inclining direction of the seatback while being released from the first cam surface in the state of the second unlocking operation of the second operation member; and an elastic member which urges to turn the stopper link so as to cause the first cam surface and the second cam surface to abut on each other in the state where the inclining of the seatback is regulated with respect to the seat cushion by the locking mechanism and so as to cause the stopper link, in which the second cam surface is released from the first cam surface in the state of the second unlocking operation of the second operation member, to block the turning locus of the stopper member corresponding to the rearward inclining direction of the seatback.

With this configuration, for example, in the state of the second unlocking operation of the second operation member, the stopper link in which the second cam surface is released from the first cam surface is urged by the elastic member, thereby turning so as to block the turning locus of the stopper member corresponding to the rearward inclining direction of the seatback. Therefore, it is possible to regulate the inclining of the seatback in the rearward inclining direction at an angle position (predetermined regulation angle position) where the stopper member abuts on the stopper link.

In the seat reclining apparatus for a vehicle described above, it is preferable that the seat reclining apparatus further includes a cancellation member that stops blocking of the turning locus of the stopper member by the stopper link when the seatback is in a state of being farther inclined in the rearward inclining direction than the regulation angle position.

With this configuration, when the seatback is in the state of being farther inclined in the rearward inclining direction than the regulation angle position, that is, when the seatback is considered to be already in a posture inclined rearward to some extent and can be farther inclined rearward without causing any difficulties, it is possible to stop the stopper link from vainly blocking the turning locus of the stopper member using the cancellation member.

In the seat reclining apparatus for a vehicle described above, it is preferable that a plurality of engagement holes are formed in the stopper member at intervals in a circumferential direction of a center axis of the seatback, and a claw portion which is engaged with any one of the plurality of engagement holes, regulates the inclining of the seatback in the rearward inclining direction, and allows the inclining of the seatback in a forward inclining direction when the stopper link in which the second cam surface is released from the first cam surface in the state of the second unlocking operation of the second operation member is urged to turn by the elastic member is formed in a tip portion of the stopper link.

With this configuration, in the state of the second unlocking operation of the second operation member, if the seatback is about to incline in the rearward inclining direction, the claw portion engages with the nearest engagement hole among the plurality of engagement holes, thereby being regulated. In this manner, it is possible to gradually change the angle position (regulation angle position) to regulate the inclining thereof in the rearward inclining direction in response to an angle position of the seatback when the second operation member is in the second unlocking operation, and thus, for example, it is possible to prevent a regulation range for the inclining of the seatback in the rearward inclining direction from overly fluctuating in response to the angle position of the seatback as in a case where the angle position for regulation is provided at one place.

Particularly, in a case where the angle position of the seatback leans to a forward inclining side when the second operation member is in the second unlocking operation, the regulation range is relatively elongated if there is one angle position to regulate the inclining of the seatback in the rearward inclining direction. However, such a fluctuation of the regulation range can be prevented, and thus, it is possible to improve usability.

In the state of the second unlocking operation of the second operation member, if the seatback is about to incline in the forward inclining direction, the claw portion engages with the nearest engagement hole among the plurality of engagement holes. However, since the inclining is allowed, the inclining of the seatback to the predetermined forward tilt position is not hindered.

In the seat reclining apparatus for a vehicle described above, it is preferable that the second cam surface abut on the first cam surface despite a state of the first unlocking operation of the first operation member.

With this configuration, in the state of the first unlocking operation of the first operation member, it is possible to avoid the stopper link turning so as to block the turning locus of the stopper member corresponding to the rearward inclining direction of the seatback. Then, it is possible to prevent an angle adjustment of the seatback in the rearward inclining direction from being disabled by the stopper link in the state of the first unlocking operation of the first operation member.

In the seat reclining apparatus for a vehicle described above, it is preferable that the release link is mounted on a hinge axis of the locking mechanism to be relatively turnable, and the seat reclining apparatus further includes a reception portion that is provided in the hinge axis; a protrusion piece that is provided in the release link and capable of pressing the reception portion toward the side in which the locking mechanism allows the inclining of the seatback in the state of the second unlocking operation of the second operation member; and a release link urging member that urges the release link in the turning direction corresponding to a side in which the locking mechanism regulates the inclining of the seatback.

With this configuration, in the state of the second unlocking operation of the second operation member, the protrusion piece of the release link presses the reception portion, and thus, it is possible to allow the inclining of the seatback by the locking mechanism. Meanwhile, in the state of the first unlocking operation of the first operation member, the hinge axis turns to a side in which the locking mechanism allows the inclining of the seatback. However, the release link is urgingly held by the release link urging member, and thus, it is possible to prevent following turning thereof. For this reason, it is possible to further lessen a possibility of a malfunction of the stopper mechanism, for example.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining apparatus for a vehicle comprising:
a locking mechanism that is interposed between a seat cushion and a seatback and selectively switches inclining of the seatback between a permitted state and a regulated state with respect to the seat cushion;
a first operation member that performs a first unlocking operation which allows the seatback to incline with respect to the seat cushion within a predetermined angle range with respect to the locking mechanism;
a second operation member that performs a second unlocking operation which allows the seatback to incline with respect to the seat cushion to a predetermined forward tilt position exceeding the predetermined angle range with respect to the locking mechanism; and
a stopper mechanism that regulates a rearward tilt of the seatback at a predetermined regulation angle position included within the predetermined angle range in a state of the second unlocking operation of the second operation member,
wherein the stopper mechanism includes
a stopper link which is pivotally supported by a seat cushion side member;
a stopper member which is provided in a seatback side member;
a release link which is connected to each of the first operation member and the second operation member and turns to cause the locking mechanism to allow the inclining of the seatback with respect to the seat cushion to a predetermined forward tilt position in the state of the second unlocking operation of the second operation member;
a first cam surface which is formed in the release link;
a second cam surface which is formed in the stopper link, guides the stopper link so as to open a turning locus of the stopper member corresponding to a rearward inclining direction of the seatback when abutting on the first cam surface in a state where the inclining of the seatback is regulated with respect to the seat cushion by the locking mechanism, and allows the turning of the stopper link toward a side blocking the turning locus of the stopper member corresponding to the rearward inclining direction of the seatback while being released from the first cam surface in the state of the second unlocking operation of the second operation member; and
an elastic member which urges to turn the stopper link so as to cause the first cam surface and the second cam surface to abut on each other in the state where the inclining of the seatback is regulated with respect to the seat cushion by the locking mechanism and so as to cause the stopper link, in which the second cam surface is released from the first cam surface in the state of the second unlocking operation of the second operation member, to block the turning locus of the stopper member corresponding to the rearward inclining direction of the seatback, and
wherein the release link is mounted on a hinge axis of the locking mechanism to be relatively turnable, and the seat reclining apparatus further comprises:
a reception portion that is provided in the hinge axis;
a protrusion piece that is provided in the release link and capable of pressing the reception portion toward the side in which the locking mechanism allows the inclining of the seatback in the state of the second unlocking operation of the second operation member; and
a release link urging member that urges the release link in a turning direction corresponding to a side in which the locking mechanism regulates the inclining of the seatback.

2. The seat reclining apparatus for a vehicle according to claim 1, further comprising:
a cancellation member that stops blocking of the turning locus of the stopper member by the stopper link when the seatback is in a state of being farther inclined in the rearward inclining direction than the regulation angle position.

3. The seat reclining apparatus for a vehicle according to claim 1,
wherein the second cam surface abuts on the first cam surface despite a state of the first unlocking operation of the first operation member.

4. The seat reclining apparatus for a vehicle according to claim 2,
wherein the second cam surface abuts on the first cam surface despite a state of the first unlocking operation of the first operation member.

5. A seat reclining apparatus for a vehicle comprising:
a locking mechanism that is interposed between a seat cushion and a seatback and selectively switches inclining of the seatback between a permitted state and a regulated state with respect to the seat cushion;
a first operation member that performs a first unlocking operation which allows the seatback to incline with respect to the seat cushion within a predetermined angle range with respect to the locking mechanism;
a second operation member that performs a second unlocking operation which allows the seatback to incline with respect to the seat cushion to a predetermined forward tilt position exceeding the predetermined angle range with respect to the locking mechanism; and
a stopper mechanism that regulates a rearward tilt of the seatback at a predetermined regulation angle position included within the predetermined angle range in a state of the second unlocking operation of the second operation member,
wherein the stopper mechanism includes
a stopper link which is pivotally supported by a seat cushion side member;
a stopper member which is provided in a seatback side member;

a release link which is connected to each of the first operation member and the second operation member and turns to cause the locking mechanism to allow the inclining of the seatback with respect to the seat cushion to a predetermined forward tilt position in the state of the second unlocking operation of the second operation member;

a first cam surface which is formed in the release link;

a second cam surface which is formed in the stopper link, guides the stopper link so as to open a turning locus of the stopper member corresponding to a rearward inclining direction of the seatback when abutting on the first cam surface in a state where the inclining of the seatback is regulated with respect to the seat cushion by the locking mechanism, and allows the turning of the stopper link toward a side blocking the turning locus of the stopper member corresponding to the rearward inclining direction of the seatback while being released from the first cam surface in the state of the second unlocking operation of the second operation member; and an elastic member which urges to turn the stopper link so as to cause the first cam surface and the second cam surface to abut on each other in the state where the inclining of the seatback is regulated with respect to the seat cushion by the locking mechanism and so as to cause the stopper link, in which the second cam surface is released from the first cam surface in the state of the second unlocking operation of the second operation member, to block the turning locus of the stopper member corresponding to the rearward inclining direction of the seatback, wherein the seat reclining apparatus further comprises a cancellation member that stops blocking of the turning locus of the stopper member by the stopper link when the seatback is in a state of being farther inclined in the rearward inclining direction than the regulation angle position, and wherein the release link is mounted on a hinge axis of the locking mechanism to be relatively turnable, and the seat reclining apparatus further comprises:

a reception portion that is provided in the hinge axis;

a protrusion piece that is provided in the release link and capable of pressing the reception portion toward the side in which the locking mechanism allows the inclining of the seatback in the state of the second unlocking operation of the second operation member; and a release link urging member that urges the release link in a turning direction corresponding to a side in which the locking mechanism regulates the inclining of the seatback.

6. A seat reclining apparatus for a vehicle comprising:

a locking mechanism that is interposed between a seat cushion and a seatback and selectively switches inclining of the seatback between a permitted state and a regulated state with respect to the seat cushion;

a first operation member that performs a first unlocking operation which allows the seatback to incline with respect to the seat cushion within a predetermined angle range with respect to the locking mechanism;

a second operation member that performs a second unlocking operation which allows the seatback to incline with respect to the seat cushion to a predetermined forward tilt position exceeding the predetermined angle range with respect to the locking mechanism; and a stopper mechanism that regulates a rearward tilt of the seatback at a predetermined regulation angle position included within the predetermined angle range in a state of the second unlocking operation of the second operation member, wherein the stopper mechanism includes a stopper link which is pivotally supported by a seat cushion side member;

a stopper member which is provided in a seatback side member;

a release link which is connected to each of the first operation member and the second operation member and turns to cause the locking mechanism to allow the inclining of the seatback with respect to the seat cushion to a predetermined forward tilt position in the state of the second unlocking operation of the second operation member;

a first cam surface which is formed in the release link;

a second cam surface which is formed in the stopper link, guides the stopper link so as to open a turning locus of the stopper member corresponding to a rearward inclining direction of the seatback when abutting on the first cam surface in a state where the inclining of the seatback is regulated with respect to the seat cushion by the locking mechanism, and allows the turning of the stopper link toward a side blocking the turning locus of the stopper member corresponding to the rearward inclining direction of the seatback while being released from the first cam surface in the state of the second unlocking operation of the second operation member; and an elastic member which urges to turn the stopper link so as to cause the first cam surface and the second cam surface to abut on each other in the state where the inclining of the seatback is regulated with respect to the seat cushion by the locking mechanism and so as to cause the stopper link, in which the second cam surface is released from the first cam surface in the state of the second unlocking operation of the second operation member, to block the turning locus of the stopper member corresponding to the rearward inclining direction of the seatback, wherein the second cam surface abuts on the first cam surface despite a state of the first unlocking operation of the first operation member, and wherein the release link is mounted on a hinge axis of the locking mechanism to be relatively turnable, and the seat reclining apparatus further comprises:

a reception portion that is provided in the hinge axis;

a protrusion piece that is provided in the release link and capable of pressing the reception portion toward the side in which the locking mechanism allows the inclining of the seatback in the state of the second unlocking operation of the second operation member; and a release link urging member that urges the release link in a turning direction corresponding to a side in which the locking mechanism regulates the inclining of the seatback.

* * * * *